RECORD CONTROLLED RECORDING APPARATUS

Original Filed Jan. 24, 1946 16 Sheets-Sheet 1

INVENTORS
E. J. RABENDA
F. J. FURMAN
BY George D Hicks
ATTORNEY

March 6, 1951 E. J. RABENDA ET AL 2,543,935

RECORD CONTROLLED RECORDING APPARATUS

Original Filed Jan. 24, 1946 16 Sheets-Sheet 2

INVENTORS
E. J. RABENDA
F. J. FURMAN
BY George D Hicks
ATTORNEY

INVENTORS
E. J. RABENDA
F. J. FURMAN
BY George D Hickey
ATTORNEY

March 6, 1951 E. J. RABENDA ET AL 2,543,935

RECORD CONTROLLED RECORDING APPARATUS

Original Filed Jan. 24, 1946 16 Sheets-Sheet 4

INVENTORS
E. J. RABENDA
F. J. FURMAN

BY George D. Hicks

ATTORNEY

March 6, 1951 E. J. RABENDA ET AL 2,543,935

RECORD CONTROLLED RECORDING APPARATUS

Original Filed Jan. 24, 1946 16 Sheets-Sheet 5

INVENTORS
E. J. RABENDA
F. J. FURMAN
BY George D. Nichols
ATTORNEY

INVENTORS
E.J. RABENDA
F.J. FURMAN
BY George D. Hicks
ATTORNEY

RECORD CONTROLLED RECORDING APPARATUS

Original Filed Jan. 24, 1946 16 Sheets-Sheet 7

INVENTORS
E. J. RABENDA
F. J. FURMAN
BY George D. Hicks
ATTORNEY

March 6, 1951 E. J. RABENDA ET AL 2,543,935

RECORD CONTROLLED RECORDING APPARATUS

Original Filed Jan. 24, 1946 16 Sheets-Sheet 8

INVENTORS
E. J. RABENDA
F. J. FURMAN
BY George D. Hicks
ATTORNEY

March 6, 1951 E. J. RABENDA ET AL 2,543,935

RECORD CONTROLLED RECORDING APPARATUS

Original Filed Jan. 24, 1946 16 Sheets-Sheet 9

INVENTORS
E.J. RABENDA
F.J. FURMAN
BY George D. Hicks
ATTORNEY

INVENTORS
E. J. RABENDA
F. J. FURMAN
BY George D. Hicks
ATTORNEY

March 6, 1951 E. J. RABENDA ET AL 2,543,935

RECORD CONTROLLED RECORDING APPARATUS

Original Filed Jan. 24, 1946 16 Sheets-Sheet 11

INVENTORS
E. J. RABENDA
F. J. FURMAN
BY George D. Hicks
ATTORNEY

March 6, 1951 E. J. RABENDA ET AL 2,543,935

RECORD CONTROLLED RECORDING APPARATUS

Original Filed Jan. 24, 1946 16 Sheets-Sheet 12

INVENTORS
E. J. RABENDA
F. J. FURMAN
BY George D. Hicks
ATTORNEY

March 6, 1951 E. J. RABENDA ET AL 2,543,935

RECORD CONTROLLED RECORDING APPARATUS

Original Filed Jan. 24, 1946 16 Sheets-Sheet 13

INVENTORS
E. J. RABENDA
F. J. FURMAN

BY George D. Hicks

ATTORNEY

March 6, 1951 E. J. RABENDA ET AL 2,543,935

RECORD CONTROLLED RECORDING APPARATUS

Original Filed Jan. 24, 1946 16 Sheets-Sheet 14

INVENTORS
E. J. RABENDA
F. J. FURMAN
BY George D. Hicks
ATTORNEY

March 6, 1951 E. J. RABENDA ET AL 2,543,935

RECORD CONTROLLED RECORDING APPARATUS

Original Filed Jan. 24, 1946 16 Sheets-Sheet 15

INVENTORS
E. J. RABENDA
F. J. FURMAN
BY George D. Hicks
ATTORNEY

March 6, 1951 E. J. RABENDA ET AL 2,543,935

RECORD CONTROLLED RECORDING APPARATUS

Original Filed Jan. 24, 1946 16 Sheets-Sheet 16

INVENTORS
E.J. RABENDA
F.J. FURMAN
BY George D. Hicks
ATTORNEY

Patented Mar. 6, 1951 2,543,935

UNITED STATES PATENT OFFICE 2,543,935

RECORD CONTROLLED RECORDING APPARATUS

Edward J. Rabenda, Poughkeepsie, and Frank J. Furman, Endicott, N. Y., assignors to International Business Machines Corporation, New York, N. Y., a corporation of New York Original application January 24, 1946, Serial No. 643,188. Divided and this application July 23, 1948, Serial No. 40,236

16 Claims. (Cl. 197—20)

This invention relates to record controlled recording apparatus, such, for example, as apparatus which operates to print character data in a preselected manner on a sheet under the control of data designations contained in one or more source records and such data designations representing both the characters to be printed and functional operations of the apparatus required to print the data in the desired manner.

The present application is a division of our copending application Serial No. 643,188, filed January 24, 1946, now issued as Patent No. 2,464,608, dated March 15, 1949.

An object of the present invention is to provide record controlled recording apparatus which is of improved construction and arrangement of parts.

A further object is to provide record controlled recording apparatus wherein a selected operation thereof is effected in response to the consecutive sensing of the same data designation a predetermined number of times.

A still further object is to provide record controlled recording apparatus which operates to eject a source record in response to the consecutive sensing of a selected data designation a predetermined number of times.

Other objects of the invention will be pointed out in the following description and claims and illustrated in the accompanying drawings, which disclose, by way of example, the principle of the invention and the best mode, which has been contemplated, of applying that principle.

Figures 14, 15:
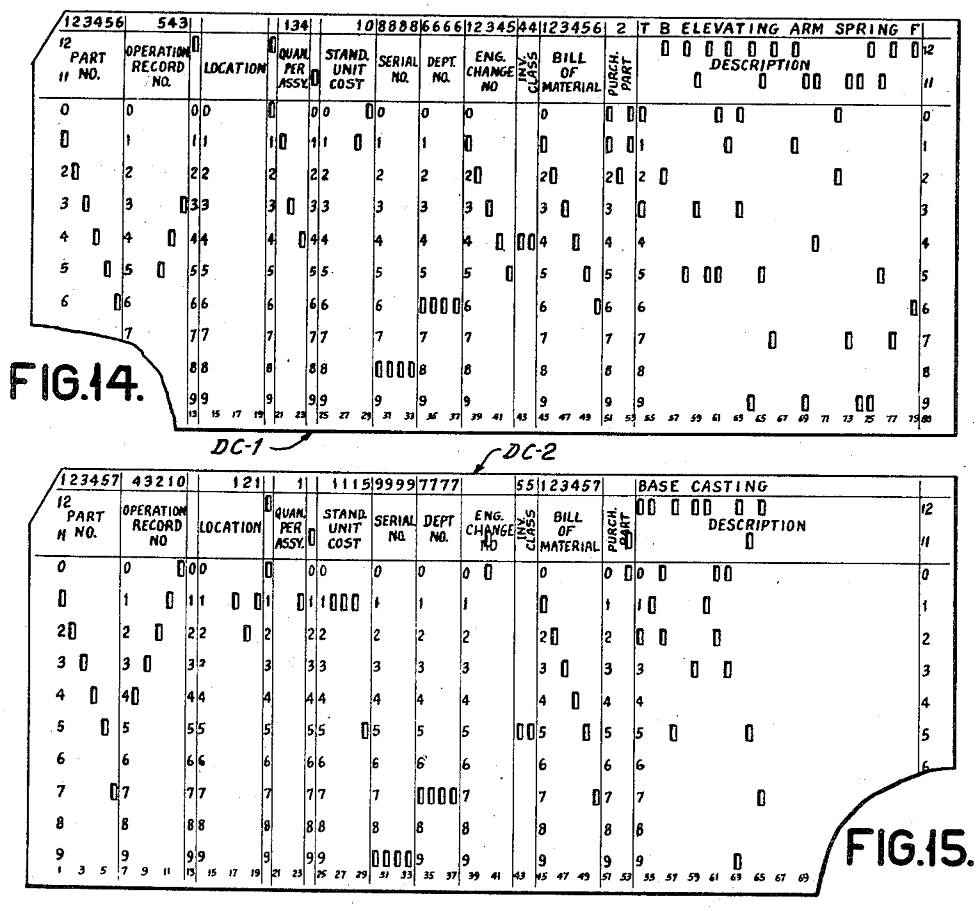
Fig. 14 is a face view of a detail record card showing certain data recorded therein as code designations, the data having been selected and the code designations thereof arranged for the purpose of disclosing the operation of the apparatus according to a typical selected problem.
Fig. 15 is a face view showing a second detail card also having certain data recorded therein as code designations and which are also used in explaining the operation of the apparatus according to the selected problem.
Figure 16:
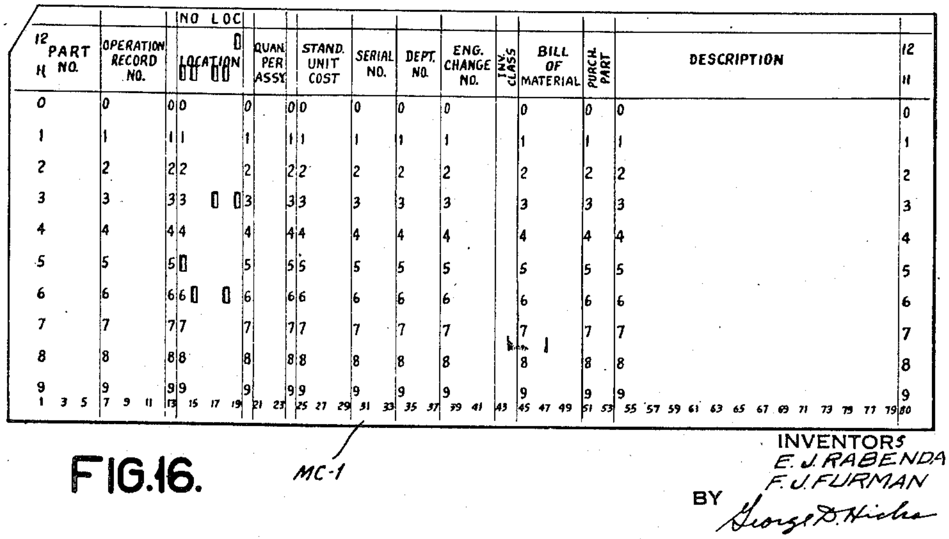
Fig. 16 is a face view of a master card having code designations of data recorded therein for the purposes of explaining the operation of the apparatus in accordance with the selected problem.
Figure 17:
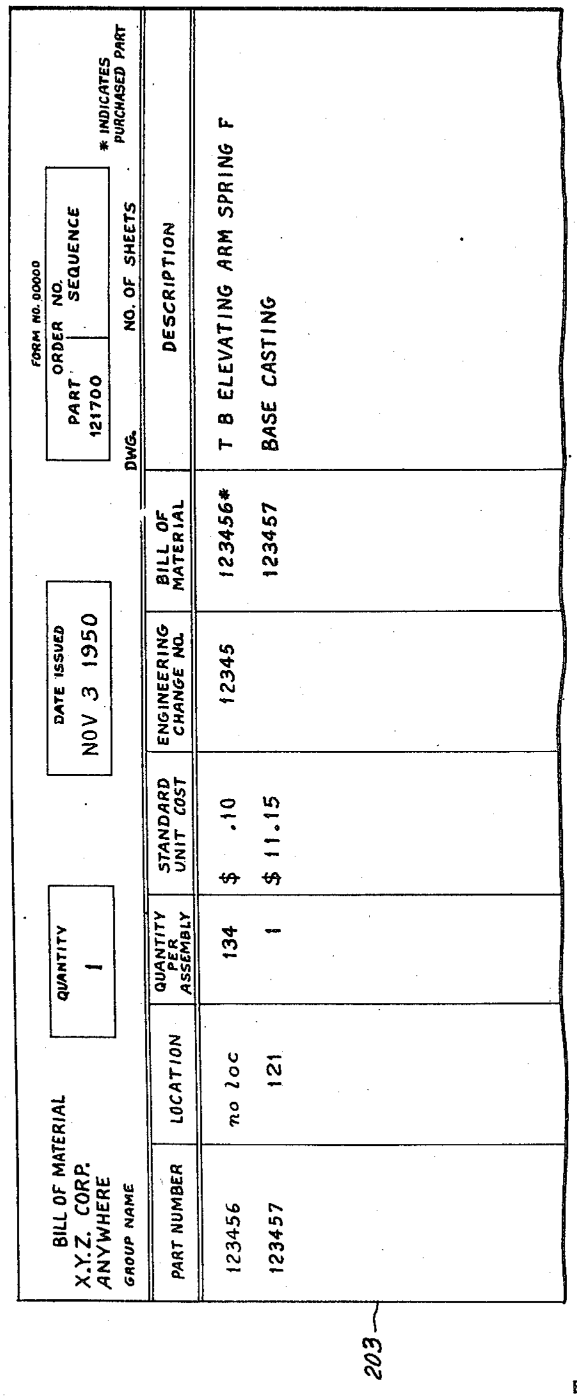
Figure 18:
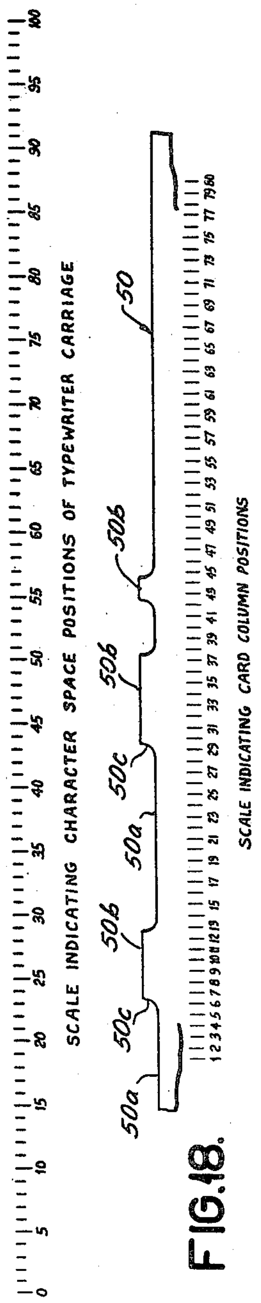
Figure 20:
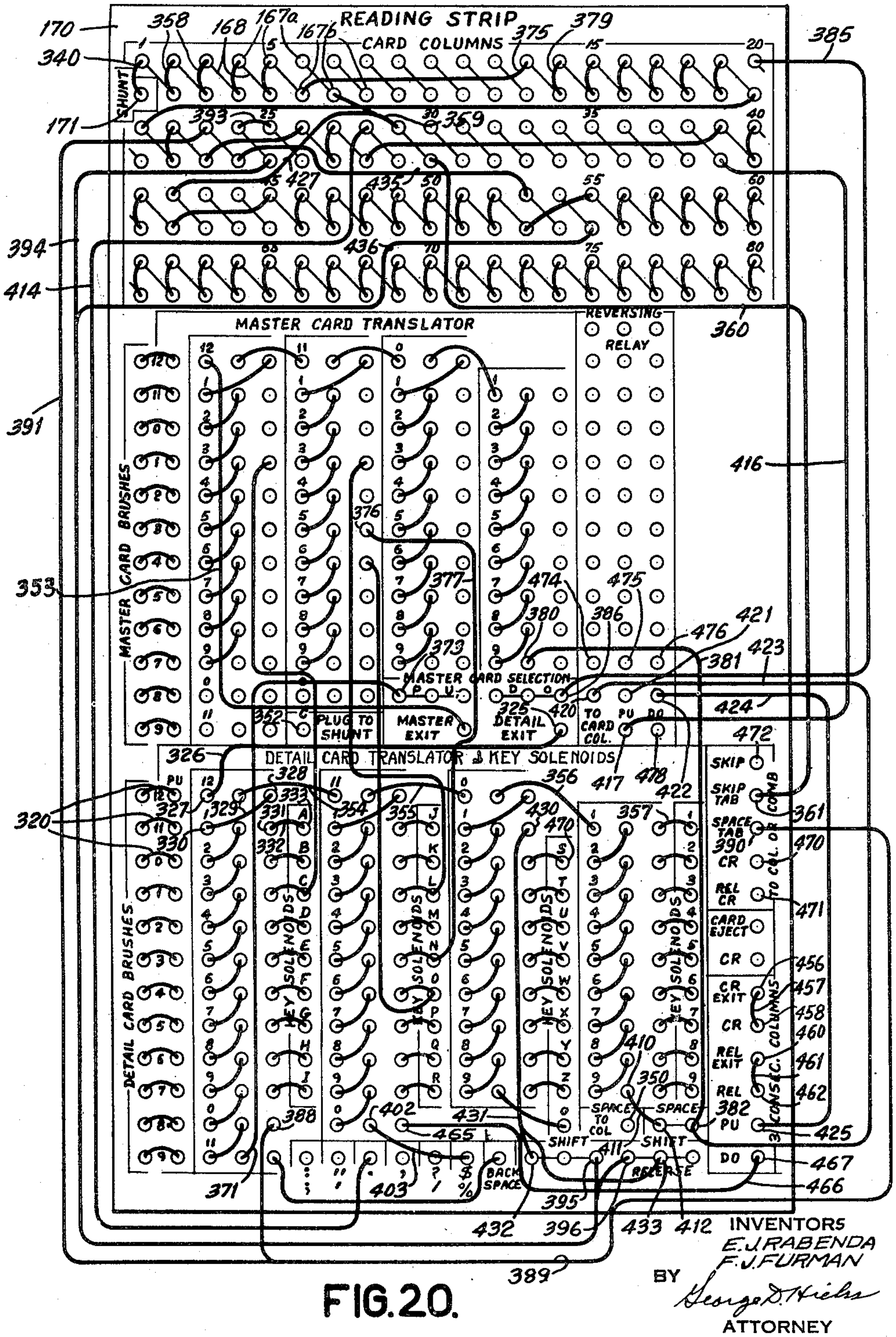

Fig. 17 is a face view of a copy sheet bearing two lines of typewritten data and illustrating the manner in which the particular data recorded as code designations in the record cards of Figs. 14, 15 and 16 are printed by the illustrative embodiment, the scale appearing along the bottom edge of the copy sheet indicating the location of the character space positions of the typewriter with relation to the typewritten matter on the copy sheet;

Fig. 18 is a fragmentary view illustrating somewhat diagrammatically the design of a skip bar which is used in controlling the operation of the record card sensing mechanism when reading the coded data on the cards of Figs. 14, 15, and 16 for the purpose of controlling the printing of such data on the copy sheet of Fig. 17; the scale appearing beneath the skip bar indicating the record column sensing positions of the card carriage with relation to the particular configuration of the skip bar;

Figs. 19*a* to 19*f*, inclusive, comprise, when arranged in sequence and in end-to-end relation, a complete wiring diagram of the record controlled printing apparatus of the present invention;

Fig. 20 shows a face view of a plugboard with a predetermined arrangement of plug connections thereon in full lines, the plug connections shown being for the purpose of effecting the operation of the illustrative embodiment when typing the particular data disclosed in Fig. 17 under the control of the record cards shown in Figs. 14, 15, and 16.

*General description*

Figure 1:
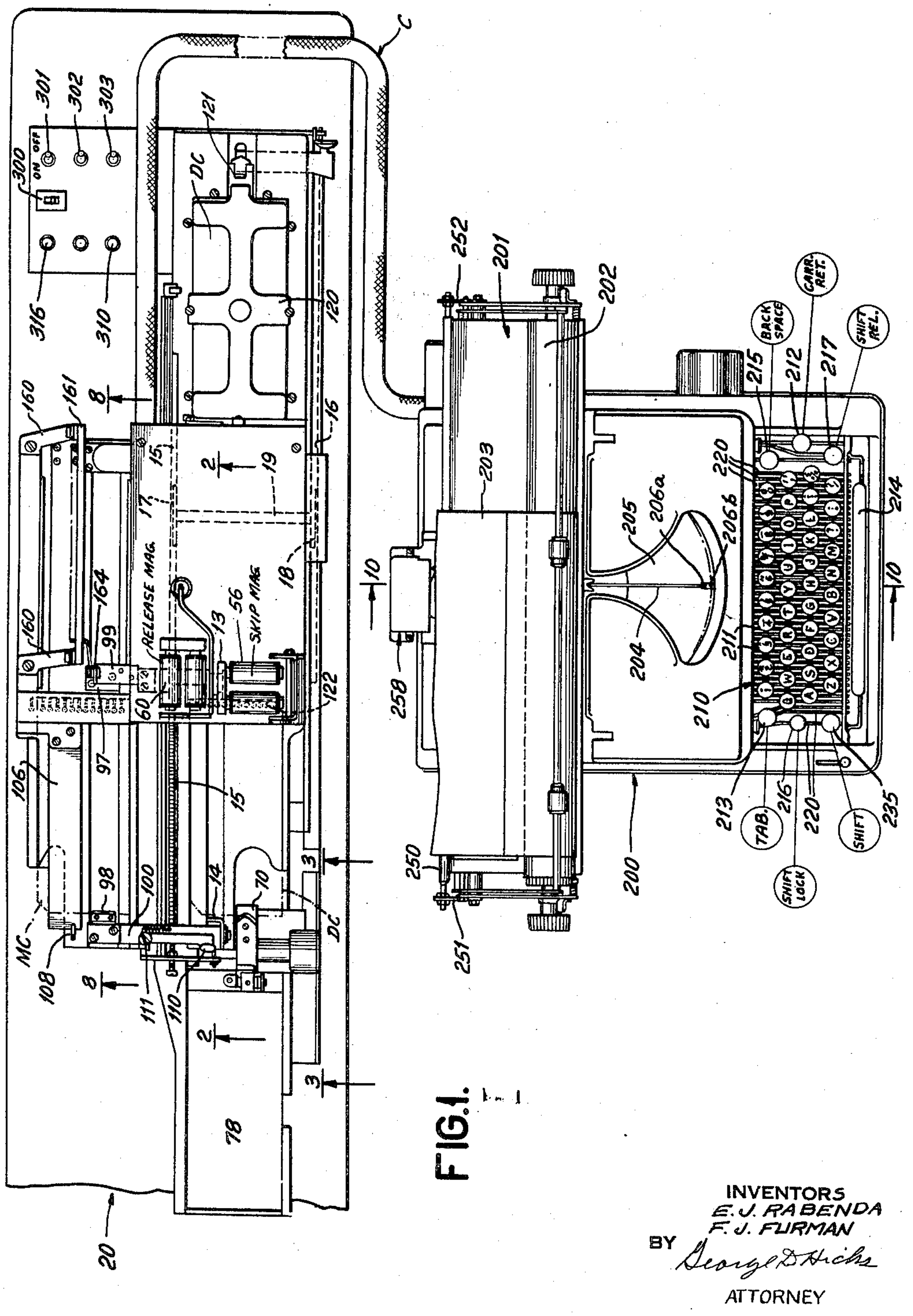
Fig. 1 is a plan view showing one preferred embodiment of record controlled printing apparatus constructed in accordance with the present invention.

According to the illustrative embodiment, shown generally in Fig. 1, the apparatus of the present invention comprises a record sensing unit indicated in its entirety by the numeral 20 and which functions to sense successively the code designations recorded in the source records. The apparatus of the present invention also comprises a suitable printing unit which is shown in Fig. 1 as a typewriter 200 and will be recognized as being of a well known commercial form. A cable C connecting the sensing unit 20 and the typewriter 200 contains necessary circuit wires for controlling the operation of the apparatus.

As will appear more fully hereinafter, the illustrative embodiment also comprises an electric translating means which is conditioned or adjusted, in response to the sensing of each code designation by the unit 20, to provide an operating circuit which when closed, effects the printign of the particular character data, or the particular functional operation, which is represented by the sensed code designation. The translating means is of the electrical relay type and does not appear in Fig. 1 because a detailed structural showing of translator relays, associated contacts and connecting circuit wires would be of very little aid in disclosing the invention. However, the elements of the translating means are more properly disclosed as a part of the complete circuit wiring diagram which is shown in Figs. 19*a* to 19*f*, inclusive, and will be described in detail hereinafter.

As will be evident from the following description, the illustrative embodiment is well adapted for a wide variety of uses. For example, the apparatus may be used to list in a preselected columnar form, statistical data of the type recorded in statistical record cards used in electrical accounting machine systems. As another typical example, the illustrative embodiment is well adapted to automatically type a letter, article or similar composition, under the control of code designations representing the component characters thereof and which have been previously recorded in record cards of the type mentioned.

Other uses of the invention will be apparent from the following description.

*The control record*

Figure 9:
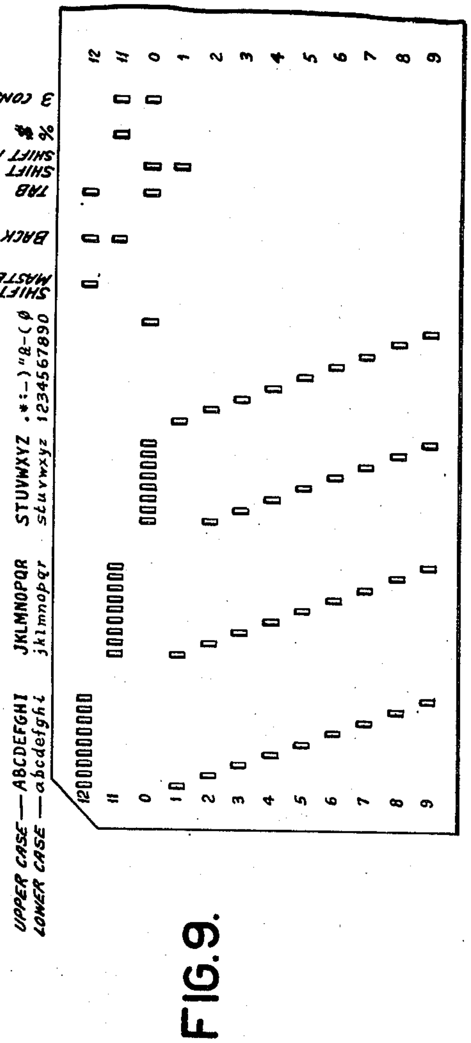
Fig. 9 shows a fragment of a record card in which is recorded all of the code designations of a selected 12-position code system used herein in explaining the operation of the illustrative embodiment.

In the preferred embodiment, the operation of the typewriter 200 is controlled by the successive sensing of code designations which have been recorded in a source record according to a predetermined code system. While it will be appreciated that, in so far as the broader aspects of the present invention are concerned, the form of the source record and the code system selected may be of any desired kind which is suitable for the purpose; the operation of the particular apparatus disclosed herein is controlled by code designations recorded in the conventional 80-column statistical record card used in the well known electrical accounting machine system referred to, and the code used is generally the same as the 12-position code commonly used in such systems. Fig. 9 discloses all of the code designations of the 12-position code used herein, and Figs. 14, 15, and 16 show three examples of statistical record cards of the type mentioned, wherein certain selected data has been recorded in accordance with the 12-position code of Fig. 9.

Figs. 14 and 15 show selected examples of source record cards which are referred to herein as "detail" cards and are designated as DC—1 and DC—2, respectively, and Fig. 16 shows an example of a source record card referred to herein as a "master" card and designated as MC—1. As will appear more fully hereinafter, both a master card and detail record cards may be used in controlling the operation of the illustrative embodiment. Each of the cards is provided with 80 vertical record columns and each column is composed of twelve index point positions. The numerals extending along the bottom of each card in Figs. 14, 15, and 16 indicate, respectively, the location of the 80 vertically disposed record columns, and the numerals extending in vertical rows designate, respectively, the twelve index point positions composing the record columns.

As stated, all of the code designations of the 12-hole code system used herein to control the operation of the illustrative embodiment are shown in Fig. 9. The twelve index point positions of the code are indicated by the vertical rows of numerals along the two side edges of the record card in Fig. 9. Numerals representing the location of the record columns have been omitted from Fig. 9. As shown, the code designations representing the various character data to be printed and the functional operations to be effected comprise one or more code holes punched in the index point positions of the record columns. The code hole designation in each record column represents a single character or functional operation. In vertical alignment with each code hole designation representing character data and above the top edge of the card in Fig. 9, appear two legends. As is apparent, the upper legend of each two is the upper case character and the lower legend is the lower case character. As will appear more fully hereinafter, when each character code hole designation is sensed a type bar carrying both an upper and a lower case character, is actuated. The type bars are mounted in a type basket which is shiftable to upper case and lower case positions. Upon actuation of a type bar with the type basket in its normal or lower case position, the lower case character on such bar is printed and with the type basket shifted to upper case position the upper case character is printed. As the upper and lower case positions of the type basket do not affect the functional operations of the apparatus, they have no significance in considering the code hole designations representing such operations.

*Record sensing unit*

The unit 20 comprises a card carriage and a means for successively feeding detail record cards into the carriage. When operating, the card carriage is moved along step-by-step to sense successively the record columns of the card in the carriage. When the operation desired requires a master card, such a card is manually placed in the card carriage and is stepped along with the detail card. Both a detail card and a master card sensing means are provided and they operate to sense simultaneously corresponding record columns in the two cards as the card carriage is stepped along. The unit also comprises a column position control means referred to herein as the "reading strip" and which is provided with eighty column reading positions corresponding, respectively, to the record columns of the cards. The reading strip functions to control preselected printing and functional operations of the apparatus at any desired card column reading position of the card carriage. The structural details of the record sensing unit will now be described.

Figure 2:
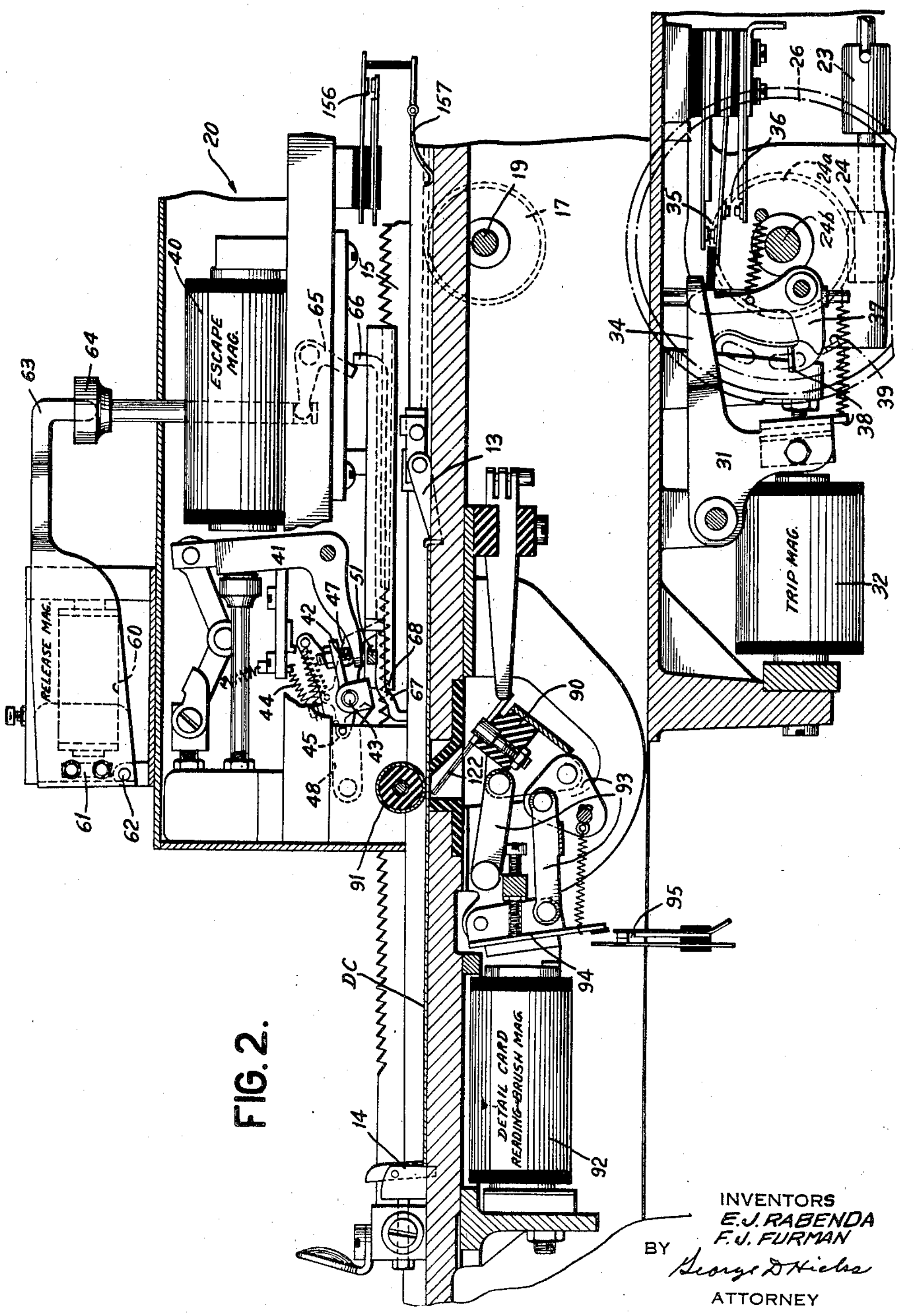
Fig. 2 is a fragmentary vertical section taken along the lines 2—2 of Fig. 1, this section being through the record card sensing mechanism.

*Detail card feeding means.*—Referring to Fig. 1, the detail record cards DC to be sensed or analyzed are placed in a magazine designated 120 from which they are advanced singly by means of a picker 121 toward the left to present their first record column to a card sensing position above the detail card sensing brushes designated 122 (also see Fig. 2). In this position, the reciprocable card carriage, comprising a pusher 13 and a forward guide 14, engages the card and advances it, step-by-step, under control of the escapement mechanism to be described later. Pusher 13 and guide 14 are carried by an escapement rack 15 which also forms a part of the card carriage, and the picker knife 121 is carried by a rack bar 16. Rack 15 has a gear 17 meshing with its lower edge (see Fig. 2) and rack bar 16 has a gear 18 (see Fig. 4) meshing with its upper edge, both gears being mounted on a cross shaft 19 (see Fig. 1). Due to this connection between the elements, the movement of rack bar 16 and picker 121 toward the left, as viewed in Fig. 1, is accompanied by movement to the right of rack 15, pusher 13, and forward guide 14. At the commencement of a card feeding operation, the picker 121 and pusher 13 are in positions as shown in Fig. 1.

The operation of card feeding just outlined is more fully explained in Patent No. 1,772,186 granted to F. L. Lee et al. for a duplicating punching machine. The escapement mechanism referred to herein is of the same general nature as that disclosed in the Schaff Patent No. 1,426,223 and a brief description thereof will be given later.

Figures 3, 4, 5:
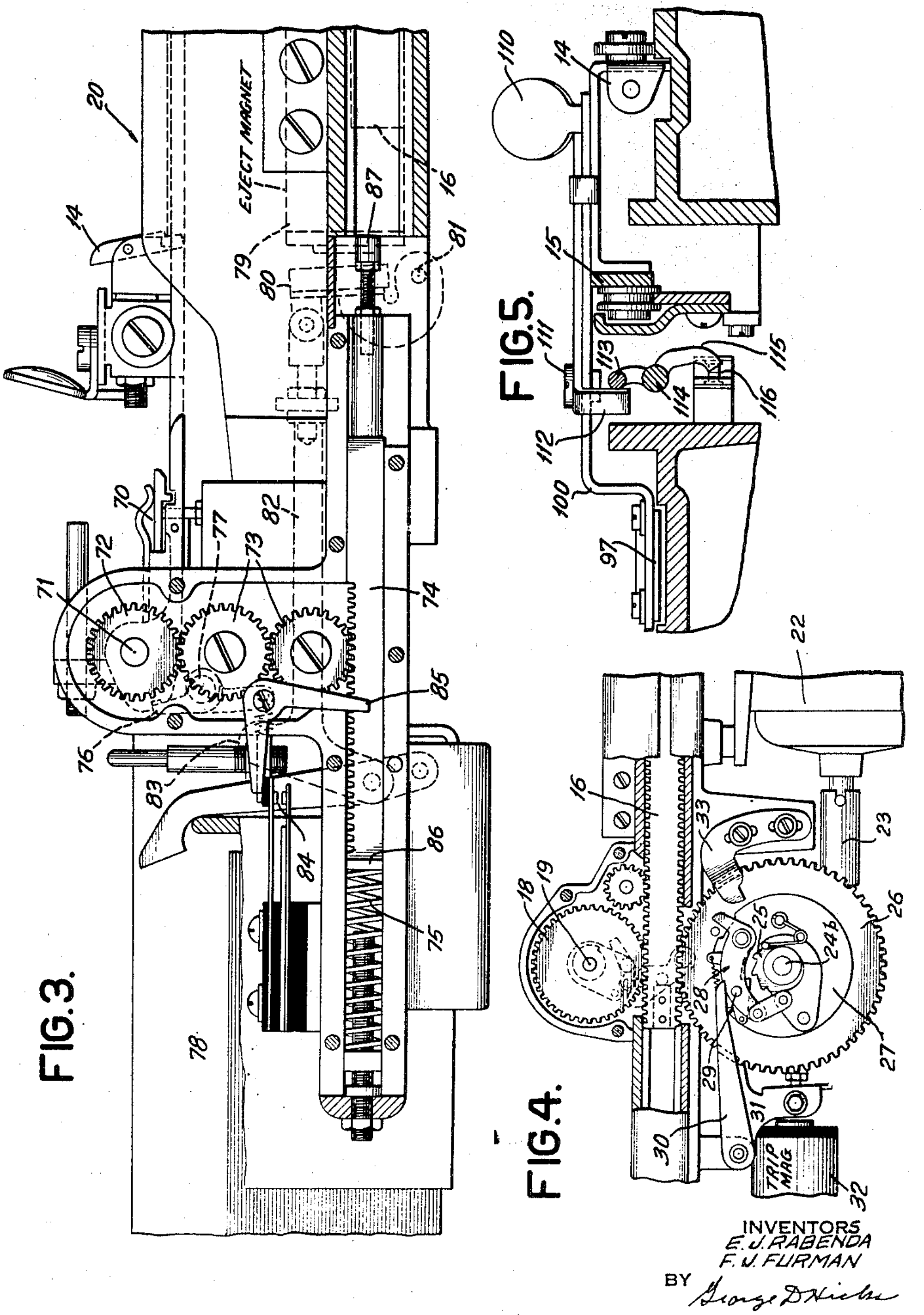
Fig. 3 is a fragmentary vertical section taken along the lines 3—3 of Fig. 1, and showing the card ejecting mechanism at the left-hand end of the sensing unit.
Fig. 4 is a fragmentary vertical section showing the details of the clutch mechanism and the related drive motor for effecting the return of the card carriage.
Fig. 5 is a fragmentary detail view showing the cutout control device of the card feeding mechanism.

Secured to the under side of the base of the machine is a motor 22 (Fig. 4) coupled to a stub shaft 23 (see Fig. 2), to which is secured a worm 24 in mesh with a worm wheel 24a secured to a shaft 24b, one end of which has secured thereto a ratchet-shaped clutch element 25. Loosely mounted on shaft 24b is a gear 26 meshing with teeth on the lower edge of rack bar 16 and on which gear is mounted a disk 27 (Fig. 4). Mounted upon disk 27 is a clutch mechanism generally designated by the reference character 28, one element of which is provided with a pin 29 positioned for engagement by a finger 30 integral with the armature 31 of a trip magnet 32. With the machine at rest, the parts occupy the position shown in Fig. 4 and, when magnet 32 is energized, the finger 30 will operate the clutching mechanism to couple the disk 27 to the rotating ratchet 25, so that the disk 27 and gear 26 are rotated counterclockwise to drive the rack bar 16 toward the left. The clutching mechanism 28 is constructed, as explained in greater detail in the patents referred to, so as to remain in engagement for substantially a complete revolution, at the completion of which time the clutching mechanism engages a fixed member 33, which effects uncoupling of the parts, whereby they may automatically return to the position shown in Fig. 4 under the influence of a spring (not shown). This power drive of rack bar 16 toward the left has the same effect as the manual movement thereof explained in said Patent No. 1,772,186, that is, a detail card DC will be advanced to sensing position and the pusher 13 will engage the same for further step-by-step advancement, and rack bar 16 may thereafter return to its home position without disturbing the advanced position of the card or pusher 13, this being permitted by the one-way clutch structure 28.

Also integral with the armature 31 of the trip magnet 32 is an arm 34 (see Fig. 2), the free end of which is adapted to bear upon the center blade of pairs of latch contacts 35 and 36 to open the former and close the latter when trip magnet 32 is energized, and they will be maintained in such shifted position by a latching bell crank 37, the lateral extension 38 of which is adapted to be engaged by a plate 39 secured to gear 26 at the termination of the driving movement of the latter. The contacts 35 and 36 are used to control the energization of the driving motor 22 and their function will be more fully explained in connection with the circuit diagram.

*Escapement means.*—When the detail card is in position above the sensing brushes 122 (Fig. 2), further advance is controlled by the escapement mechanism which in turn is responsive to the energization of escape magnet 40. Upon energization of magnet 40, its armature 41 will be rocked about a pivot in a clockwise direction and through a screw 42 secured to rod 43 will rock the rod 43 counterclockwise, as shown in Fig. 2, against the tension of a spring 44. The rod 43 is rocked as an incident to each spacing operation and has secured to one end thereof oppositely extending arms 45, 46 (see also Fig. 6), of which arm 46 is provided with a laterally extending pin for engagement with an enlarged opening in a stepping dog 47 which is loosely pivoted on rod 43. Opposite arm 45 is provided with a pin extending into a slot formed in the locking dog 48. When rod 43 is rocked (clockwise as viewed in Fig. 6, counterclockwise as viewed in Fig. 2), arm 46 will, through its pin and slot connection with dog 47, lift the latter out of one of the notches of the rack 15 and at the same time arm 45 will depress locking dog 48 into a notch between the rack teeth. At this time a spring 49 advances the loosely pivoted dog 47 a short distance just sufficient to permit this dog to move above the top of the next tooth. When the locking dog 48 is again raised due to the deenergizing of magnet 40, stepping dog 47, due to the movement of rack 15, will ride down along the next tooth until it strikes the end thereof and the carriage is thereby arrested. The usual spring drum (not shown) is provided to bias the rack 15 toward the right, as viewed in Fig. 6. The detailed structure of this dog and rack arrangement is well known and need not be further described, and it is sufficient to note that for each operation of the escape magnet 40, the rack 15 is advanced one step or tooth, carrying with it the pusher 13 and the forward guide 14, so that the card is likewise advanced one step, each step of advancement being coextensive with the columnar spacing of the columns of the card.

Figure 6:
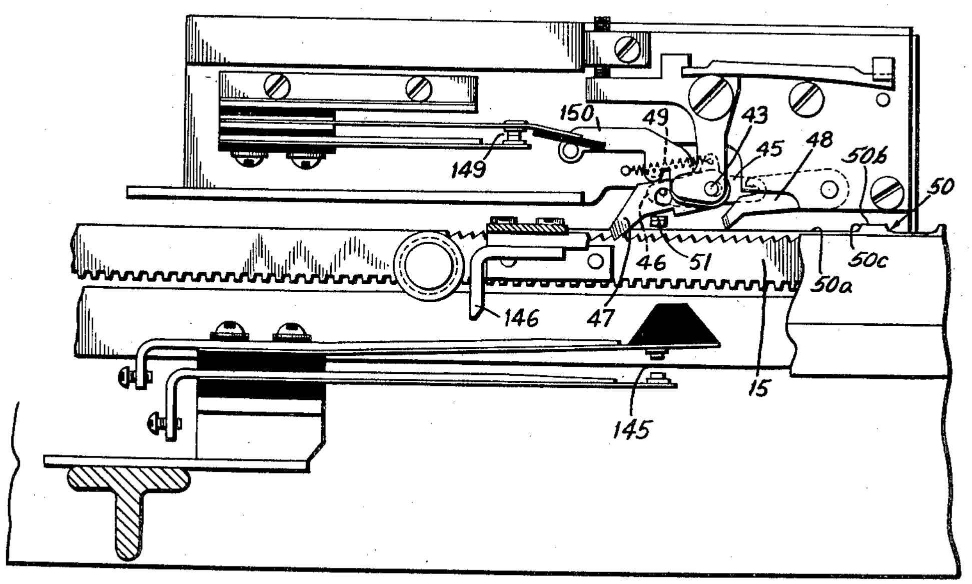
Fig. 6 is a fragmentary view showing the details of the card carriage escapement mechanism.
Figure 7:
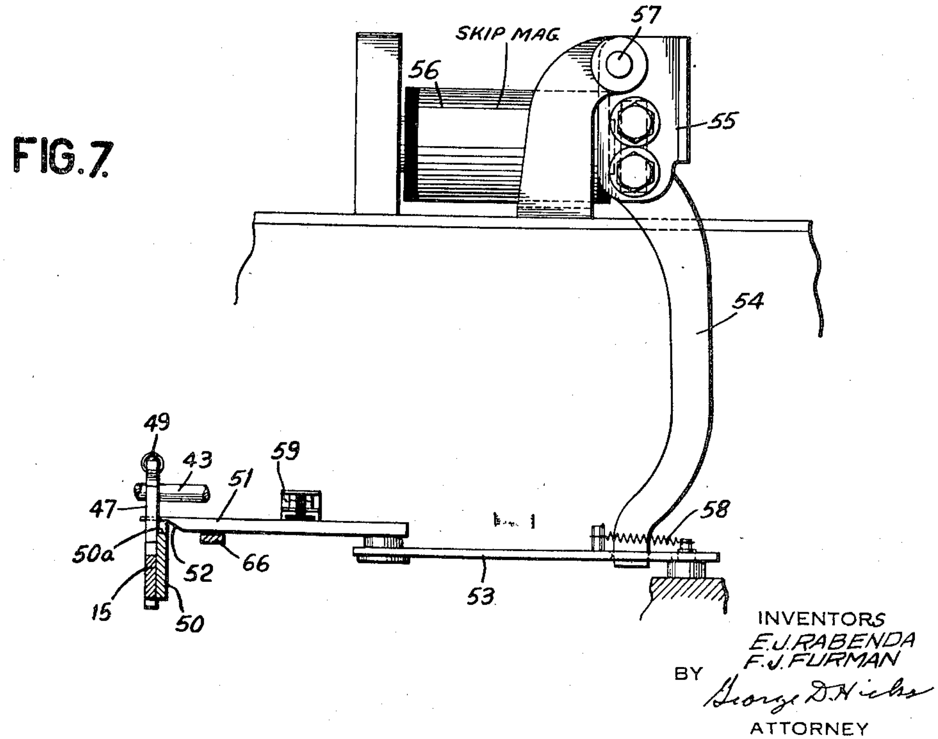
Fig. 7 is a detail view showing the skip magnet and the mechanism controlled thereby.

*Skip control means.*—The machine can be provided with the usual skip bar indicated at 50 (Figs. 6, 7, and 18) which is removably attached to the escapement rack 15 at one side thereof and provided with suitable notches 50*a* and high portions 50*b* separated by cam surfaces 50*c*, which cooperate with the usual skip lifter arm 51 which has a beveled end 52 (Fig. 7). The function of this skip bar 50 is to effect skipping of the card carriage and card over the record columns or fields which are not to be sensed. The right-hand end of the lifter 51 (see Fig. 7) is connected to the left-hand end of a slider 53 and the right-hand end of the latter is provided with an opening into which the free end of a finger 54 extends. This finger is integral with armature 55 of skip magnet 56, the armature being pivoted at 57. With this arrangement, energization of magnet 56 will cause lateral shifting of skip lifter 51. Upon energization of magnet 56, the parts are returned to normal position by a spring 58. The left-hand end of the lifter 51, as viewed in Fig. 7, lies under the escapement dog 47 and upon energizing the skip magnet 56 the lifter 51 is moved toward the left and the beveled portion 52 thereof will engage the bar 50 and thereby cam the lifter 51 upward. If a notch portion 50*a* lies opposite the lifter when the magnet 56 is energized, the upward movement of the left-hand end of lifter 51 will not be sufficient to engage the dog 47; but, if a high portion 50*b* lies opposite the lifter, the latter will be raised high enough to engage the dog 47 and lift the latter out of engagement with the rack 15 and thereby effect skipping movement of the card carriage which will continue until the lifter 51 falls within the next notch 50*a*. Thus, the skip bar 50 will be so formed, or cut, that a high portion 50*b* will lie opposite the lifter 51 when the card carriage is in the card column reading positions which are intended to be skipped. An effective and preferable manner of controlling a skipping operation, is to energize the skip magnet 56 while the card carriage is at the column reading position immediately preceding the group of columns intended to be skipped. This will result in the lifter 51 being moved laterally over the top of the bar at a notch 50*a* which will require a relatively small amount of force to be exerted by the skip magnet 56. With the parts in this position, the energizing of the escape magnet 40 at the end of the sensing operation will raise the dog 47 in the manner previously described to effect an escape movement of the card carriage. As the card carriage moves to the next reading position, the lifter 51 will first engage a cam surface 50*c* and then a high portion 50*b*, which will result in the lifter 51 being raised still higher and thus engage the dog 47 and prevent the dog 47 from reengaging the rack 15 and stopping movement of the card carriage. The skipping movement will continue until the next notch 50*a* is reached, where the lifter 51 will move to a lower position and thereby permit the dog 47 to engage the rack and stop the card carriage. Located above skip lifter 51 is a pair of contacts 59 which are opened when the lifter arm 51 is raised by virtue of engagement with a high portion 50*b* of skip bar 50. The contacts 59 are referred to hereinafter as the "skip lifter" contacts and the purpose of these contacts will be fully explained in connection with the circuit diagram.

*Release control means.*—A further means by which the card may be advanced is controlled by a release magnet designated 60 (Fig. 2) which, when energized, will rock its armature 61 about pivot 62 causing the free end of an internal finger 63 to depress a vertical rod 64 shown as being in the shape of a key. The mechanism controlled by this rod or key 64 is well known in this type of machine and is briefly as follows. When the rod 64 is depressed, the lower end thereof rocks a bell crank 65 and thus slides a member 66 toward the right as viewed in Fig. 2. This member 66 is suitably mounted for such movement, and is provided at its left-hand end with a cam surface 67 which coacts with the edge 68 of the supporting plate. The member 66 also extends beneath the skip lifter 51 in a position generally as indicated in Fig. 7, so that as the member 66 is moved toward the right (Fig. 2), cam surface 67 engaging plate 68 will cause an upward tilting of the left end of the member 66 which in turn will lift the skip lifter arm 51 upward and against the stepping dog 47, whereupon the rack 15 and card carriage will be free to advance uninterruptedly toward the left. Frictional engagement of the parts will maintain the member 66 in its shifted position so that the escapement of the rack, when initiated by the release magnet 60, will not be interrupted until the card has been fully advanced, that is, until the last or 80th card column is advanced to the sensing position. At this time a suitable projection carried by the rack will engage a depending extension of the left extremity of member 66 and will slide the member toward the left and back to the position it occupies in Fig. 2.

Briefly summarizing the foregoing, it is noted that after the detail card has been initially advanced to present the first card column to the detail card sensing brushes 122, its further advance is controlled to provide a column-by-column stepping movement through the escape magnet 40. Multiple column advancement is controlled through the skip magnet 56 in cooperation with the skip bar 50, and the complete release of the card from any position to its last column position is controlled by the release magnet 60.

*Automatic detail card ejecting means.*—The machine is provided with mechanism for automatically removing the sensed detail cards and depositing the same in a receptacle provided for the purpose. This mechanism is more fully shown and described in Patent No. 1,916,965 issued July 4, 1933, to J. M. Cunningham. Briefly, a gripper 70 occupies the position shown in Fig. 3 with its jaws open in card receiving position during the period that the card is advanced step-by-step by the escapement mechanism. The gripper is carried by the rod 71 to which is secured a gear 72 which through idlers 73 is connected to a slidable rack 74 which is normally biased toward the right by a spring 75. A pivoted latching member 76 engages a latching shoulder at the left-hand extremity of the gripper and thereby serves to hold the parts in the position shown in Fig. 3. When the latching member 76 is rocked counterclockwise about its pivot 77, the spring 75 will be free to drive the rack 74 toward the right and through the gearing 73 and 72, flip the gripper 70 in a counterclockwise direction. This flipping action is effected after the card has been advanced to its extreme left-hand position, at which time the leading edge thereof is between the jaws of the gripper. Releasing the gripper will cause the jaws to automatically clamp the end of the card thereto so that the card will be swung in an arc about the rod 71 and deposited in the receptacle 78, suitable means being provided to cause the jaws to release the card.

For the purpose of actuating the latch member 76 there is provided the usual eject magnet 79 which, when energized, will rock its armature 80 about pivot 81 and draw a link 82 toward the right. The left extremity of the link is provided with an extension 83, which, when the link is moved, will strike a depending arm of the latch member 76 and effect the above-described rocking action thereof which results in the ejection of the card by the gripper. This ejecting operation will bring about the automatic feeding of another card from the magazine 120 into position to be sensed by the brushes 122. The latter operation is initiated by means of a pair of automatic start contacts designated 84 (referred to hereinafter as the "auto start" contacts) which are closed through a pivoted bell crank 85, a depending arm of which is engaged by a lateral extension 86 of the rack 74 when the rack has been released for movement toward the right.

In a manner to be explained in connection with the circuit diagram, the auto start contacts 84 close a circuit through the trip magnet 32 and thereby control the operation of the driving motor 22 which, as explained, will cause advance of a new card from the magazine 120 and also cause movement toward the right of the card carriage including the card pusher 13 and forward guide 14. As the rack 16 is moved toward the left, its left-hand end will engage an adjustable extension 87 carried by the rack 74 and will thereby positively restore the rack 74 toward the left and through the gearing shown will return the gripper to the position it occupies in Fig. 3, the latch member 76 being spring-biased to engage and hold the gripper in such position until the newly advanced card has been sensed and advanced to its last column position, whereupon the above described automatic ejection and initiation of a new card feeding operation will take place.

*Detail card sensing means.*—The detail card sensing brushes 122 are shown in Fig. 2. There are provided twelve of these brushes positioned side-by-side, there being one for each of the usual twelve horizontal rows of index point positions of the card. The brushes 122 are mounted in an insulating brush holder 90 which is mounted so that the brushes 122 are given substantially a vertical movement upwardly, from the position shown in Fig. 2, to contact the card and effect electrical connections through the perforations therein with a common contact roller 91. The upward movement of the detail card reading brushes 122 is effected by the detail card brush magnet 92 which, when energized, will cause the brushes 122 to move upwardly through linkage generally designated 93. This mechanism is of the usual construction and a detailed description thereof may be found in the patents referred to. Its purpose is generally to maintain the brushes in their lower position, when they are not actually sensing perforations in the card, and thereby preserve them against undue wear and also against damage by any inadvertent backward movement of the record cards. The armature 94 of magnet 92 is arranged when attracted by the magnet to open a pair of contacts 95, the function of which will be explained hereinafter in connection with the circuit diagram.

Figure 8:
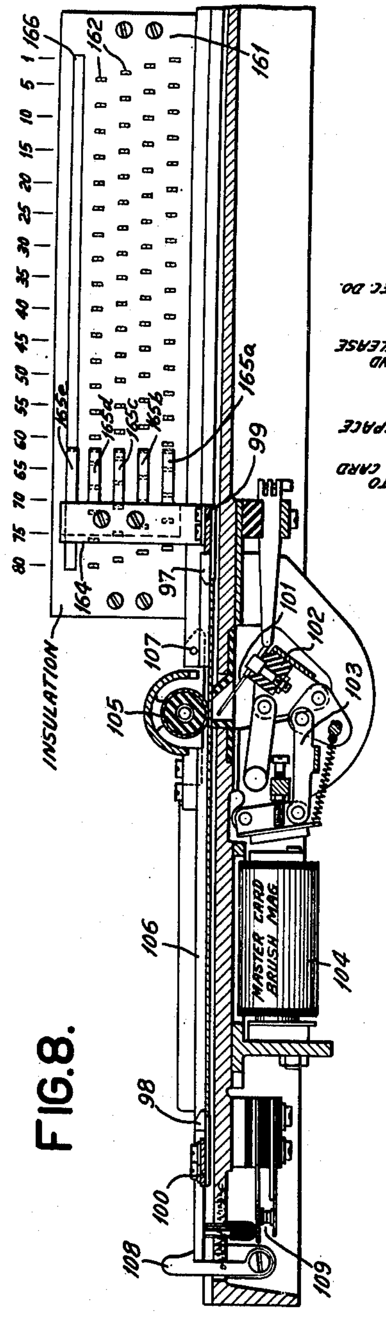
Fig. 8 is a fragmentary vertical section taken on the lines 8—8 of Fig. 1 and showing the sensing mechanism for a master card and also showing the reading strip for effecting certain control operations at selected card column reading positions, the scale appearing above the reading strip representing the different card column reading positions.

*Master card sensing mechanism.*—Referring to Figs. 1 and 8, a master card designated MC may be placed in the machine in parallel alignment with the detail cards DC. The card MC is held in position between a pushed 97 and a forward guide 98 which are carried by cross arms 99 and 100, respectively, which arms extend from the escapement rack 15 (see also Fig. 5). The master card MC is manually placed in position and travels back and forth with the card carriage. The operation is such that the master card is advanced step-by-step past a set of master card reading brushes 101 for each of the successively fed detail cards DC, and as each of the columns of the detail cards DC pass their sensing brushes 122, the corresponding card columns of the master card MC concurrently pass their sensing brushes 101. As in the case of the detail card, there are provided twelve sensing brushes 101 for sensing the twelve rows of index point positions of the master card. The brushes 101 are mounted on an insulating block 102 and are moved vertically into contact with the card MC through linkage generally designated 103 which is controlled by the master card brush magnet 104. The cooperating contact arm or roller 105 is supported in the gate or door 106 which is pivoted at 107 and which, when the master card MC has been placed in position, is rocked downwardly into closed position, where it is held by a spring-pressed latch 108. The parts are shown in their closed position in Figs. 1 and 8. The free end of the gate is provided with a plunger which effects closure of so-called "door" contacts 109.

*Manual back-spacing means.*—Referring to Figs. 1 and 5, there is mounted on the cross arm 100 a finger piece 110 pivoted at 111 (see also Fig. 1) which finger piece also has a depending arm 112. When it is desired to manually backspace the cards, it is done by pressing against the finger piece 110, whereupon a slight rocking thereof is effected before the card carriage actually moves. During this slight rocking, the extension 112 will rock a universal bar 113 about its pivot 114 to cause a depending arm 115 thereon to open the so-called "cut-out" contacts 116. These contacts are located in both the master and reading brush magnet circuits and are provided to insure that these magnets are deenergized and their related brushes in down position before there is any backward movement of the cards which might injure the brushes.

*Miscellaneous contact means.*—Several contacts in addition to those described are provided in the machine, and the operation of these will be pointed out before the entire operation of the apparatus is explained in connection with the circuit diagram.

In Fig. 6 is shown a pair of contacts 145 known as the "last column" contacts. These contacts are closed by a downwardly extending arm 146 secured to the escapement rack and so located that, when the escapement rack is advanced to the position in which the last column of the detail card is presented to the card reading brushes, the extension 146 will be in engagement with and close contacts 145. Also in Fig. 6 are shown the "floating cam" contacts 149, one blade of which is shifted by an arm 150 which is loosely pivoted on the rod 43 and which has a lateral extension resting upon the upper edge of the stepping dog 47 so that during escapement from one column to another the incidental raising of the stepping dog 47 through arm 150 will cause opening of contacts 149 during the period that the dog is raised. In Fig. 2 there is shown a card lever 157 lying in the path of the record card as it passes from the magazine to the #1 column sensing position. When a card is fed from the magazine, the card lever 157 is rocked to close a pair of suitably disposed "card lever" contacts 156.

*Reading strip control means.*—Suitably mounted on fixed brackets 160 (Figs. 1 and 8) and extending upwardly from the rear of the main supporting frame of the card reading unit, is a plate 161 of insulating material, and extending through suitable openings provided in the plate 161 are a plurality of contact inserts 162 formed of suitable electrically conducting material. The contacts 162 are arranged in four horizontal rows of twenty contacts each, there being a contact insert 162 corresponding to each of the 80 record columns of the cards. The scale above the plate 161 in Fig. 8 indicates the card columns which correspond to the inserts 162. Mounted on the cross arms 99 of the card carriage is an upstanding bracket 164 which carries five brushes 165*a*, 165*b*, 165*c*, 165*d*, and 165*e*, respectively. The bracket 164 and the brushes are formed of electrically conducting material. The four brushes 165*a* to 165*d* inclusive are spaced so that they will engage respectively with the four rows of contact inserts as the card carriage is moved from one extreme position to the other. The fifth brush 165*e* continually engages a common contact strip 166 also extending through the vertical plate 161 and being coextensive in length with the rows of contact inserts 162.

The arrangement of the elements of the reading strip and the function thereof will be apparent from an examination of Fig. 8. With the card carriage at the extreme right-hand position of Fig. 8, which is the position where the #1 column of each of the master cards and detail cards is in the position to be read, the brush 165*a* will engage the right-hand contact insert 162 of the bottom row and thereby electrically connect such insert and the common strip 166. It will be apparent that, in this position, none of the other brushes 165*b*, 165*c*, or 165*d* will contact inserts 162 of their respective rows. Likewise, when the card carriage escapes to the reading position for the #2 record column of the cards, only brush 165*b* will engage an insert 162 which will be the right-hand insert of the row next to the bottom, and when the card carriage escapes to a reading position for card column #3 only the right-hand insert 162 of the third row from the bottom will be engaged and this by the brush 165*c*. From this explanation it will be obvious that the spacing of the inserts is such that for each of the eighty column reading positions of the card carriage, a corresponding insert 162 is electrically connected to the common strip 166.

Figure 19A:
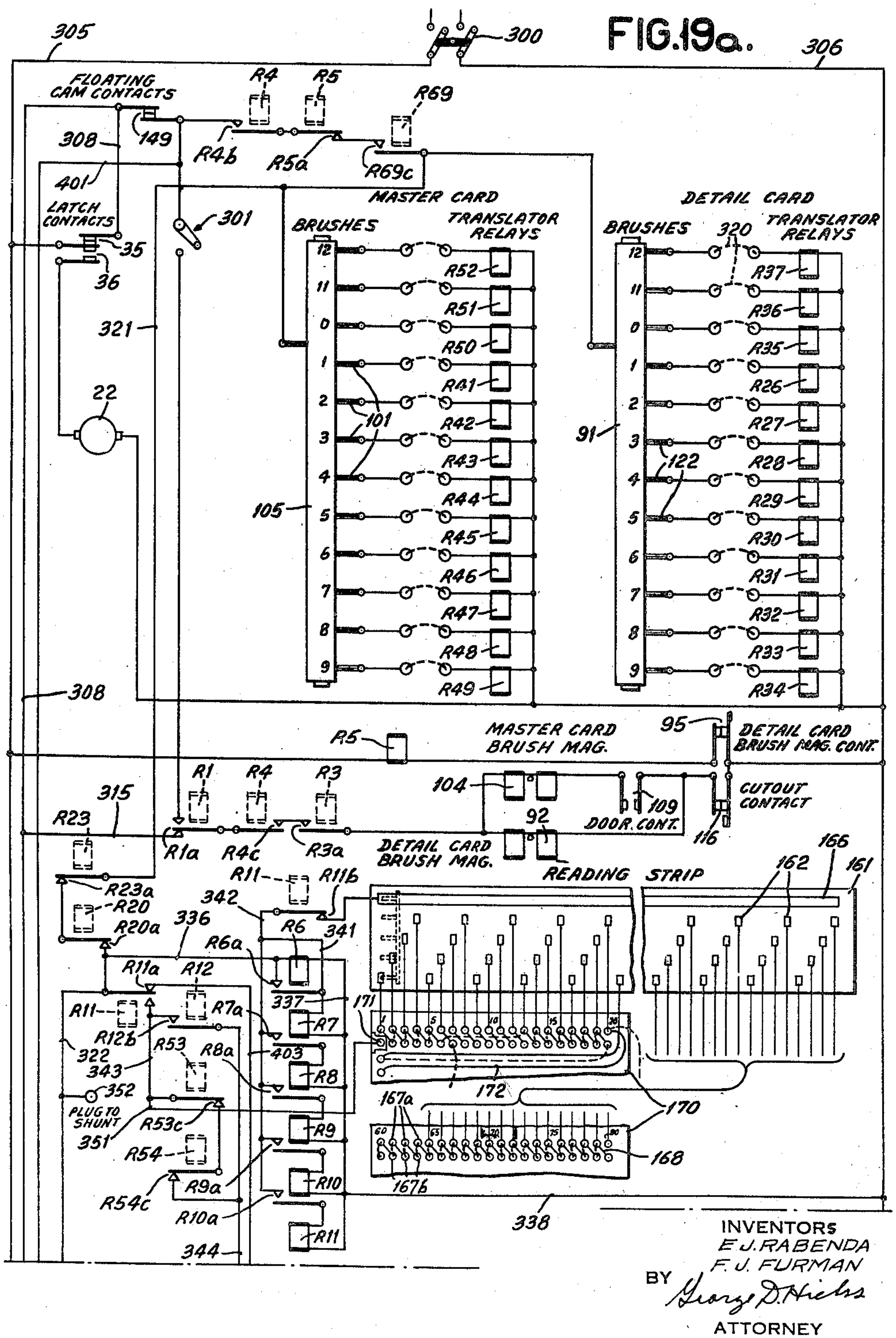

As will be explained more fully hereinafter in connection with the wiring diagram, each contact insert 162 is electrically connected to a corresponding pair of plughubs 167*a*, 167*b*, respectively, of a plugboard 170. A number of the plughubs 167*a*, 167*b*, their related inserts 162 and wiring connections are indicated diagrammatically in Fig. 19*a*, and the complete set of pairs of plughubs is shown at the top of the plugboard in Fig. 20. It is noted that in Fig. 19*a*, the rear or reverse side of the vertical plate 161 is shown, which is the side opposite to that shown in Fig. 8. Thus, the arrangement of inserts 162 as they appear in Fig. 19*a* is in reverse order with respect to their arrangement in Fig. 8. The arrangement in Fig. 19*a* is the same as that of the corresponding plughubs 167*a*, 167*b* in Fig. 20. The reading strip and plugboard connections provide a means for selectively controlling operations of the illustrative embodiment from the different reading positions of the card carriage, as will be more fully explained hereinafter.

As shown in Fig. 20, the plughubs 167*a* and 167*b* of each pair are arranged diagonally with respect to one another and the hubs of each pair are permanently interconnected by a wire 168. The plughubs 167*a* are arranged in four horizontal rows, as shown, and the plughubs 167*b* are also arranged in four horizontal rows and are disposed alternately with respect to the rows of hubs 167*a*. A shunt plubhug 171, the function of which will be explained hereinafter, is disposed at the left-hand end of the top row of plughubs 167*b*. As is obvious, the numerals appearing along the top of the four rows of plughubs 167*a* indicate the card reading positions occupied by the card carriage at the time the corresponding hubs are connected electrically to the common strip 166 through their related contact inserts 162, brushes of the group 165*a* to 165*d* and brush 165*e*. In other words, when the card carriage is in position to read the #1 record column of the records, the left-hand plughub 167*a* in the top row in Fig. 20, which is the one beneath the numeral "1," is connected electrically to the common contact strip 166; and likewise, when the card carriage escapes to the #2 column reading position, the next plughub 167*a*, which is the one at the right of the hub 167*a* beneath the numeral "1," will be electrically connected to the common strip 166; and this same relation exists between the remaining seventy-eight hubs 167*a* and their related column reading positions of the card carriage. It is also noted that in Fig. 20 the plug hubs 167*a* corresponding to column reading positions "20," "40," and "60" are arranged at the right-hand ends of their respective rows and that the plughubs 167*b* corresponding to these same reading positions are located at the left-hand end of their respective rows. It will be readily appreciated that a permanent wiring connection, not shown in Fig. 20, connects these three plughubs 167*a* with their related hubs 167*b*. In Fig. 19*a* of the drawings, one of these permanent wiring connections is indicated at 172 and is shown connecting the hubs 167*a* and 167*b* corresponding to column reading position "20."

*The typewriter*

While in so far as certain of the broader aspects of the invention are concerned, it may be considered as being applicable to any ordinary typewriter or other suitable form of transcribing machine, the illustrative embodiment is disclosed as comprising a well known commercial form of power driven typewriter 200, the operating principles and structural features of such typewriter being fully disclosed in a number of U. S. patents including Patents Nos. 1,777,055, granted September 30, 1930, and 1,873,512, granted August 23, 1932.

Figure 10:
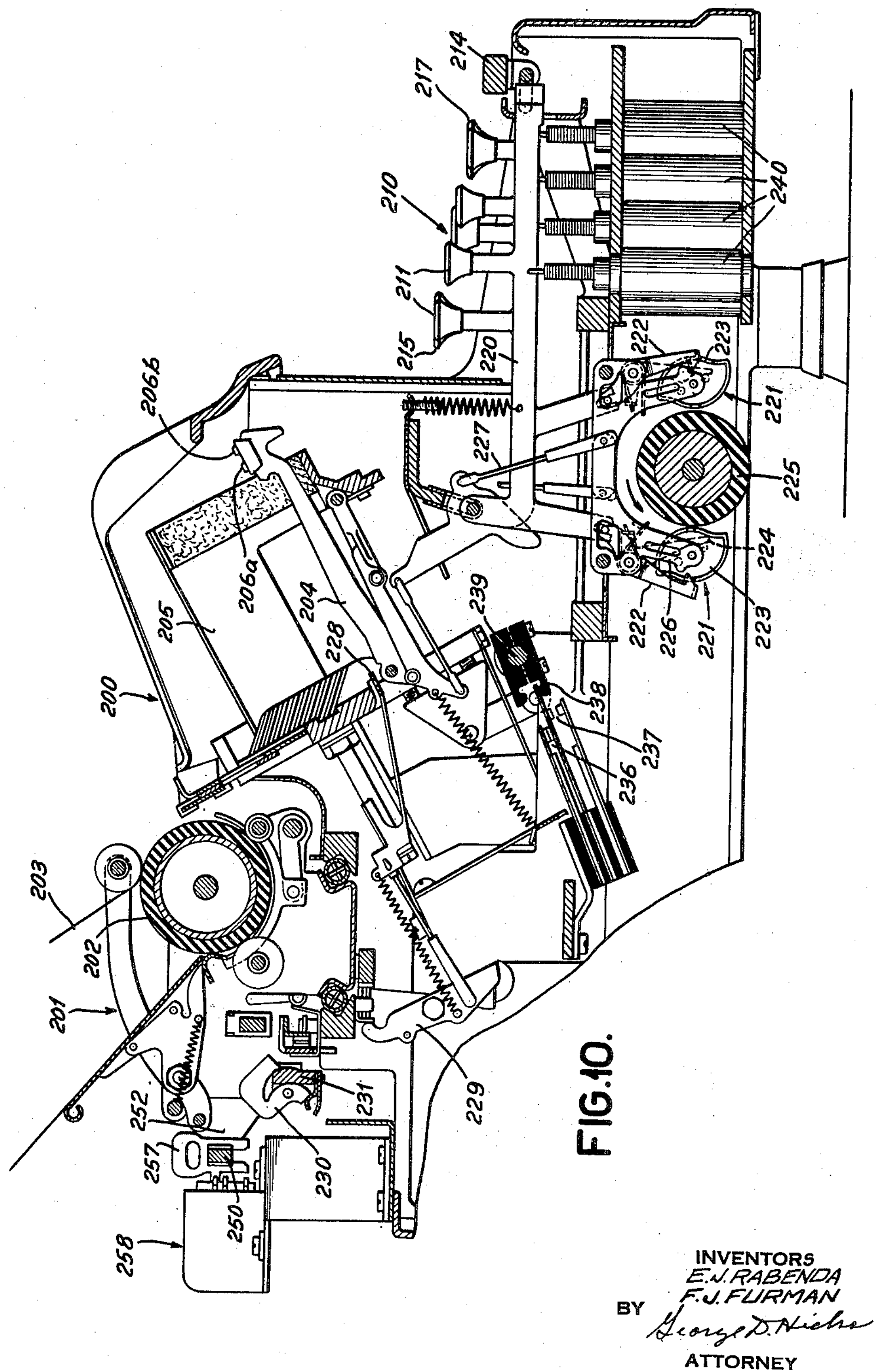
Fig. 10 is a transverse vertical sectional view through the typewriter, the section being taken on the section line 10—10 of Fig. 1.

As shown in Figs. 1 and 10, the typewriter 200 comprises a laterally movable carriage 201 on which is mounted the usual platen 202 for supporting a copy sheet 203 in printing position. The type bars 204 are pivotally mounted in a type basket 205 and each type bar carries a lower case type element 206a and an upper case element 206b. The type basket 205 normally occupies its lower case position where, when a type bar is actuated, the lower case element 206a is printed on the sheet 203. In a manner well understood by those skilled in this art, the basket 205 may be shifted to its upper case position and in such position an actuated type bar will effect printing of its upper case character 206b.

The typewriter 200 also comprises a keyboard 210 including the usual complement of character and functional keys. The character keys are indicated by the numeral 211, the carriage return key by 212, the tabulating key by 213, the bar 214 is the space key, the key 215 is the back space, the key 216 is the shift lock key, and the key 217 the shift release key. Each key is mounted on a key lever 220 and when depressed effects the printing of the corresponding character or functional operation in a manner well known to those skilled in this art.

Briefly, referring to Fig. 10, depression of a character key 211 effects operation of a cam unit 221 by releasing a latch 222 from a cam 223, thereby permitting a spring-pressed lever 224 to move the cam against the periphery of a continuously rotating motor-driven shaft 225. The cam is rotated by frictional contact with shaft 225 causing the carrier 226 of the cam to rock in a direction for pulling a link 227, which, through a suitable link-and-lever arrangement, propels a corresponding type bar 204 toward the platen 202 to effect printing of the character denoted on the operated character key. During the final increment of movement of the type bar 204, it strikes a universal bar 228 to actuate through suitable linkage an escapement lever 229 for releasing the escapement mechanism and thereby to effect a carriage spacing movement.

Depression of the space bar 214 similarly results in downward movement of a key lever 220 to effect operation of a cam unit 223 and thereby operate suitable linkage for actuating the escapement lever 229 to cause a character or letter space operation not disclosed in detail herein, but fully disclosed in the above mentioned Patent No. 1,873,512.

Depression of the back space key 215 operates a cam unit 223 to effect the backward spacing of the typewriter carriage 201 one character space position and in a manner not disclosed herein, but which is fully disclosed in U. S. Patent No. 1,873,553 granted August 23, 1932.

The carriage return mechanism operated by depressing the key 212, is of the type disclosed in U. S. Patent No. 2,104,559 granted January 4, 1938 and No. 1,753,450 granted April 8, 1930. As is usual, the carriage return movement is accompanied by a line spacing operation. After the carriage has been returned and a single line spacing operation effected as an incident thereto, a repeated depression of the carriage return key merely causes an additional line space operation.

Figure 11:
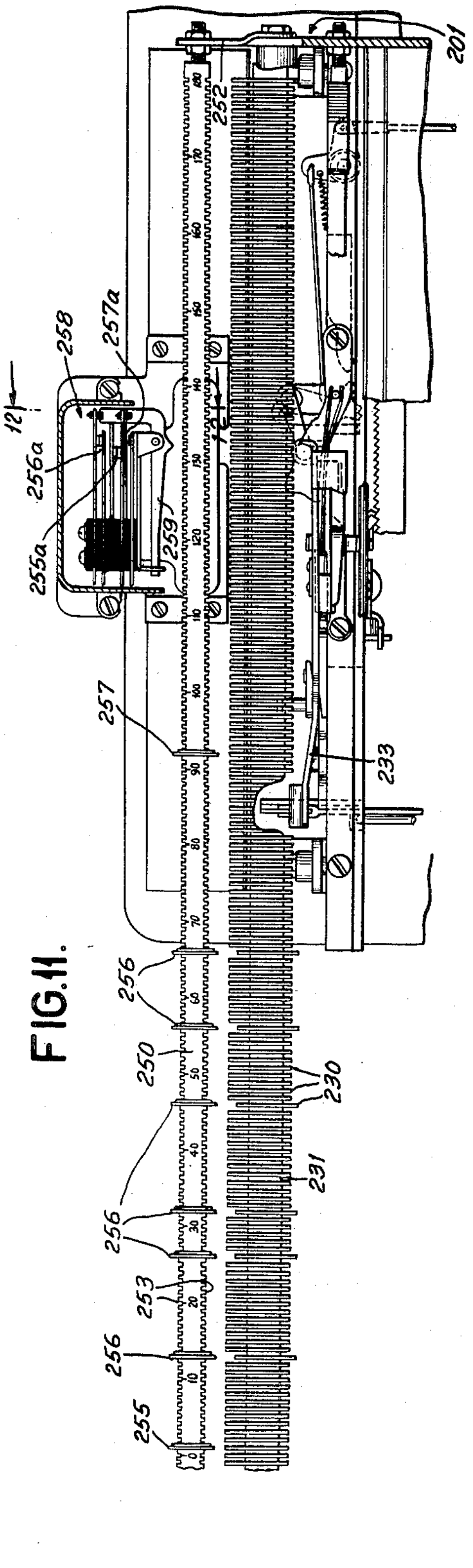
Fig. 11 is an enlarged plan sectional view showing a portion of the back of the typewriter with certain of the parts being omitted and other parts broken away so as to illustrate more clearly the tabulating mechanism for the typewriter carriage and certain of the control devices which operate at selected character space positions of the carriage.

The tabulating mechanism operated by key 213 is such as shown in U. S. Patent No. 1,935,436, granted November 14, 1933, and includes the usual settable tabular stops 230 mounted on a rack bar 231 extending across the back of the machine (Fig. 11). As is disclosed fully in the last-mentioned patent, the depressing of the tab key effects movement of a tab lever 233 to an operated position and thereby releases the escapement mechanism to permit movement of the carriage 201. When the carriage 201 reaches the character space position where a regular tab stop 230 has been preset, the tab lever 233 is engaged by the preset stop and thereby stops the carriage and restores the tab lever to normal position at such character space position.

Depression of the shift lock key 216 effects a basket shift operation which moves the type basket 205 from its normal or lower case position to its upper case position. The shift lock key 216 is pivotally mounted on the key lever 220 of the shift key 235, and when depressed is retained in operated position by a suitable latch catching under a hook fixed to the typewriter frame, not shown herein as its construction is well known to those skilled in the art, it having been fully disclosed in a number of U. S. Patents including No. 2,378,371, granted June 12, 1945. As explained in the latter patent, the shift lock key 216 is released by depressing the release key 217, which operation effects through suitable linkage a downward movement of the key lever 220 on which the shift lock key 216 is pivotally mounted, and the latter movement causes the usual spring to release the just-mentioned latch which holds down the shift lock key. Thus, when the shift release key 217 is released the key lever 220 on which the shift lock key is mounted, is then permitted to move upward to its normal position and, in so doing, to effect the return of the type basket to its normal or lower case position.

According to the illustrative embodiment, two pairs of type basket contacts 236 and 237, respectively, are provided (see Fig. 10). The contacts 236 and 237 are of the transfer type and are actuated by an arm 238 fixed to an operating shaft 239 of the basket shift mechanism. The shaft 239 occupies its normal position shown when the type basket 205 is in its lower case position. In this position the contacts 236 are closed and the contacts 237 open. When the type basket is shifted to its upper case position, the shaft 239 is rocked counterclockwise as an incident to the shifting operation and, through the arm 238, opens contacts 236 and closes contacts 237. When the type basket is returned to lower case position, the contacts 236 are again closed and the contacts 237 opened, as will be apparent.

Supplementing the above construction and peculiar to the illustrative embodiment, are a plurality of typewriter actuating solenoids 240, there being an actuating solenoid for the space bar and an actuating solenoid for each of the various other keys of the keyboard that are required to be operated. As shown in Fig. 10, the armature of each solenoid 240 is connected to its corresponding key lever 220. Thus, energization of a solenoid results in automatic operation of its related key and the mechanism operated by such key. The solenoids 240 may be distinguished hereinafter in this description by suffixing the designation of the key or element operated thereby to the common reference number 240. For example, the solenoid for effecting printing of the character "A" will be designated as 240—A and the solenoid for effecting the carriage return and line spacing operation as 240—Carriage return.

As shown in Figs. 10 and 11, a special rack bar 250 is mounted on the carriage 201 for movement therewith, and is fixed at its two ends to rearwardly extending support plates 251 and 252, respectively, which are suitably fixed to the two end plates of the carriage 201. As shown, the special rack bar 250 is formed with a plurality of pairs of vertical grooves 253, 253, the grooves forming each pair being formed on opposite sides, respectively, of the bar 250 and extending in a common vertical plane. The several pairs of grooves 253, 253 correspond, respectively, to the character-space positions of the carriage, the same as the regular settable tabular stops 230 previously described. Each of the pairs of grooves is adapted to receive either one of three kinds of control stops, indicated respectively by the reference characters 255, 256, and 257 (see also Figs. 12 and 13). Each of these control stops functions when the carriage 201 reaches the character space position corresponding to the pair of grooves where such control stop has been placed, to open, or close, a related pair of contacts mounted within a contact assembly 258 fixed to the rear portions of the typewriter frame. As will appear more fully hereinafter in the description of the circuit diagram appearing in Figs. 19*a* to 19*f*, inclusive, there is a separate pair of contacts actuated by each of the three kinds of control stops and such contacts are located in circuits for controlling certain operations of the apparatus disclosed herein.

Figure 13:
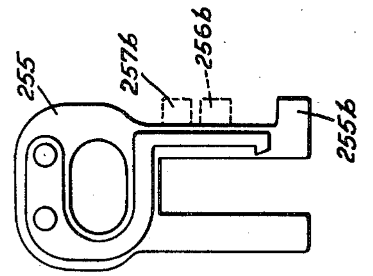
Fig. 13 is a vertical elevation showing in full lines one of the control stops and indicating in dash lines the positions of the contact operating tabs on the other two control stops.
Figure 12:
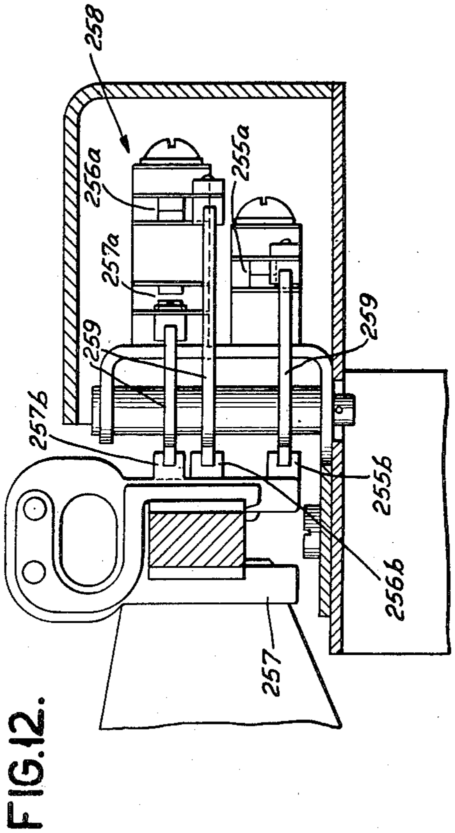
Fig. 12 is an enlarged fragmentary vertical sectional view taken on the line 12—12 of Fig. 11.

As shown in Figs. 11 and 12, the contact assembly 258 comprises a pair of make contacts 257*a*, a pair of break contacts 256*a*, and a pair of break contacts 255*a*. Each pair of contacts is actuated by a separate related lever 259 when the latter is engaged by a contact actuating tab formed on its related control stop. As shown in Fig. 12, the control stop 257 is provided with a tab 257*b* in alignment with the lever 259 for actuating the pair of make contacts 257*a*, so that, when the carriage reaches the character space position corresponding to a pair of grooves where a stop 257 has been set, the related contacts 257*a* are closed. Fig. 13 shows in full lines the control stop 255 with a tab 255*b* which is so located that it will open the break contacts 255*a* when the carriage 201 reaches the character space position where such a stop 255 has been placed. The location of the contact actuating tab 256*b* for the third kind of control stop 256 is indicated in dash lines in Fig. 13, and in full lines in Fig. 12. As shown, the control stop 256, through its tab 256*b*, will open its related contacts 256*a* when the carriage reaches the character space position corresponding to the pair of grooves 253, 253 where such stop 256 has been placed.

In Fig. 11, the character space positions of the typewriter which correspond, respectively, to the pairs of grooves are indicated on the rack bar 250 by corresponding numerals. The control stops 255, 256, and 257 are located in the pairs of grooves 253, 253 they occupy when the apparatus is operated to effect the automatic typing of the two lines of data appearing in the body of the copy sheet 203 of Fig. 17 and under the control of the detail cards DC—1 and DC—2 of Figs. 14 and 15 and the master card MC—1. A full description of the operation of these control stops and related contacts appears hereinafter.

*The electric translating means*

The electric translating means of the illustrative embodiment of the present invention comprises both a detail card translator and a master card translator. The detail card translator operates in response to the sensing of each code hole designation in the detail card to condition an operating circuit and the latter, when closed, energizes an electrical instrumentality for manifesting the character or functional operation represented by the sensed code designation. In the same manner, the master card translator provides for manifesting the sensed code designations in the master card. As indicated, both the detail and master card translators are electrical in character and the component elements thereof are illustrated in the wiring diagram of Figs. 19*a* to 19*f*, inclusive.

Figure 19B:
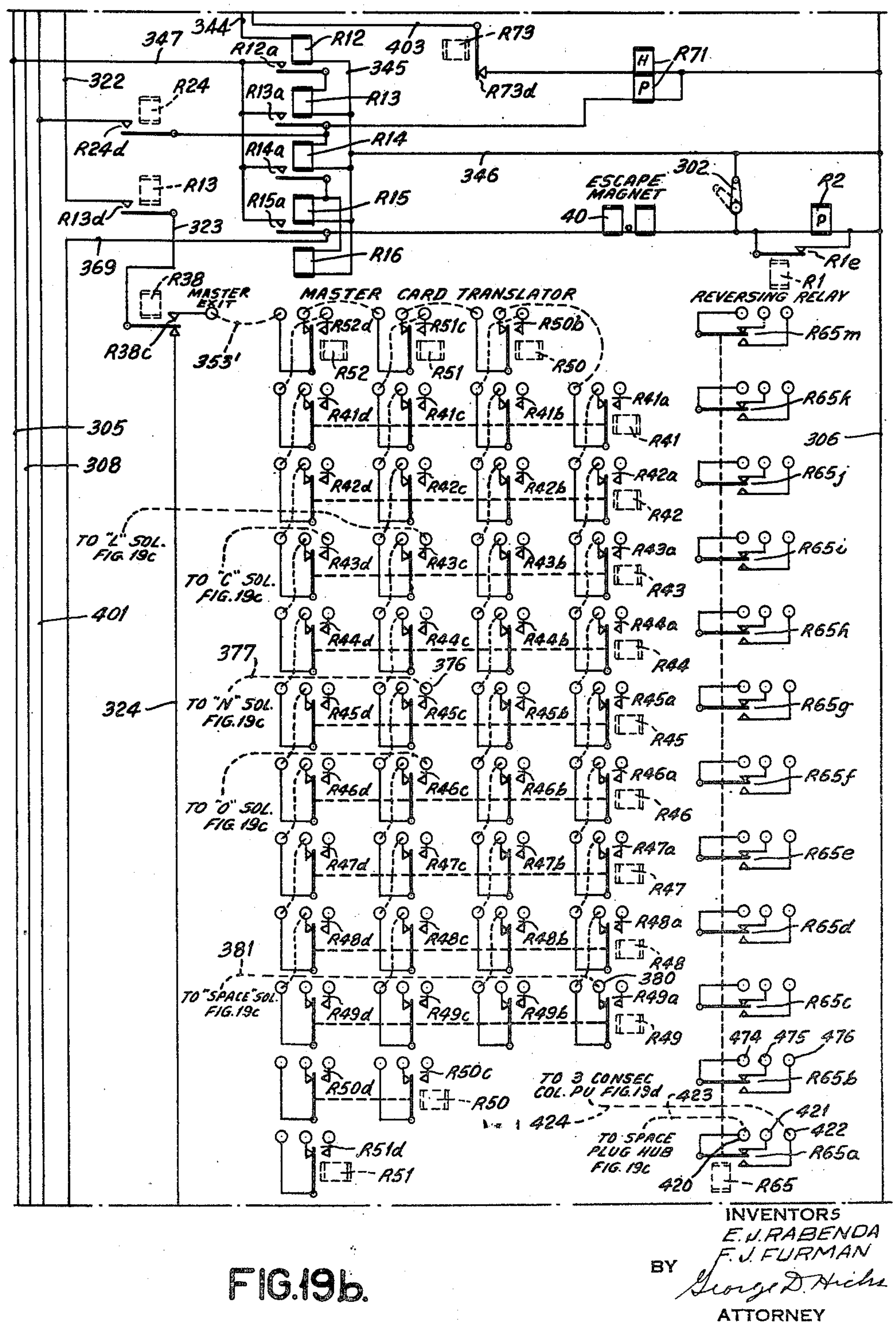
Figure 19C:
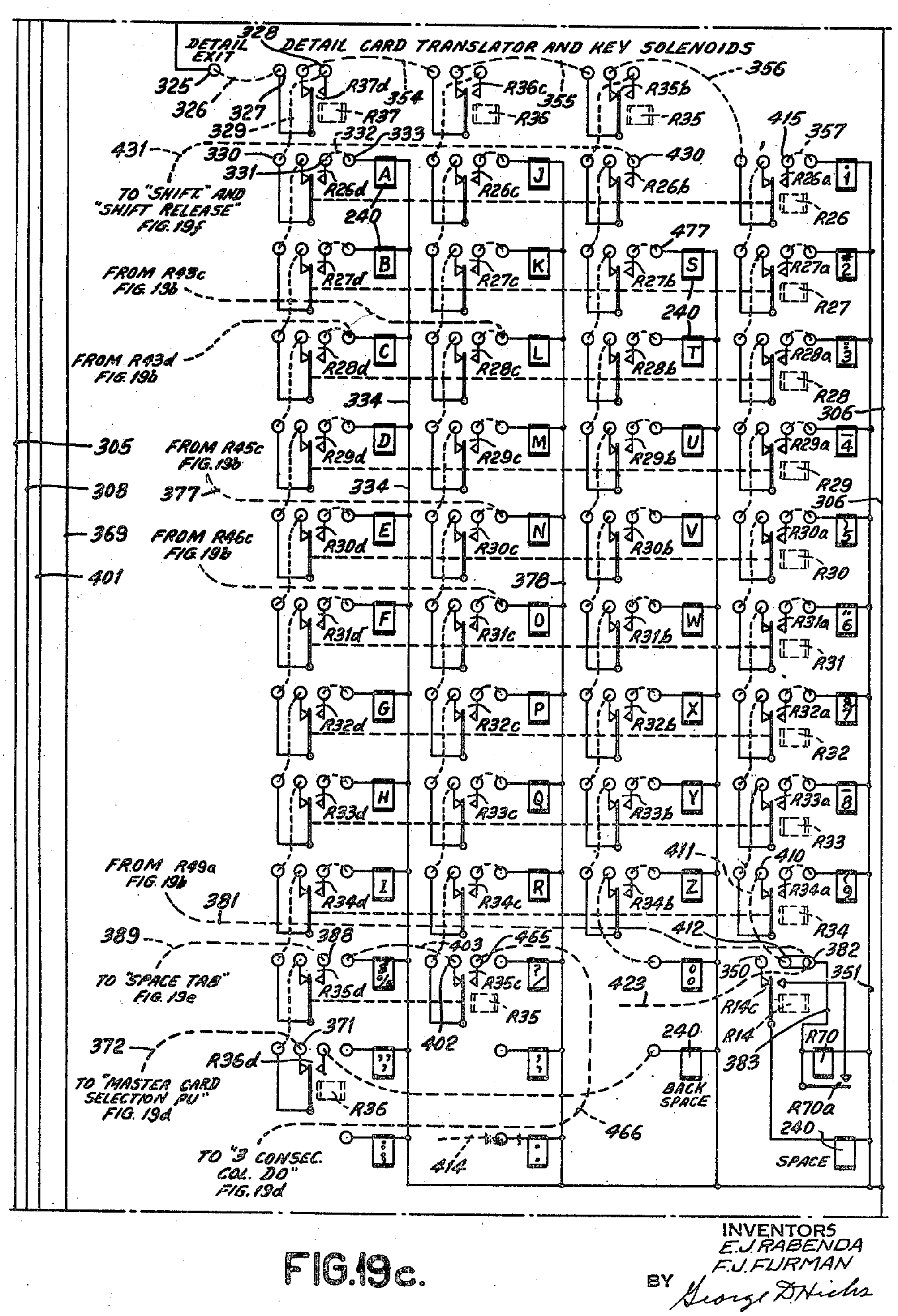

The detail card translator comprises twelve translator relays R26 to R37 inclusive which correspond, respectively, to the twelve index point positions of the code system used. The coils of the twelve relays appear at the right of Fig. 19*a*. As will appear more fully hereinafter, the coils of translator relays R26 to R37 inclusive are selectively energized during each code sensing operation as a result of the presence of code holes in related index point positions of the detail card column being sensed. Each relay coil of the detail translator actuates one or more sets of relay contacts of the transfer type which are shown in Fig. 19*c*. Each set of these relay contacts is shifted from its normal position shown to its controlled, or actuated position when its associated relay coil is energized. As shown, the sets of relay contacts are interconnected by circuit wires in such a manner as to form a translator network. For each operating condition of the relay coils resulting from the sensing of a detail card record column, the network provides a corresponding operating circuit path and each such operating circuit path includes an electrical instrumentality which effects, when energized, the manifestation of the character or functional operation represented by the corresponding sensed code designation.

As stated, each set of translator relay contacts is of the transfer type, i. e., it comprises two separated fixed contact blades and a movable contact blade. The movable contact blade of each set of contacts when in the normal position shown engages one of the stationary blades and when it is shifted to its actuated position by the energizing of its related coil, engages the other of the fixed blades. Each of the three blades comprising each set is electrically connected to a separate plughub (indicated in Fig. 19*c* by a small circle) and the three plughubs of each set of contacts are arranged, as shown, in a horizontal line for convenience in plugging. The plughubs are interconnected by removable plug wire connectors, indicated by dotted lines in Fig. 19*c*, to provide the translator network referred to in the preceding paragraph.

The solenoids 240 of the typewriter which effect printing of the characters, and the solenoids 240 which effect the space and back-space operations of the typewriter also appear in Fig. 19*c*. The solenoids 240 for effecting the other functional operations of the apparatus are shown in the other figures of the wiring diagram and will be specifically referred to hereinafter. The typewriter solenoids 240 are shown as connected, respectively, to related inlet plughubs, and each of the latter is connected by a dotted line plug connector to the particular outlet plughub of the set of translator relay contacts which terminates the operating circuit path through the translator network that effects the energizing of the related solenoid.

The sets of detail translator relay contacts and typewriter solenoids and associated plughubs are shown in Fig. 19*c* as being conveniently arranged in four vertical and twelve horizontal rows. This arrangement is believed to be the simplest and most convenient for making the plug wire connections required to provide a network for translating and manifesting the code designations comprising the 12-hole code system illustrated in Fig. 9. In Fig. 20, the plughubs for the sets of relay contacts and typewriter solenoids are shown in the same relative position with respect to one another as is shown in Fig. 19*c*, and the plug wire connectors are shown in full lines.

In Fig. 19*a*, each detail card reading brush 122 terminates in an outlet plughub and each of the latter is shown as connected by a dotted line plug connector to an inlet hub of a detail card translator relay coil. The twelve index point positions of the card which are sensed, respectively, by the twelve sensing brushes are indicated in Fig. 19*a* by the row of numerals appearing on the contact roll 91. The twelve outlet hubs for the detail brushes and the twelve inlet hubs for the detail translator relay coils are shown in Fig. 20 at the lower left-hand side of the plugboard and as conveniently placed alongside the previously described section containing the plughubs for the sets of detail translator relay contacts and the typewriter solenoids. The plug connectors between the brush outlet and relay inlet plughubs are shown in full lines in Fig. 20.

It will be readily appreciated that the provision of removable plug connections between the elements forming the detail card translator makes possible a wide variation in the code system used. By changing the plug connectors between the brushes and the translator relay coils any desired coil may be energized by the sensing of a code hole in any index point position of the card. Also, by changing the plug connections between the different sets of relay contacts and between the solenoids and the sets of contacts, different code combinations may be used to actuate the solenoids from those indicated. As stated, the arrangement of relays and plug connections illustrated is the simplest and most convenient for translating the code designations of Fig. 9.

As in the case of the detail card translator, the master card translator includes twelve relay coils, associated sets of relay contacts of the transfer type, and permanent circuit wires and removable plug wire connectors interconnecting the sets of relay contacts to provide an adjustable circuit network which conditions an operating circuit in response to the sensing of each code designation in a record column of the master card. The arrangement of relay coils with respect to the master card reading brushes 101 and the arrangement of the different sets of associated relay contacts and the plughub connections therefor are exactly the same as in the detail card translator described above. The twelve relay coils of the master card translator are shown in Fig. 19*a* and are indicated, respectively, by reference numerals R41 to R52 inclusive. The master card brush outlet hubs and the inlet hubs for corresponding translator relay coils are shown in a vertical row at the left center of Fig. 20 and as arranged in the same manner as in Fig. 19*a*. The plug connectors between the hubs are also shown in dotted lines in Fig. 19*a* and in full lines in Fig. 20. The sets of relay contacts associated with the twelve master card relay coils are shown in Fig. 19*b*. The inlet plughubs for the solenoids which effect operation of the apparatus do not appear in Fig. 19*c*. The plughub connections from the master card relay contacts to the solenoids shown in dotted lines in Fig. 19*b* are only those which are required for effecting control by the master card MC—1 of Fig. 16 in the typing of the bill of material shown on the copy sheet 203 of Fig. 17. In Fig. 20, the plughubs for the sets of relay contacts for the master card translator are also shown and the plughub connectors are shown in full lines.

*General operation*

The general operation of the illustrative embodiment will now be described in connection with the complete electrical wiring diagram which is shown in Figs. 19*a*, 19*b*, 19*c*, 19*d*, 19*e*, and 19*f*. The description of the diagram will best be understood by arranging the sheets containing these views in end-to-end relation and so that the views will be in the order named. In the wiring diagram, all switches and contacts are shown in the position they occupy when the power is turned off and without a detail card DC or a master card MC in position in the card carriage.

The general operation will be described with hand controlled switches 301, 302, and 303 in the position shown, which is the position they will occupy when the 80th column of the cards is not to be read. Switch 301 appears in Fig. 19*a*, switch 302 in Fig. 19*b*, and switch 303 in Fig. 19*f*. All three of these switches also appear in Fig. 1. In Figs. 19*a* to 19*f*, inclusive, all permanent wiring connections are shown in full lines and all plugged connections are shown in dotted lines.

As indicated previously, the dotted line plug connectors which are shown in Figs. 19*a* to 19*f*, inclusive, are those which appear in full lines in the plugboard illustrated in Fig. 20 and which are used in effecting the automatic typing of the data on sheet 203 of Fig. 17 under the control of the detail cards DC—1 and DC—2 of Figs. 14 and 15 and the master card MC—1 of Fig. 16. All the plug connectors for effecting control by the reading strip do not appear in Fig. 19*a* as the scale is too small and there is not sufficient space; but the complete plugging to the reading strip appears in Fig. 20 and can be readily followed by reference thereto. A detailed description of the operation in connection with the particular example illustrated in Figs. 14 to 18 inclusive and Fig. 20 will appear hereinafter.

Before starting a reading and typing operation, the detail card magazine 120 is filled with a plurality of detail cards DC containing the recorded code designations of the data to be printed; and a master card MC, if one is to be used, with the code designations of the desired control data and character data recorded therein, is placed in the master card section of the card carriage and the door 106 thereof moved to closed position and held there by the latch 108. The latter operation will close the door contacts 109.

Next, a main power switch 300 (Fig. 19*a*) is closed. This switch connects a suitable source of direct current with a main positive conductor 305 and a main negative conductor 306 and thereby energizes brush interlock relay R5 (Fig. 19*a*) through the normally closed detail card brush magnet contacts 95, and also energizes skip interlock relay R3 (Fig. 19*f*) through the normally closed skip lifter contacts 59. The energizing circuit for R3 extends from the positive conductor 305 through normally closed latch contacts 35

(Fig. 19a), a wire 308, contacts 59 (Fig. 19f), and coil of R3 to negative conductor 306. As the type basket 205 is in lower case position, basket actuated contacts 236 are closed and relay R56 (Fig. 19f) is energized by a circuit extending from the positive conductor 305, through contacts 236 in the position shown, and the coil of relay R56 to the negative conductor 306.

Figure 19D:
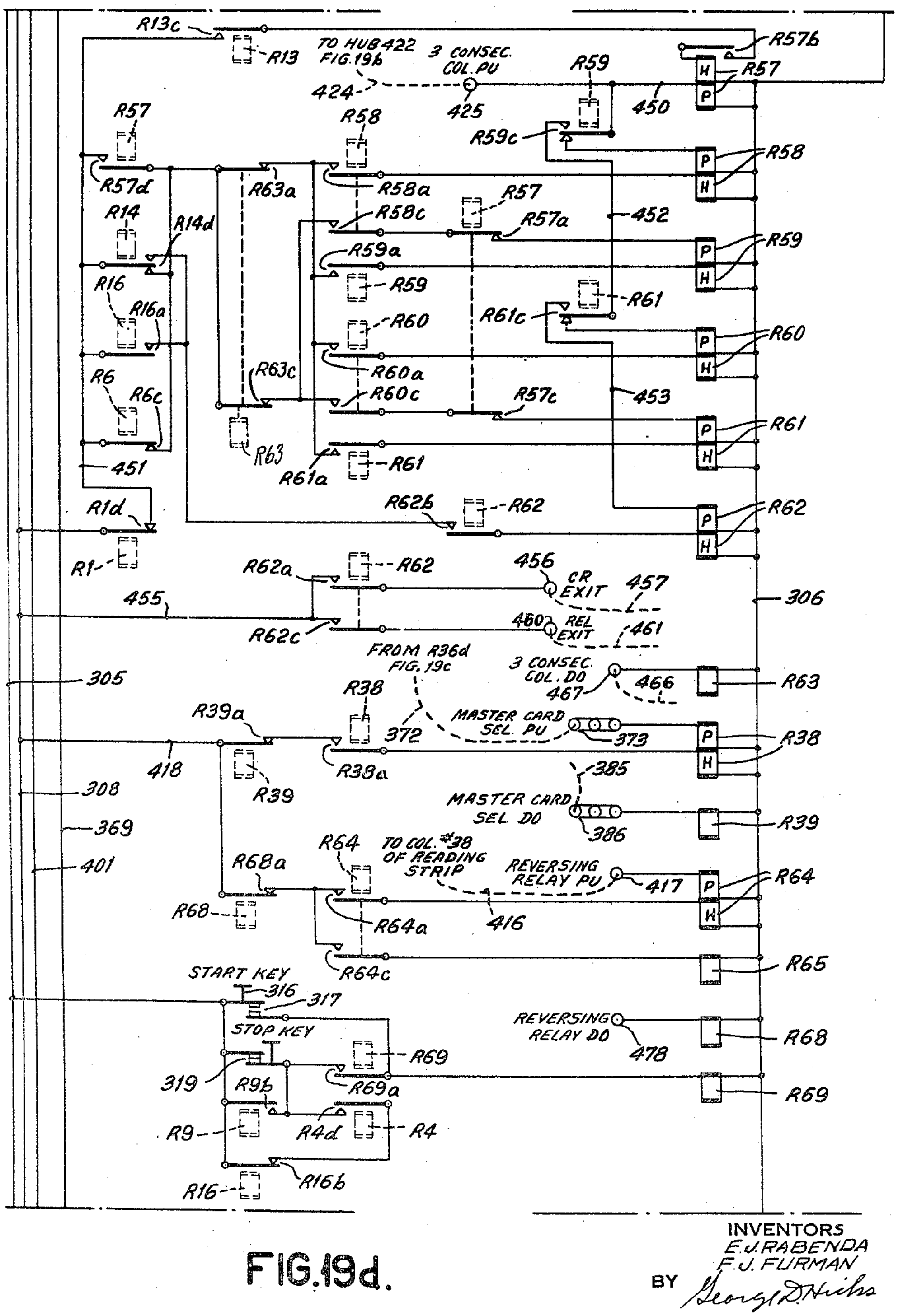
Figure 19E:
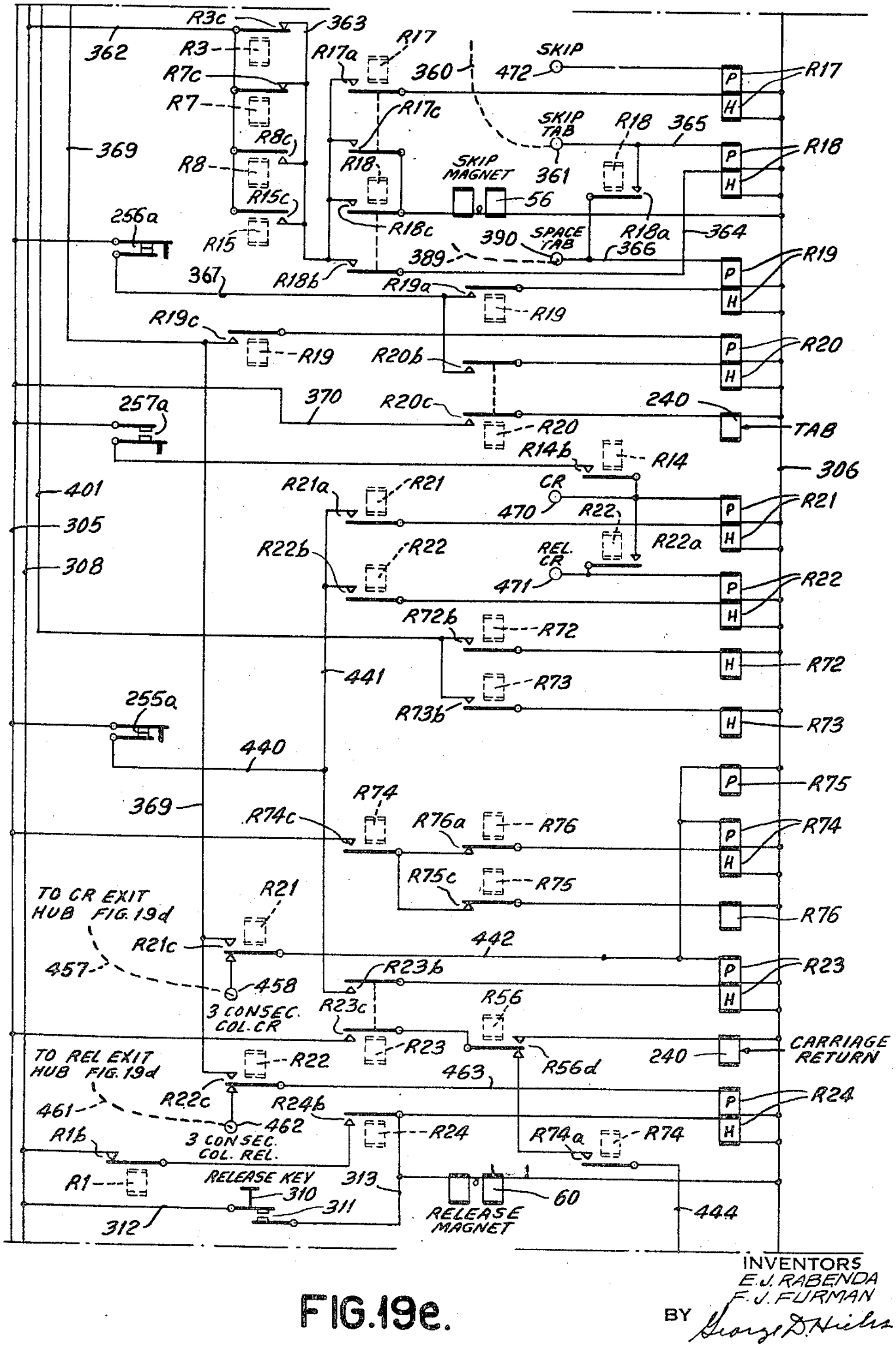

Thus, relay R5 opens its normally closed contacts R5a (Fig. 19a) and closes its normally open contacts R5c (Fig. 19f); and relay R3 closes its normally open contacts R3a (Fig. 19a) and opens its normally closed contacts R3c (Fig. 19e). Relay R56 closes its contacts R56a and opens its contacts R56c (Fig. 19f) and transfers its contacts R56d (Fig. 19e).

Contacts R3a prevent the energizing of either reading brush magnet 92 or 104 while the skip lifter 51 is in raised position to effect a skipping or a release operation. This prevents possible damage to the sensing brushes. Both brush magnets are energized at the same time, and the contacts 95, which control relay R5, are opened by the energizing of the detail card brush magnet 92. Thus, relay contacts R5a (Fig. 19a) prevent the establishing of either a reading circuit or a typewriter operating circuit through the floating cam contacts 149 and latch contacts 35, while the brush magnets are deenergized, and relay contacts R5c (Fig. 19f) prevent a card eject operation while the brush magnets are energized. The purpose of contacts R3a will appear more fully hereinafter in connection with the description of a skipping operation. The contacts of relay R56 function in the control of the shift and shift release operations of the typewriter and will also be explained more fully hereinafter.

*Initial card feeding operation.*—The next step in the operation is to feed the bottom detail card DC in the magazine 120 to a start reading position which is the position occupied when the #1 record column of the detail card is in sensing position over the detail card reading brushes 122. This feeding operation is effected by depressing the release key 310 (Figs. 1 and 19e) to close its contacts 311 and thereby energize the release magnet 60 by the following circuit: from the positive conductor 305, normally closed latch contacts 35 (Fig. 19a), wire 308, wire 312 (Fig. 19e), now closed contacts 311, wire 313, release magnet 60 to the negative conductor 306. It is noted that the hold coil of relay R24 (Fig. 19e) is also energized by the closing of the release key 310 by a branch circuit which extends from the wire 313 and in parallel with the release magnet 60. R24 closes its hold contacts R24b and thereby establishes a hold circuit for both R24 and the release magnet 60 which extends from the conductor 305 through the upper latch contacts 35 (Fig. 19a), the wire 308, the normally closed last column relay contacts R1b (Fig. 19e), the now closed hold contacts R24b and through the hold coil of R24 and the magnet 60 in parallel to the negative conductor.

As explained hereinabove, the energized release magnet 60 (Fig. 2) through its armature 63, plunger 64 and bell crank 65, will move the slide 66 to the right and thereby raise the left-hand end of the skip lifter 51 (as viewed in Fig. 7), which will in turn raise the escapement dog 47 out of engagement with rack 15 and permit movement of the card carriage to its last, or 80th column reading position. The slide 66 will remain in the actuated position until the card carriage approaches the last-column position at which time a projection (not shown) on the rack 15 engages a depending extension on the left-hand end of slide 66 and will thereby return the slide to the position shown. The construction is such that the contacts R1b open and deenergize the relay R24 and the release magnet 60 immediately before the slide 66 is engaged by the projection on rack 15 and returned thereby to its normal position. Relay R1 (Fig. 19f) is energized to open its contacts R1b by the closing of the last column contacts 145, which occurs as the card carriage moves from the 79th column position. The slide 66 is engaged and returned to its normal position immediately after the opening of contacts R1b and just as the card carriage arrives at the 80th column position.

The lifting of the skip lifter 51 at the beginning of the release operation, opens its contacts 59 (Figs. 7 and 19f) and thereby deenergizes relay R3, which opens its interlock contacts R3a (Fig. 19a) to prevent energizing of the brush magnets 92 and 104 while the card carriage is moving to the last-column position. When the card carriage reaches the last-column position, the returning of slide 66 to its normal position (Figs. 2 and 7) will permit the skip lifter 51 to be restored to its normal position and thereby close skip lifter contacts 59 (Fig. 19f) and again pick up relay R3 which will permits its contacts R3a (Fig. 19a) to again close; but the brush magnets 92 and 104 are not energized as yet because of the open relay contacts R4c.

Figure 19F:
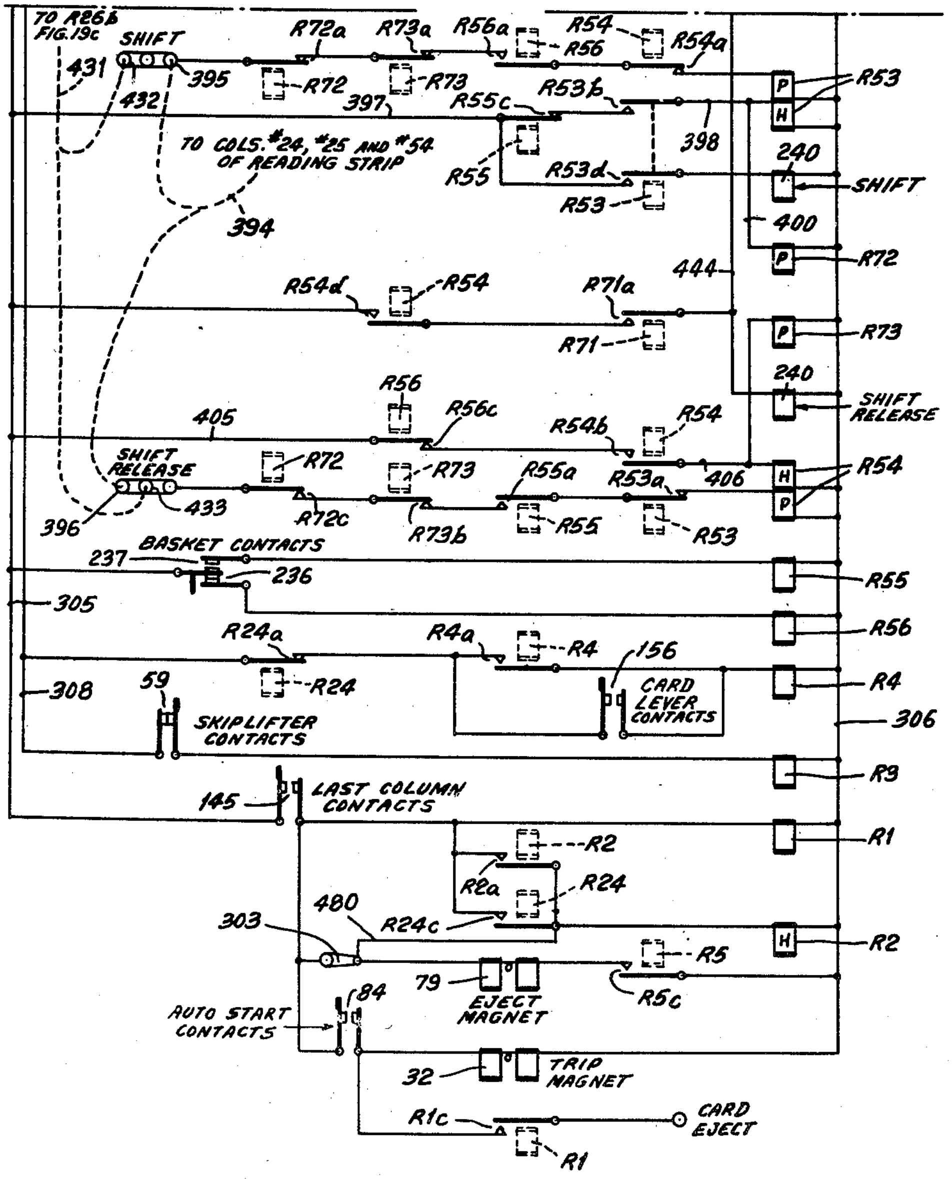

As stated, the last column contacts 145 (Figs. 6 and 19f) close when the card carriage moves to the last column position. The closed contacts 145 energize the eject magnet 79 (Figs. 3 and 19f) by a circuit traced as follows: from positive conductor 305, contacts 145 now closed, hand operated switch 303 in the position shown, eject magnet 79, and the now closed contacts R5c to the negative conductor 306. As explained hereinabove, the energizing of the eject magnet 79 causes the card reading unit to go through an eject cycle which includes the closing of auto start contacts 84 (Figs. 3 and 19f) to energize the trip magnet 32 (Figs. 2, 4, and 19f). The magnet 32 trips the clutch 28 and also shifts the latch contacts 35, 36 (Figs. 2 and 19a) to open contacts 35 and close contacts 36. The opening of latch contacts 35 deenergizes relay R3 so that brush interlock contacts R3a are open during the return of the card carriage. The opening of contacts 35 also breaks at another point the hold circuit for release magnet 60, the latter circuit path having been previously broken by the opening of the contacts R1b when last column contacts 145 closed to energize R1. The closing of contacts 36 energizes the motor 22 which, through the clutch 28, drives the rack bar 16 and picker 121 towards the left as viewed in Fig. 1 and simultaneously drives the card carriage, including the rack 15, pusher 13, and guide 14, toward the right. The picker 121 feeds the bottom detail card of the stack in the magazine 120 into a start reading position, where it is held between the pusher 13 and guide 14 (as shown in Fig. 2) and where the #1 record column of such detail card is in position to be sensed by the sensing brushes 122. As will be apparent, the #1 column of the master card MC is also at this time in position to be read by the sensing brushes 101. At the end of this movement of the card carriage to start position, the auto start contacts 84 are opened to deenergize the trip magnet 32, and thereby open latch contacts 36 to stop the motor 22 and close again the contacts 35 which picks up R3 again to close the interlock contacts R3a.

In addition to energizing relay R1 and the eject magnet 79, the closing of the last column contacts 145 also energizes the hold coil of relay R2. Other than the previously described function of the relay contacts R1b, the functions performed by the contacts of relays R1 and R2 are not pertinent to the operation of feeding the first detail card into the card carriage at start operation and consequently will not be described at this point. Relay R1 and the hold coil of relay R2 are deenergized upon the opening of last column contacts 145 and the contacts of these relays will then be in their normal position shown.

At start position with the #1 columns of the detail and master cards in position to be read, the floating cam contacts 149 (Figs. 6 and 19a) are closed because the dog 47 is in engagement with the rack 15. Also, card lever contacts 156 (Figs. 2 and 19f) are closed by the positioning of the new detail card in the card carriage. Closed card lever contacts 156 energize relay R4 by the following circuit: from positive conductor 305, now closed latch contacts 35 (Fig. 19a), wire 308, normally closed relay contacts R24a (Fig. 19f), now closed card lever contacts 156, and coil of relay R4 to the negative conductor 306. Relay R4 closes its hold contacts R4a which are connected in shunt across the contacts 156 and thereby keep the coil of relay R4 energized under the control of latch contacts 35. R4 also closes its contacts R4b and R4c (Fig. 19a) and its contacts R4d (Fig. 19d). As the energizing of relay R4 is dependent upon the closing of both the latch contacts 35 and the card lever contacts 156, R4 also prevents, through its normally open contacts R4c and R4b, the energizing of the brush magnets and the establishing of either a reading or an operating circuit while the card carriage is being moved to its start position and while there is no detail card in the card carriage. The purpose of contacts R4d will presently appear.

It will be apparent that with the card carriage at start position and with contacts R1a (Fig. 19a) in their normal deenergized position shown and with contacts R3a closed, the closing of relay contacts R4c, as just described, will establish an energizing circuit through both reading brush magnet 92 and reading brush magnet 104. As shown in Fig. 19a, this circuit extends from the positive conductor 305 through the latch contacts 35; wire 308; wire 315; contacts R1a, R4c, and R3a, all in closed position; the magnets 92 and 104 in parallel, and normally closed cut out contacts 116 to the negative conductor 306. As stated previously, door contacts 109 are closed when a master card is clamped in position by the door 106. The energizing of detail card brush magnet 92 opens its contacts 95 and thereby drops out relay R5 which permits its contacts R5a (Fig. 19a) to close and its contacts R5c (Fig. 19f) to open.

It is noted that at this point floating cam contacts 149 and relay contacts R4b and R5a are all closed; both brush magnets 92 and 104 are energized to place their respective sets of reading brushes 122 and 101 in their upper or reading positions, and the #1 record columns of both the master card MC and the first detail card DC are in position to be read. This condition of the elements mentioned was attained by the placing of the desired master card in the card carriage, placing the desired stack of detail cards in the magazine 120, closing the power switch 300, and by depressing the release key 310.

*Starting of reading and typing operations.*—With the parts in the condition just described, the sensing and typing operations are started by depressing the start key 316 (Figs. 1 and 19d). This closes the start contacts 317 and energizes the start relay R69 by a circuit extending from the positive conductor 305 through the start contacts 317 and the coil of start relay R69 to the negative conductor 306. Relay R69 closes its hold contacts R69a to keep the relay R69 energized across the power line through normally closed stop contacts 319. R69 is also held energized across the power line through the normally closed relay contacts R16b, the previously mentioned contacts R4d, now closed, and the start relay hold contacts R69a.

*Reading circuits.*—Start relay R69, when energized, also closes its contacts R69c (Fig. 19a) and thereby establishes a reading circuit extending from the positive conductor 305 through the normally closed latch contacts 35; wire 308; now closed floating cam contacts 149; now closed relay contacts R4b, R5a, and R69c and then in parallel to the detail card contact roll 91 and to the master card contact roll 105. If there be a code hole punched in one of the index point positions of the #1 record column of the detail card which is now in position to be read, the reading brush 122 corresponding to such index point position will project through the code hole and thereby contact the roller 91 to complete the reading circuit to the negative conductor 306 through the plug connector 320 and translator relay of the group R26 to R37 inclusive, which correspond to such index point position having the code hole punched therein. Likewise, if the code designation in the #1 record column of the detail card also includes a code hole in a second index point position of the record column, a parallel circuit will also be completed from the contact roll 91 to the negative conductor 306 through the brush 122, connector 320, and translator of the group R26 to R37 corresponding to such second index point position.

In case the #1 record column of the master card contains a code hole, or holes, punched therein, a reading circuit will also be completed from the contact roll 105 to the negative conductor 306 through the translator relay, or relays, of the group R41 to R52, inclusive, which correspond to the sensed code hole, or holes. It is noted, however, that even though reading circuits may be simultaneously established through code designations in both the master and detail cards, the code designation in only one of the cards can control the operation of the apparatus during any one operating cycle. This is effected by the master card selector relay R38 (Fig. 19d) and its transfer contacts R38c (Fig. 19b), as will appear more fully hereinafter. For the purposes of this general description, it will be assumed that the contacts R38c are in the position shown and consequently only the detail card designations will control the operation.

*Operating circuit.*—From Fig. 9 it is noted that the code hole designation for the letter character "A" comprises a code hole in the #12 index point position and a second code hole in the #1 index point position of a card column. Assuming that the #1 record column of the detail card being sensed has recorded therein the code hole designation for the letter character "A,"

the closing of the start relay contacts R69c, as described hereinabove, will complete a reading circuit from the contact roll 91 through the brushes 122 corresponding to the #12 and #1 index point positions and from there through plug connectors 320 and translator relay coils R37 and R26 to the negative conductor 306. Thus, with the sensing of the code designation for the letter character "A" in the #1 column of the detail card, the translator relays R37 and R26 will be energized and the energizing of these translator relays will cause their related sets of translator contacts (Fig. 19c) to shift from their respective normal positions shown to their actuated positions and thereby condition a typewriter operating circuit including the key solenoid 240—A which, as stated, effects the printing of the letter character "A" on the copy sheet 203 held in printing position by the platen 202 of the typewriter carriage 201.

This conditioned typewriter operating circuit, like the reading circuit previously traced, extends from the positive conductor 305 through the now closed latch contacts 35 (Fig. 19a), the floating cam contacts 149, and through closed relay contacts R4b, R5a, and R69c; and, from contacts R69c, the operating circuit extends through a wire 321; the normally closed interlock relay contacts R23a and R20a, the purpose of which will be described hereinafter; a wire 322; timing relay contacts R13d, now open (Fig. 19b); a wire 323; master card selector relay contacts R38c, in their normal position shown; a wire 324; detail exit plughub 325 (Fig. 19c); plug connector 326; inlet hub 327 of the set of translator relay contacts R37d which are now in shifted position; outlet hub 328; plug connector 329; inlet hub 330 of the set of translator relay contacts R26d, now in shifted position; outlet hub 331; plug connector 332; inlet hub 333 for the solenoid 240—A which operates the "A" key of the typewriter; and from such solenoid through a wire 334 to the negative conductor 306.

*Timing control circuits.*—A timing control circuit is established simultaneously with the establishing of the above traced reading circuit through the detail card reading brushes 122 and the translator relays R37 and R26. Like the reading and operating circuits, the timing control circuit extends from the positive conductor 305 through the latch contacts 35 and floating cam contacts 149 and through the relay contacts R4b, R5a, and R69c. From the start relay contacts R69c the timing control circuit also includes the wire 321 and interlock relay contacts R23a and R20a of the above traced operating circuit. The timing control circuit extends from contacts R20a through a wire 336, the first relay R6 of a series of timing relays, a wire 337, and a wire 338 to the negative conductor 306. Thus, the timing relay R6 is energized simultaneously with the energizing of the translator relays R37 and R26.

Relay R6 is the first of a chain of ten timing relays R6 to R15 (Figs. 19a and 19b) inclusive, which, under certain conditions of operation are energized in succession. Relay R16 is energized and deenergized simultaneously with relay R15 and consequently these two relays can be considered functionally as being one relay. As will presently appear, the timing of various operations of the typewriter 200 and the card reading unit 20 is determined by the manner in which these timing relays are energized and deenergized. The manner in which the timing relays are energized and deenergized may be varied to some extent by different selected arrangements of the plug connections.

As an example, it is noted that, if the plug connector 340 (Fig. 20), extending between the hub 167a corresponding to the #1 card column reading position and the shunt plughub 171, is removed, the timing relays forming the complete chain R6 to R15 are energized serially in steps. That is to say, relay R6, when energized, closes its contacts R6a to energize relay R7; relay R7 closes its contacts R7a to energize relay R8 through closed contacts R6a, a wire 341, and a wire 342; contacts R8a then close to energize R9; closed contacts R9a energize R10; R10a energize R11; shifted contacts R11a then establish an energizing circuit for timing relay R12 which extends from the wire 322 through a wire 343, normally closed interlock contacts R53c and R54c, a wire 344, relay R12 (Fig. 19b), a wire 345 and wire 346 to the negative conductor 306; contacts R12b close to shunt contacts R53c and R54c out of the energizing circuit for R12; contacts R12a also close to establish an energizing circuit for the next timing relay R13, which circuit extends directly from the positive conductor 305 through a wire 347, contacts R12a, relay R13 and the wires 345 and 346 to the negative conductor 306; contacts R13d then close to energize the operating circuit through the translator which was conditioned by the sensing of the card column in reading position; contacts R13a close to energize timing relay R14 and closed contacts R14a energize both R15 and R16. Relay R15 closes its contacts R15a which establish an energizing circuit for the escape magnet 40 which extends from the positive conductor 305, through the wire 347, contacts R15a, the escape magnet 40, switch 302 in closed position, and wire 346 to the negative conductor 306.

As explained hereinabove, the escape magnet 40, when energized and then deenergized, operates the escape pawls 47 and 48 (Fig. 6) to cause the card carriage to escape a distance of one tooth of the rack 15 so as to bring the next detail card column and master card column into reading position. As will be recalled, the energizing of the magnet 40 raises the pawl 47 out of engagement with the rack 15 and lowers the pawl 48 into engagement with the rack, and the deenergizing of magnet 40 raises the pawl 48 and lowers the pawl 47 where it engages with the next rack tooth and thereby completes the escape operation. The raising of pawl 47 opens the floating cam contacts 149 and these contacts will therefore remain open until the magnet 40 is deenergized and the pawl 47 reengages the rack 15.

As the energizing circuit for timing relays R6 to R12, inclusive, extends through floating cam contacts 149, it will be apparent that all of these timing relays are simultaneously deenergized when magnet 40 becomes energized. Relays R13 to R15 are held across the power line and will not be deenergized immediately by the opening of contacts 149. Instead, relays R13, R14, and R 15 are then deenergized serially in steps, i. e., relay R12 when deenergized opens its contacts R12a to drop out R13, R13a then open to drop out R14, and R14a open to drop out R15 and R16. Contacts R15a then open to deenergize escape magnet 40 and thereby permit the completion of the card carriage's escapement to its next card column reading position. The deenergizing of magnet 40 and the resulting completion of the escape operation permits floating cam contacts 149 to again close, and thereby establish a reading circuit for sensing the next card column and a timing circuit for energizing the initial relay R6 of the chain of timing relays. Thus, the floating cam contacts determine the beginning and duration of the card reading cycles. Normally, the translator relays remain energized as long as the contacts 149 are closed.

From the foregoing it is noted that the escape magnet 40 is held energized and the contacts 149 open for a period determined by the time required for relays R12, R13, R14 and then R15 to drop out. This assures that the escape magnet is energized long enough to effect the escape operation of the card carriage.

*Timing control with the reading strip.*—The conditioned typewriter operating circuit, previously traced, is closed when timing relay R13 is picked up and thereby closes its contacts R13*d*. Therefore, in the example given, with plug connector 340 removed, a time period is provided between the closing of the reading circuit and the closing of the typewriter operating circuit which time period is determined by the time required for serially energizing relays R6, R7, R8, R9, R10, R11, R12, and R13. The reason for this latter time period is to provide, when desired, for the operation of the record controlled apparatus under the control of the reading strip and before the apparatus is operated under the control of the translator network which, as described, is adjusted as a result of the sensing of the card column. For example, in case it is desired to space the typewriter carriage before actuating the typewriter from the card column being sensed, a plug connection would be provided between one of the plughubs, of the pair of plughubs 167*a*, 167*b* corresponding to the card column sensing position occupied by the card carriage, and a plughub 350 (Fig. 19*c*) (also designated on the plugboard 170 of Fig. 20 by the legend "Space to col"). With such a plug connection, when contacts R6*a* close a circuit will be established through solenoid 240—Space of the typewriter which is traced as follows: from the positive conductor 305 and following the previously traced path of the timing circuit to relay contacts R6*a*; and, from the latter contacts, through the wire 341; wire 342; relay contacts R11*b*, in the position shown; common strip 166; reading strip brushes to the plughub 167*a*, or 167*b*, corresponding to the card column in reading position; the proposed plug connector to plughub 350 (Fig. 19*c*); relay contacts R14*c* in the position shown; solenoid 240—Space; and wire 351 to the negative conductor 306. As explained previously, the energizing of solenoid 240—Space by the circuit just traced, trips the typewriter cam unit 221 for effecting a space operation of the carriage 201. The time period required for serially energizing relays R7 to R13 inclusive is sufficient to complete the just mentioned space operation of the typewriter before contacts R13*d* close to operate the typewriter by a circuit extending through the translator network of Fig. 19*c*. Contacts R11*b* are opened by the energizing of timing relay R11 and thereby open the energizing circuit through the reading strip and solenoid 240—Space.

From the foregoing, it will be apparent that the key solenoids of the typewriter can be operated under the control of the reading strip. In the operation just described, the typewriter will be operated from the reading strip before the timing contacts R13*d* are closed to operate the typewriter under the control of the code designation in the record column of the card being sensed. As will appear more fully hereinafter, when certain typewriter operations are effected from the reading strip which require longer for their completion than is required for a simple character printing of spacing operation, such operations are effected after the typewriter has been operated from the record column of the card.

*Timing control without the reading strip.*—As stated when contacts R13*d* close, the typewriter operating circuit is established. Assuming that the code designation sensed in the detail card is that representing the character "A," the typewriter operating circuit will be that previously traced through the detail card translator network (Fig. 19*c*) and including the solenoid 240—A of the typewriter. The solenoid 240—A will thus be energized and the cam unit for operating the type bar for printing the character "A" will be tripped and the printing operation effected in the manner previously described. It is noted that the time provided in the operating cycle for picking up the timing relays R14 and R15 and serially droping out timing relays R12, R13, R14, R15 and the escape magnet 40, is sufficient for effecting this typewriter printing operation before the floating cam contacts 149 are again closed to initiate the next card reading and operating cycle.

In those column reading positions of the card carriage where it is not desired to control the operation of the apparatus from the reading strip as well as from the record columns of the cards being sensed, the plughubs 167*a*, or 167*b*, corresponding to such column reading positions are connected electrically by plug connectors to the shunt plughub 171. For this reason, the plughub 167*a* for the #1 column reading position is shown in Fig. 20 as connected to the shunt hub 171 by the plug connector 340. With the connector 340 in the position shown and with the #1 record column of the detail card in sensing position and bearing the code designation for the character "A," as in the example described above, the closing of timing relay contacts R6*a* establishes an energizing circuit for timing relay R12 through the reading strip and this is effected simultaneously with the closing of the circuit for energizing relay R7. This energizing circuit for relay R12 includes the contacts R6*a*, the wires 341 and 342, the relay contacts R11*b*, common strip 166, brush 165*a*, plughub 167*a* for the #1 column position, plug connector 340 to the shunt plughub 171; and from the hub 171 the circuit extends through a wire 351 (Fig. 19*a*), contacts R53*c* and R54*c*, coil of relay R12, and wires 345 and 346 to the negative conductor 306. Thus, the previously described timing effect produced by the serial energizing of relays R7 to R11 inclusive is eliminated from those operating cycles where the reading strip plughubs are connected to the shunt plughubs. Relays R7 to R11 are serially energized as before, but do not delay the serial energizing of timing relays R12 to R15 inclusive. Instead, timing relay R12 is energized as the next step after the energizing of relay R6, and contacts R12*a* then close to energize R13, R13*a* energize R14, and R14*a* energize R15 and R16. Contacts R13*d* close with the energizing of R13, and thereby establish the operating circuit through the translator previously conditioned by the energizing of the translator relays as a result of sensing the code designation in the record card. The timing relays are dropped out in the same manner as described previously, and consequently proper time intervals are provided thereby for effecting the typewriter operation and the escaping of the card carriage to the next column reading position.

In cases where the coded matter recorded in the record cards is to be typed in such a manner that the reading strip is not used in any of the card column reading positions to control the operation of the apparatus, the timing effect of relays R6 to R11 inclusive may be completely eliminated by plugging the shunt plughub 171 directly to a plughub 352 at the lower left of Fig. 19*a* and identified further by the legend "Plug to shunt." This plughub 352 is identified by the same legend on the plugboard 170 of Fig. 20 and is located at the left center of the plugboard and above the hubs of the detail card translator. Thus, with a plug connector connecting hubs 171 and 352, timing relay R12 is picked up with floating cam contacts 149 closing the timing circuit and simultaneously with the energizing of the translator relays to condition the typewriter operating circuit through the translator. As shown in Fig. 19*a*, this timing circuit includes the wire 322, the plughub 352, and extends from the latter through the supposed plugged connection to the shunt plughub 171, the wire 351, wire 343, interlock contacts R53*c* and R54*c*, the wire 344, timing relay R12, and the wires 345 and 346 to the negative conductor 306. As will be apparent, timing relays R6 to R11 will be energized serially as before, but they obviously cannot delay the serial energizing of timing relays R12 to R15 inclusive.

In the example just described where a plug connector connects hubs 171 and 352, it is apparent that as R13 is not energized until after R12 has been energized and has closed its contacts R12*a*, contacts R13*d* are not closed to establish the typewriter operating circuit until one step after the translator relays are energized to condition a typewriter operating circuit. As stated above, timing relay R12 and the translator relays are energized simultaneously with the closing of start contacts R69*c* when reading the first card column and with the closing of floating cam contacts 149 when reading succeeding columns. Contacts R12 to R15 are serially deenergized as before and thereby provide the proper timing control for the typewriter operations and the moving of the card carriage to the next sensing position.

The foregoing describes in general how the operation of the illustrative embodiment is started and how a single character typing operation is effected under the control of a code designation recorded in a detail record card, and how the reading strip may be selectively used to control the operation of the typewriter during the same reading cycle in which such single character was typed.

As indicated previously, code designations recorded in a master card may be sensed, translated, and the operation of the apparatus controlled thereby in the same manner as described above in connection with the detail card. The master card selector relay R38 (Fig. 19*d*) is provided for determining whether or not the operation of the apparatus is to be controlled from the master card or the detail card. With the relay R38 deenergized, its transfer contacts R38*c* (Fig. 19*b*) remain in their normal position shown where the detail card translator network (Fig. 19*c*) is connected to provide potential operating circuits extending from the floating cam contacts 149, as described previously. When the relay R38 is energized, its contacts R38*c* shift, and the master card translator network (Fig. 19*b*) is connected thereby, and through a plug connector 353, to condition potential typewriter operating circuits extending from the floating cam contacts 149, in the same manner as described above in connection with the detail card translator network (Fig. 19*c*). As will appear more fully hereinafter, the relay R38 may be selectively energized in response to the sensing of code designations in the cards being read and by control circuits from the reading strip.

*Detail operation with relation to specific problem of Figs. 14, 15, 16, 18, and 20*

Other novel features of the illustrative embodiment will be readily understood in following a description of the detail operations which take place when typing the particular data appearing in the body of the bill of material constituting the copy sheet 203 of Fig. 17, under the control of the code designations of such data recorded in the detail cards DC—1 and DC—2 of Figs. 14 and 15, respectively, and in the master card MC—1 of Fig. 16, and under selective control of the reading strip.

For the purposes of describing the operation of the illustrative embodiment to effect the typing of this particular data, it will be assumed that master card MC—1 is in place in the card carriage, that the detail card DC—1 has been fed into the card carriage, that the next detail card to be fed from the magazine 120 is DC—2, that the card carriage is at its #1 card column reading position, and that the sheet 203 of Fig. 17 is properly positioned in the typewriter with the typewriter carriage at its #1 character space position and with the type basket in lower case position.

In order to effect the typing of the data recorded in the cards DC—1, DC—2, and MC—1 so that it will appear on the copy sheet 203 in the manner indicated in Fig. 17, plug connections are made as shown in full lines in Fig. 20 and in dotted lines in Figs. 19*a* to 19*f*, inclusive. Also, the skip bar 50 as shown in Fig. 18 is inserted in the record sensing unit 20. As shown in Fig. 11, a control stop 255 is inserted in place in the #1 character space position of the special control rack 250 on the back of the typewriter; also, a control stop 256 is inserted in the special rack 250 at each of character space positions #13, #26, #32, #46, #56, and #66; and a control stop 257 is inserted in the rack 250 at character space position #92. A regular settable tabe stop 230 of the tabulating rack 231 is also set, at each of character space positions #13, #26, #32, #46, #56 and #66.

From an examination of Figs. 14 and 15 it is noted that the design of the detail cards DC—1 and DC—2 is such that the 80 record columns are divided into different groups or record fields, for the purposes of recording different types of statistical data. For example, record columns #1 to #6 inclusive comprise a record field in which the "part number" is recorded, columns #7 to #12 inclusive comprise a record field in which the "operation record number" is recorded, and column #13 is provided for recording a special control designation. With this explanation, the purpose of the remaining record fields will be readily apparent from an examination of the cards. For the purposes of clarity, the character data recorded in each of the several record columns of the cards are interpreted by corresponding legends appearing at the top of the respective columns. The design of the master card MC—1 is the same as that of the detail cards, but data is recorded in only one field of the master card for a reason which will appear as the description proceeds.

From an examination of Fig. 17, it is noted that the data appearing in the two typewritten lines in the body of the sheet 203, are arranged in different columns and that a printed legend at the top of each column identifies the matter in such column and that the printed legends or titles of these different columns correspond to titles of record fields in the record cards of Figs. 14, 15, and 16. From a comparison of the typewritten data with the coded data, it is apparent that certain of the data in the cards has been intentionally omitted from the typed bill of material on sheet 203 for the reason that such data would not ordinarily be desired in a bill of material.

The operation in typing the numerical data appearing in the first typewritten line on sheet 203 under the column entitled "Part number" will first be described. With the card carriage in position to sense card column #1 and with the various elements of the apparatus in the condition just explained, it will be apparent that the closing of the start relay contacts R89c, in the manner previously explained, will establish a reading circuit through the detail card translator relay R26 which will adjust its sets of contacts (Fig. 19c) to their shifted position and will thereby condition a typewriter operating circuit which includes the solenoid 240—1 for printing the numeral "1." This conditioned operating circuit will extend from the positive conductor 305 (Fig. 19a) to the detail exit hub 325 (Fig. 19c), in the same manner as traced above when the letter character "A" was sensed. From the hub 325 the conditioned operating circuit extends through plug connector 326, the set of relay contacts R37d in the position shown, a plug connection 354, relay contacts R36c in the position shown, commutator 355, contacts R35b in the position shown, connector 356, the set of contacts R26a now in shifted position, the connector 357, the solenoid 240—1 for printing the numeral "1," and the wire 351 to the negative conductor 306.

Because the plug connecter 340 connects the hub 167a for the #1 card reading position of the reading strip and the shunt plughub 171, the timing control relay R6 will be picked up simultaneously with translator relay R26 and timing relay R12 will be picked up through the reading strip and plug connector 340 upon the closing of contacts R6a, as explained hereinabove. Thus, timing relays R7 to R11, inclusive, are shunted out of the timing control circuit and relays R13 to R15 inclusive will be serially energized and then relays R6 and R12 to R15 inclusive will be deenergized in the manner previously explained, to provide the proper timing condition for effecting the typing of the numeral "1" and the escapement of the card carriage to the next card reading position. As will also be apparent from previous description, the energizing of the solenoid 240—1 will result in the printing of the numeral "1" in the #1 character space position on the sheet 203 of Fig. 17 and in escaping the typewriter carriage to character space position #2.

From an examination of Fig. 20 it is noted that the plug connector 340 and similar plug connectors 358 electrically interconnect the plughubs of the reading strip corresponding to column reading positions #1, #2, #3, #4, and #5 with the shunt plughub 171. Thus, upon sensing card columns #2, #3, #4, and #5 of detail card DC—1, the characters "2," "3," "4," and "5" will be printed in succession in corresponding character space positions on the sheet 203 of Fig. 17 in the same manner as just described in connection with the sensing of card column #1.

It is noted that in Fig. 20 the plughub 167b for card column #6 is connected by a connector 359 to plughub 167a for card column #29 and that plughub 167b for the latter column is connected by a connector 360 with a plughub 361 also identified on the plugboard by the legend "Skip tab." This plughub appears in Fig. 19e and is identified by the same legend and a portion of the conductor 360 is also shown therein and in dotted lines.

With the sensing of detail card column #6 the translator relay R31 will be energized by the reading circuit and the corresponding sets of translator relay contacts in Fig. 19c will be transferred to their shifted position and will thereby condition a typewriter operating circuit including the typewriter solenoid 240—6. This operating circuit will be apparent from the previous description and from an examination of Fig. 19c and consequently need not be traced. As the pair of plughubs 167a, 167b in the reading strip corresponding to the card column #6 are not electrically connected to the shunt plughub 171, the timing control circuit will now include all of the timing relays R6 to R15 inclusive and they will be energized and deenergized in the manner already described hereinabove. Also, the conditioned operating circuit will be energized with the closing of contacts R13d and the numeral "6" will be printed in the #6 character space position on sheet 203 of Fig. 17.

From an examination of card DC—1 in Fig. 14, it is noted that the next record field which includes columns 7 to 12 inclusive is entitled "Operation record No."; but that in Fig. 17 the next column of the typed data on the sheet 203 is entitled "Location" and that the first character of the typed data in this column begins in character space position #13. It is also noted that a code hole is punched in the #12 index point position of column #13 of the detail card DC—1 and that no code designations appear in columns #14 to #19 of the detail card DC—1 which is the field therein entitled "Location." It is also noted that in Fig. 16, the master card MC—1 in columns #14 to #19 contains code designations representing the characters "NO LOC," and that the lower case characters "no loc" are printed in character space positions #13 to #18 inclusive on the sheet 203. From this it is apparent that in the operation next to be described, the coded data in columns #7 to #17 inclusive of the detail card is to be omitted, that the typewriter carriage is to be moved or tabulated to character space position #13, and that the printing of the data appearing in character positions #13 to #18 inclusive is to be effected under the control of the master card MC—1. In order to provide this result, a "Skip tab" operation is first effected and then the control of the typing is shifted, by a control code designation in detail card column #13, from the detail card DC—1 to the master card MC—1.

*Skip tab operation.*—In effecting this operation the typewriter carriage is tabulated to its #13 character space position after the numeral "6" is printed in character position #6, and the record sensing unit effects a skipping operation of the card carriage so as to pass over card column reading positions #7 to #12 inclusive and then stop in column reading position #13. From Fig. 18, it is noted that the skip bar 50 is provided with a high portion 50*b* in the part thereof corresponding to card columns #7 to #12 inclusive. In the operation according to the specific problem being described, the Skip tab operation is effected under the control of the reading strip with the card carriage in column position #6 and, as stated, the timing is such that this operation is effected after the typewriter prints the numeral "6" in character space position #6.

With the card carriage in its #6 column reading position, as described previously, the closing of timing contacts R6*a* will also establish a control circuit through the reading strip which includes contacts R6*a*, the wires 341 and 342, contacts R11*b* in the position shown, the common strip 166, brushes 165*a* and 165*b* (Fig. 8) and the plughubs 167*a* and 167*b* for card column #6. The control circuit then extends from the latter plughub through the plug connector 359, the pair of plughubs for card column #29, the plug connector 360 to the "Skip tab" plughub 361 in Fig. 19*e* and from there through the pick up coil of relay R18 to the negative conductor 306. Thus, with the closing of timing contacts R6*a*, R18 will be picked up and will close its hold contacts R18*b* and thereby condition a holding circuit for its holding coil. The conditioned holding circuit extends from the positive conductor 305 through the latch contacts 35 (Fig. 19*a*); the wire 308; a wire 362 (Fig. 19*e*); the relay contacts R3*c*, R7*c*, R8*c*, and R15*c* which are connected in parallel; a wire 363; the now closed holding contacts R18*b*; a wire 364; and the hold coil of R18 to the negative conductor 306. This conditioned holding circuit for R18 is initially established by the closing of timing relay contacts R8*c* which occurs one step in the operating cycle after the closing of the holding contacts R18*b*. R18 and timing relay R7 are energized simultaneously by the closing of contacts R6*a*. Thus, R7*a* close to pick up timing relay R8 when R18*c* close to condition the holding circuit, and then R8 is energized and closes its contacts to establish the holding circuit for R18.

It is noted that timing relay contacts R15*c* (Fig. 19*e*) will keep the hold coil of R18 energized when the timing relay R15 is picked up. As timing relay R7 drops out before R15, contacts R7*c* will reclose before R15*c* open and will thereby hold R18 energized until timing relay R7 is picked up as the second step of the next card reading and operating cycle.

R18, when energized, also closes its contacts R18*c* and thereby establishes an energizing circuit through the skip magnet 56 of the record sensing unit 20 (Figs. 1, 7, and 19*e*). This energizing circuit for skip magnet 56 extends from the positive conductor 305 and follows the same path as the just described hold circuit for R18 to the wire 363, and from the latter the circuit extends through R18*c*, and the magnet 56 to the negative conductor 306. As explained hereinabove, in the description of the record sensing unit, under the sub-heading "Skip control means," the energizing of the skip magnet 56 results in moving the skip lifter 51 (Fig. 7) lengthwise over the top of the skip bar 50. The skip lifter will not be raised as an incident to the latter movement because the card carriage is now in the #6 column reading position where a notched out portion 50*a* is provided in the skip bar (Fig. 18). Consequently, the card carriage will remain in the #6 column sensing position until the escape magnet 40 is energized with the closing of timing relay contacts R15*a*, as previously described. When the escape magnet 40 is thus energized and then deenergized by the opening of contacts R15*a*, the card carriage escapes to the #7 card column reading position; and, in so doing, the end of the skip lifter 51, now over the top of skip bar 50, is raised by its engagement first with the cam portion 50*c* and then with the high portion 50*b* of the skip bar 50 (Fig. 18) and will thereby prevent the escapement dog 47 from reengaging the rack 15 and movement of the card carriage will continue until column sensing position #13 is reached where a notched out portion 50*a* is provided in the bar 50. Thus, the card carriage skips sensing positions #7 to #12 inclusive and comes to rest when the dog 47 is lowered to engage the rack at reading position #13. The floating cam contacts 169 are opened with the energizing of the magnet 40 and stay open until the card carriage stops in reading position #13.

With the lifting of the skip lifter 51 to effect skipping, as just explained, skip lifter contacts 59 are opened and thereby deenergize brush interlock relay R3 (Fig. 19*f*). R3 will close its contacts R3*c* (Fig. 19*e*) which are also in the energizing circuit for the hold coil of R18 and the skip magnet 56.

As explained previously, when relay R3 is deenergized it also opens its contacts R3*a* and the energizing circuits for the brush magnets 92 and 104 which withdraw the sensing brushes 122 and 101 from their sensing positions so as to prevent damage thereto during the skipping operation. With the deenergizing of brush magnet 92, its contacts 95 are closed and this energizes interlock relay R5 to open its contacts R5*a*. The opening of contacts R5*a* prevents the establishing of the reading, operating, and timing circuits as explained hereinabove. When the skip lifter is lowered at the #13 card reading position, the skip lifter contacts 59 are again closed to pick up R3 and close R3*a* to energize the two reading brush magnets. Contacts 95 will then be closed and relay R5 dropped out to close its interlock contacts R5*a*. R3 will also open its contacts R3*c* in the energizing circuit for the hold coil of R18 and the skip magnet 56, but, as stated above, this energizing circuit is maintained by R7*c* until R7 is picked up as the second step in the next operating cycle.

The typewriter carriage is tabulated to character space position #13 at the same time the above described skipping of the card carriage is being effected. When relay R18 was energized, as previously explained, it also closed its contacts R18*a* (Fig. 19*e*) and thereby establishes an energizing circuit for relay R19. The latter circuit follows the same path as the previously traced pick up circuit for R18 to the wire 365, and extends from the latter through contacts R18*a* now closed, a wire 366, and the pick up coil of relay R19 to the negative conductor 306. Relay R19 closes its hold contacts R19*a* and thereby energizes its hold coil by a circuit extending across the power line from positive conductor 305 through normally closed control stop contacts 256*a*, a wire 367, now closed hold contacts R19*a*, and the hold coil of relay R19 to the negative conductor 306. Relay R19 also closes its contacts R19c (Fig. 19e) and thereby conditions a pick up circuit for relay R20 which extends from the positive conductor 305, through the wire 347 (Fig. 19a), timing relay contacts R15a, and a wire 369 to the contacts R19c, and from the latter through the pick up coil of R20 to the negative conductor 306. Thus, when timing relay contacts R15a close relay R20 is energized at the same time as the escape magnet 40 (Fig. 19a). Relay R20 (Fig. 19e) is held energized by its hold contacts R20b by a circuit extending across the power line from positive conductor 305 through the normally closed control stop contacts 256a, the wire 367, contacts R20b, and the hold coil of relay R20 to the negative conductor 306. Relay R20 opens its interlock contacts R20a (Fig. 19a) which are in both the operating and timing circuits previously traced. The contacts R20a prevent the establishing of either of these circuits while the typewriter carriage is being tabulated. Relay R20 also closes its contacts R20c (Fig. 19e) to energize the solenoid 240—Tab of the typewriter by a circuit extending from the positive conductor 305, through a wire 370 and solenoid 240—Tab to the negative conductor 306. Thus, with the energizing of timing relay R15 and the closing of its contacts R15a the relay R20 (Fig. 19e) is energized; and one operating step later, when the contacts R20c close, the solenoid 240—Tab is energized which moves the tab lever 233 (Fig. 11) to its operated position and thereby effects a tabulating operation of the typewriter carriage 201 in the manner previously explained. When the carriage 201 reaches its character space position #13, the preset tab stop 230 engages the end of the tab lever 233 and thereby returns the latter to its normal position shown and stops the carriage at the #13 character space position. Simultaneously with the latter, the special control stop 256 in character space position #13 of the special control rack, opens the contacts 256a and thereby deenergizes relays R19 and R20. Relay R20 then opens its contacts R20c in the energizing circuit for the solenoid 240—Tab and closes again its interlock contacts R20a (Fig. 19a) to permit establishing of the typewriter operating and timing circuit.

*Shift to master card control.*—With the card carriage now in position to read column #13 of the detail card, the establishing of the reading circuit by the reclosing of floating cam contacts 149 and interlock contacts R5a, as previously described, will result in energizing the translator relay R37 through a code hole in the #12 index point position of the card DC—1. As shown in Fig. 9, this is the control code designation for effecting the shifting of control to the master card. Relay R37 shifts its set of translator contacts R37d (Fig. 19c) and thereby conditions an operating circuit through the detail card translator network in the same manner as previously explained. From an examination of Fig. 19c, this conditioned operating circuit can be readily traced to the outlet plughub 371 of the set of translator relay contacts R36d in their normal position shown, and from the hub 371 through a plug connector 372 (see also Fig. 20) to plughub 373 which is identified further by the legend "Master card selection PU." As shown in Fig. 19d, this conditioned operating circuit extends from the plughub 373 through the pick up coil of master card selector relay R38 to the negative conductor 306.

Thus, with the closing of timing relay contacts R13d, the just-traced operating circuit through the translator network and selector relay R38, is established. Relay R38 closes its hold contacts R38a to establish a circuit through its hold coil, which circuit extends from the positive conductor 305 through the latch contacts 35 (Fig. 19a), the wire 308, normally closed relay contacts R39a (Fig. 19d), and the contacts R38a. Relay R38 also transfers its selector contacts R38c (Fig. 19b) and thereby connects the master card translator network of Fig. 19b to the wire 323 and disconnects the detail card translator network of Fig. 19c from such wire 323. Thus, the master card network of Fig. 19b will now function to condition operating circuits under the control of code designations in the master card MC—1 and such conditioned circuits are established by the closing of timing relay contacts R13d.

As the above described operating circuit for energizing relay R38 does not operate a typewriter solenoid, the typewriter carriage will remain in its character space position #13. However, the card carriage will escape with the energizing of escape magnet 40 to the next column reading position which is #14. From Fig. 20, it will be noted that plughub 167a of the reading strip for card column #13 is electrically connected to the shunt hub 171 by a plug connector 375 extending to hub 167b for column #5, and by the other plug connectors 358 and 340 previously described. Thus, timing relays R7 to R11 inclusive were shunted out of the timing circuit for the just described operating cycle where relay R38 was energized.

The printing of the data under the title "Location" in the sheet 203 of Fig. 17 will now be described. With the closing of the floating cam contacts 149, card column #14 of the master card MC—1 will be sensed, which will result in the energizing of master card translator relays R51 and R45 and in transferring their related sets of translator contacts from the normal positions shown in Fig. 19b to their shifted positions, and in thereby conditioning an operating circuit through the master card translator network in the same manner as described hereinabove in connection with the sensing of code designations in the columns of the detail card DC—1. As will be apparent from the previous description, this conditioned operating circuit will extend from the positive conductor to contacts R38c over the same path as previously described operating circuits and will extend from the now transferred relay contacts R38c through the master card translator network to an outlet hub 376 of the set of relay contacts R45c in their shifted position and from such hub 376 through a plug connector 377 (see also Fig. 20) to the inlet hub for the typewriter solenoid 240—N (Fig. 19c) and from such solenoid through the wire 378 and wire 334 to the negative conductor 306. This operating circuit will be closed with the closing of timing relay contacts R13d; and, as the type basket is in lower case position, the lower case character "n" will be printed in character space position #13 of the sheet 203 in Fig. 17. As shown in Fig. 20, the plughub 167a for card column #14 in the reading strip is connected by plug connector 379 to the plughub 167b for column #13 and by other plughubs and connectors previously described to the shunt plughub 171. Consequently, timing relay contacts R7 to R11 will be shunted out of the operation just described in printing the lower case character "n."

In the same manner as described above, card column #15 of the master card MC—1 will be sensed and the lower case character "o" will be printed in character space position #14 of the copy sheet 203.

*Spacing the typewriter without printing.*—It is noted that no code hole designation is present in column #16 of the master card MC—1. Thus, when the floating cam contacts 149 close to read column #16, none of the translator relays of the master card translator relays will be energized. From an examination of the master card translator network (Fig. 19*b*), it will be apparent that with the sets of tanslator contacts in their normal position shown, a conditioned operating circuit can be traced from the shifted contacts R38*c* through the network to an outlet plughub 380 of the set of translator relay contacts R49*a* and from there through a plug connector 381 (see also Fig. 20) to a plughub 382 (Fig. 19*c*) and from there through a wire 383 and relay R70 to the negative conductor 306. Thus, with no code holes in the column being sensed and with the closing of timing relay contacts R13*d*, the just traced operating circuit will be established to energize relay R70 which will close its contacts R70*a* and thereby establish an energizing circuit for the solenoid 240—Space of the typewriter which is in parallel with the coil of relay R70. It is noted that this energizing circuit for solenoid 240—Space includes timing relay contacts R14*c* which are closed at this time as timing relay R14 is energized one step after R13 which is simultaneous with R70. As explained hereinabove, the energizing of the solenoid 240—Space results in spacing the typewriter carriage one character space position to its position #15.

In a manner which will be obvious from the previous description and from an examination of the circuit diagram and plugboard, columns #17, #18, and #19 of the master card MC—1 will now be read successively and the code designations recorded therein will effect the printing of lower case characters "1," "o," and "c" in character space positions #16, #17, and 18, respectively, of the sheet 203.

As will be apparent from Fig. 20, the plughubs of the reading strip corresponding to column sensing positions #15 to #19 inclusive are all electrically connected by plug connectors to the shunt hub 171. Consequently, in effecting the above described typing and spacing operations when these card columns were sensed, the timing relays R7 to R11 were shunted out and thereby had no effect on the timing of the operating cycles.

*Return of control to detail card.*—As shown in Fig. 20, the plughub 167*a* for column reading position #20 is connected by a plug connector 385 to a plughub 386 entitled "Master card selection DO" (see also Fig. 19*d*). Thus, when the card carriage escapes to the reading position for column #20 and with the subsequent closing of the timing relay contacts R6*a*, a control circuit is established from contacts R6*a* through the plughub 167*a* for column #20, the plug connector 385 and the plughub 386 and relay R39 to the negative conductor 306. Relay R39 opens its contacts R39*a* which, as stated above, are in the energizing circuit for the hold coil of relay R38. Thus, relay R38 will be deenergized and will transfer its contacts R38*c* (Fig. 19*b*) back to the position shown in Fig. 19*b* and thereby return the control of the operation to the detail card DC—1.

*Tabulating control by the detail card.*—With the card carriage in column sensing position #20 and when the floating cam contacts 149 close, detail card translator relays R37 and R35 will be energized because of the presence of code holes in the #12 and #0 index point positions of column #20 in the detail card (Fig. 14). From an examination of Fig. 9, it is noted that this code designation represents the tabulating operating function of the typewriter. The shifting of translator relay contacts corresponding to the relays R37 and R35 will condition an operating circuit through the detail card translator network of Fig. 19*c* to the outlet plughub 388 of the set of relay contacts R35*d* now in shifted position, and from the latter through a plug connector 389 (see also Fig. 20) to the plughub 390 (Fig. 19*e*), also identified by the legend "Space tab," and through wire 366 and the pick up coil of relay R19 to the negative conductor 306. When this conditioned operating circuit is closed by the closing of timing relay contacts R13*d*, relay R19 will be energized, and will thereby close its hold contacts R19*a* to establish a holding circuit therefor across the power line and including the control stop contacts 256*a* and the hold coil of relay R19. From this point on, a tabulating operation of the typewriter will be effected in the same manner as described above under the sub-heading "Skip tab"; i. e., relay R16 closes its contacts R19*c* and thus when timing contacts R15*a* close, relay R20 is picked up and the latter is held through its contacts R20*b* and contacts R256*a*. R20 also provides for the energizing of the solenoid 240—Tab through the closing of its contacts R20*c*. The typewriter carriage will be tabulated to character space position #26 where it is stopped by a preset regular tab stop 230 (Fig. 11) and where a control stop 256 opens contacts 256*a* to drop out relays R19 and R20 and through the opening of contacts R20*c* deenergizes the solenoid 240—Tab. R20*a* will reclose to establish the timing and operating circuits for the next cycle. During the operating cycle just described, the card carriage escapes to the next column reading position #21.

In the operating cycle just described, timing relays R7 to R11 inclusive are not shunted out of the timing control and thus relay R12 is not picked up until after R11 is energized and transfers its contacts R11*a*. As the above-mentioned circuit for energizing relay R39 is closed with the closing of timing contacts R6*a* at the beginning of the operating cycle, such relay has ample time for opening its contacts R39*a* and deenergizing relay R38 to transfer its contacts R38*c*, before the timing relay contacts R13*d* close to initiate the tabulating operation of the typewriter carriage just described.

The data appearing in Fig. 17 under the title "Quantity per assembly" will now be typed. With the reclosing of interlock relay contacts R20*a* at the end of the tabulating operation and with the closing of floating cam contacts 149, column #21 of the detail card DC—1 is sensed and the numeral "1" typed in character space position #26 of the sheet 203. In like manner columns #22 and #23 are sensed and the numerals "3" and "4" are typed in positions #27 and #28 of the sheet 203.

*Tabulating control by the reading strip.*—In the reading strip, the plughubs for card columns #21 and #22 (Fig. 20) are shown as interconnected by suitable plug connectors with the shunt plughub 171. Thus, timing relays R7 to R11 inclusive are shunted out when columns #21 and #22 are read. The plughub 167*a* for column #23 of the reading strip is shown as being connected by a plug connector 391 to the connector 389 and through the latter to the "Space tab" hub 390 (see also Fig. 19e). Thus, with the card carriage in column sensing position #23, the tabulating control relay R19 (Fig. 19e) is picked up with the closing of timing relay contacts R6a and is held energized through its hold contacts R19a and the control stop contacts 256a. However the tabulating operation is not effected until timing relay contacts R15a close and thereby establish through the now closed contacts R19c, the pick up circuit for relay R20. As described previously, R20 closes its contacts R20c to energize the solenoid 240—Tab and effect a tabulating operation of the typewriter carriage. As R20 is not picked up until after timing contacts R15a are closed, it will be apparent that there is ample time for effecting the above described printing of the numeral "4" in character space position #28 of the sheet 203 before the tabulating of the carriage 201 is begun. A regular preset tab stop 230 in character space position #32 stops the typewriter carriage at this position and a control stop 256 in the rack 250 at this same position opens the contacts 256a (Fig. 19e) and thereby deenergizes relays R19 and R20. Contacts R20c then open the energizing circuit for the solenoid 240—Tab.

*Shift and shift release operation from the reading strip.*—As shown in Fig. 17 under the column entitled "Standard unit cost," the character "$" is typed on sheet 203 in character space position #32. As will be apparent from Fig. 9, the "$" is an upper case character and consequently the type basket must be shifted to upper case position before the typewriter solenoid 240—$ for typing the character "$" is energized. The type basket is then shifted back to its lower case position. With the card carriage at its #24 column reading position, the shifting to upper case is effected under the control of the reading strip and before the solenoid 240—$ is energized in response to the reading of the code designation therefor recorded in card column #24 (Fig. 14). The shifting back to lower case is effected under the control of the reading strip with the card carriage at column position #25 and before the typewriter is operated from the code designation in column #25 of the detail card.

As shown in Fig. 20, the plughubs 167a for both columns #24 and #25 of the reading strip are connected by a plug connector 393 and the plughub 167b for column #24 is connected by a plug connector 394 to both the "Shift" plughub 395 and also to the "Shift release" plughub 396 (see also Fig. 19f). The "Shift" hub 395 is connected through interlock relay contacts R72a, R73a, R56a, and R54a and the pick up coil of shift control relay R53 with the negative conductor 306. The "Shift release" hub 396 is connected through interlock relay contacts R72c, R73b, R55a, and R53a and the pick up coil of shift release control relay R54 with the negative conductor 306. As stated hereinabove, when the type basket 205 is in its normal or lower case position, the transfer contacts 236, 237, actuated by the type basket, are in the position shown where interlock relay R56 is held energized by contacts 236 and interlock relay R55 is deenergized due to open contacts 237. Thus, interlock contacts R56a are now closed and they thereby condition an energizing circuit for the shift control relay R53, and interlock contacts R55a are now open and they thereby prevent the establishing of an energizing circuit for the shift release control relay R54. The interlock contacts R72a, R72c, R73a, R73b, R54a, and R53a normally occupy their closed positions shown as their related relays are not energized except as a part of the shift and shift release operations. When the type basket 205 is in upper case position, contacts 237 are closed and 236 are open and, as a result, relay R55 is energized and R56 is deenergized. Thus, in the upper case position, R55a are held closed to condition an energizing circuit for shift release relay R54, and R56a are open and thereby prevent the establishing of an energizing circuit for shift control relay R53. It will be apparent that because of this interlocking contact and circuit arrangement, a common circuit path can be used for effecting both the shift and shift release operations of the typewriter.

With the closing of floating cam contacts 149 at column reading position #24 and with timing relay contacts R6a being closed, a circuit is established through the reading strip from contacts R6a to the "Shift" hub 395 (Fig. 19f) and from the latter the circuit extends through the contacts R72a and R73a, R56a and R54a and the pickup coil of relay coil R53 and to the negative conductor 306. Thus, R53 is energized and closes its hold contacts R53b to establish a hold circuit as follows: from the positive conductor 305 through a wire 397, normally closed contacts R55c, now closed hold contacts R53b, a wire 398, and the hold coil of R53 to the negative conductor 306. Contacts R53d also close to establish an energizing circuit for the typewriter solenoid 240—Shift extending from the wire 397. Interlock contacts R53a open to prevent energizing of the shift release control relay R54 while the shift operation is being effected. Interlock contacts R53c (Fig. 19a) open to prevent timing relay R12 from picking up before the basket shifting operation has been completed. Interlock relay R72 is also picked up, with the closing of R53b and the energizing of relay R53, by a branch circuit extending from the wire 398 through a wire 400 and pick up coil of R72 to the negative conductor 306. Interlock relay R72 closes its hold contacts R72b (Fig. 19e) to energize the hold coil of R72 by a circuit extending from the floating cam contacts 149 (Fig. 19a) through a wire 401 and the now closed hold contacts R72b (Fig. 19e) to the hold coil of R72 and the negative conductor 306. The latter circuit remains closed to the end of the cycle when the escape operation opens the contacts 149. R72 also opens its interlock contacts R72a (Fig. 19f) and thereby breaks the energizing circuit for the pick up coil of relay R53. R72 also opens its interlock contacts R72c in the pick up circuit for relay R54 (Fig. 19f).

As explained hereinabove, with the energizing of the solenoid 240—Shift, the shift lock lever 216 (Fig. 1) of the typewriter is pulled down and thereby locks the key lever 220, to which lever 216 is pivoted and on which shift key 235 is mounted, in its shifted position. The shift key lever when thus actuated effects the shifting of the type basket to upper case position in a manner well known to those skilled in this art.

As stated when the type basket has completed its shifting movement to upper case position, interlock relay R55 is energized and R56 is deenergized by the transferring of contacts 236, 237 (Fig. 19f). R55 then opens its interlock contacts R55c to deenergize the hold coil of relay R53, the pick up circuit for R53 having been previously opened by interlock relay contacts R72a, Contacts R53*d* will then open to deenergize the solenoid 240—Shift. Relay R55 also closes its interlock contacts R55*a* to condition an energizing circuit for shift release control relay R54. Interlock contacts R53*c* (Fig. 19*a*) reclose with the deenergizing of R53 and thereby permit continuing of the cycle of operation under the control of the detail cards by the serial energizing of timing relays R12 to R15 inclusive in the manner previously explained.

When the card carriage moved to column reading position #24 and the floating cam contacts 149 closed, as explained above, the translator relay R36 was energized because of the presence of a code hole in index point position #11 of column #24 of the detail card. Thus, R36 transferred its set of translator relay contacts of the network in Fig. 19*c* to their shifted position to condition an operating circuit path through the network to the solenoid 240—$. This conditioned operating circuit extends from the outlet plughub 402 of the set of contacts R35*c* in the position shown, through a plug connector 403 and the solenoid 240—$ to the wire 334 and negative conductor 306. Thus, with the reclosing of interlock contacts R53*c* and when timing relay contacts R13*d* are closed, this conditioned operating circuit is energized and the typewriter operated to type the upper case character "$" in character space position #32 of the sheet 203 in Fig. 17.

The card carriage then spaces to column reading position #25 and the typewriter to character space position #33. As stated, the opening of floating cam contacts 149 by the raising of escape pawl 47, opens the hold circuit for interlock relay R72 (Fig. 19*e*) which thereby recloses its contacts R72*c*. With the card carriage at column sensing position #25, the type basket is first returned to lower case position under the control of the reading strip, and then the typewriter is operated under the control of column #25 of the card DC—1.

With the closing of the floating cam contacts 149 at column #25, an energizing circuit is established for the hold coil of relay R71 (Fig. 19*b*). R71 closes its control contacts R71*a*. This circuit for R71 is established during each operating cycle; but it is mentioned for the first time at this point because it is only useful during a shift release operation when it functions to control through contacts R71*a*, the length of time the typewriter solenoid 240—Shift release is energized. As explained previously, the shift release operation of the typewriter is effected by first energizing the solenoid 240—Shift release and then by deenergizing such solenoid. When this solenoid is energized, it pulls down the shift release key lever (Fig. 1) and the latter, through a suitable link-and-lever arrangement, pulls down the shift key lever and thereby effects the unlocking of the shift lock key 216. The deenergizing of solenoid 240—Shift release permits the key lever 220, on which the shift release key 217 and shift key 235 are mounted, to return to their normal positions shown. The return of the shift key lever 220 to its normal position effects the return of the type basket to lower case position, in a manner well known to those skilled in this art. As shown in Fig. 19*a*, the energizing circuit for the relay R71 extends from floating cam contacts 149 and includes timing relay contacts R11*a* in the position shown, and from the latter the circuit extends through a wire 403, contacts R73*d* (Fig. 19*b*) in the position shown, and hold coil of R71 to the negative conductor 306.

With the closing of timing relay contacts R6*a* at column sensing position #25, a control circuit is established through the plughubs 167*a* for columns #25 and #24 of the reading strip and through the conductor 394 to the "Shift release" plughub 396 (Fig. 19*f*), and from the latter, through the relay contacts R72*c* and R73*b* in the position shown, relay contacts R55*a* now closed, contacts R53*a* in the position shown, and the pick up coil of R54 to the negative conductor 306. R54 opens its interlock contacts R54*c* (Fig. 19*a*) to prevent the energizing of the timing relay R12 until after the shift release operation is completed. R54 closes R54*d* (Fig. 19*f*) to establish an energizing circuit for the solenoid 240—Shift release extending across the power line and through the now closed contacts R71*a*, referred to above. Relay R54 also closes its contacts R54*b* and thereby establishes a hold circuit for its hold coil extending from the positive conductor 305 through the wire 405, interlock contacts R56*c* in the position shown, the hold contacts R54*b* now closed, wire 406, and the hold coil of R54 to the negative conductor 306. The establishing of the hold circuit will also energize interlock relay R73 through a branch circuit extending from the wire 406 through a wire 407 and the pick up coil of R73 to the negative conductor 306. R73 closes its contacts R73*b* (Fig. 19*e*) and thereby establishes a circuit for its hold coil, which circuit includes the floating cam contacts 149 (Fig. 19*a*) and the wire 401. R73 opens its interlock contacts R73*a* (Fig. 19*f*) in the pick up circuit for R53 and its interlock contacts R73*b* in the pick up circuit for R54. These contacts R73*a* and R73*b* function in a shift release operation the same as interlock contacts R72*a* and R72*c* function in a shift operation. Relay R73 also opens its contacts R73*d* (Fig. 19*e*) which are in the previously described energizing circuit for R71. Contacts R71*a* (Fig. 19*f*) then open to open the energizing circuit for the solenoid 240—Shift release, and thereby complete the shift release operation in the manner referred to above. From the foregoing it is noted that the solenoid 240—Shift release and relay R73 are energized during the same step, the solenoid by R54*d* and the relay by R54*b*, and that such solenoid remains energized for only a short period of time which is determined by the time required for relay R73 to open its contacts to drop out relay R71 and for R71 to be deenergized and open its contacts R71*a*.

With the deenergizing of the solenoid 240—Shift release in the manner just explained, the type basket will be returned to its lower case position and will thereby transfer its contacts 236, 237 back to the position shown in Fig. 19*f* to drop out interlock relay R55 and pick up relay R56. Relay R55 will then open its contacts R55*a* in the pick up circuit for relay R54, and relay R56 will open its contacts R56*c* in the hold circuit for relay R54 and will close its contacts R56*a* to condition the pick up circuit for R53. The hold coil of relay R54 will then drop out and reopen its contacts R54*b* and close its contacts R54*a*. Relay R54 will also reclose its interlock contacts R54*c* (Fig. 19*a*) to permit timing relay R12 to be picked up and thereby provide for the continuing of the operating cycle under the control of column #25 of the detail card DC—1.

It is noted that the pick up coil of R71 (Fig. 19*b*) will be energized with the closing of timing relay contacts R13*a*. However, the energizing of R71 at such time will not effect the reenergizing of 240—Shift release because the interlock contacts R54c assure that R12 will not pick up in the operating cycle until R54 is deenergized and R54d (Fig. 19f) thereby opened, the latter contacts being in the energizing circuit for 240—Shift release. As will appear hereinafter, the pick up coil of R71 is used in a shift release operation under the control of a code combination in the detail card.

When the above described shift release operation was initiated by the closing of floating cam contacts 149 at column reading position #25, such column of the detail card DC—1 was sensed by the brushes 122 in the usual manner. As no code designation appears in column #25, none of the detail card translator relays are energized. With the sets of translator relay contacts of Fig. 19c in their normal or unoperated positions shown, a conditioned operating circuit for the solenoid 240—Space can be readily traced through the translator network to the outlet hub 410 of the set of translator contacts R34a in the position shown, and thence through a plug conductor 411 to the "Space" plughub 412 and from there through hub 382 and wire 383 and the coil of relay R70 to the negative conductor 306. With the reclosing of interlock contacts R54c (Fig. 19a) at the end of the shift release operation and with the consequent continuing of the serial energizing of timing relays R12 to R15 inclusive, the conditioned operating circuit just traced is closed with the closing of timing relay contacts R13d and as a result the relay R70 is energized and closes its contacts R70a to establish, through timing relay contacts R14c, an energizing circuit for the solenoid 240—Space. As a result, the typewriter carriage is spaced to character space position #34. The card carriage will also be spaced to column reading position #26. As columns #26 and #27 of the detail card DC—1 do not contain code designations, the just described operation will be repeated twice and the typewriter carriage spaced twice to character space position #36. The card carriage also spaces twice to column reading position #28.

With the card carriage now in column sensing position #28, the typing of the decimal point (.) in character space position #36 of sheet 203 will be effected under the control of the reading strip, and this will occur before the typing of the character "1" in character space position #37 under the control of the code designation recorded in column #28 of the detail card DC—1. As shown in Fig. 20, plughub 167a for column #28 of the reading strip is connected by a conductor 414 to the inlet hub for the solenoid 240—. (period) which prints the period or the decimal point. Thus, when timing relay contacts R6a close, this typewriter solenoid is energized and the decimal point printed and the typewriter escapes to character space position #37 while timing relays R7 to R11 inclusive are being serially energized.

With the card carriage in column sensing position #28, and with the closing of floating cam contacts 149, column #28 of the card DC—1 is read and the translator relay R26 is energized and thereby shifts its sets of translator contacts in the translator network of Fig. 19c to condition an operating circuit therethrough extending to the outlet hub of contacts R26a in their shifted position and thence through conductor 357 and the solenoid 240—1 to the negative conductor 306. With the closing of timing relay contacts R13d, this conditioned operating circuit will be energized as described previously, and the numeral character "1" typed in character space position #37. The typewriter carriage escapes to character space position #38 and the card carriage to column reading position #29. Column #29 of card DC—1 is then read and the typewriter operated to print the character "O" in character space position #39.

As stated hereinabove, plughub 167b for column #29 of the reading strip (Fig. 20) is connected by the conductor 360 to the "Skip tab" plughub 361. As shown in Fig. 18, the skip bar 50 is provided with a high portion 50b extending from card columns #30 to #37, inclusive. Thus, a skip tab operation is effected after the above described reading of card column #29 and printing of the "O" in character space position #39. This operation was described in detail hereinabove under the sub-heading "Skip tab operation" and it is, therefore, believed to be unnecessary to repeat a detailed description thereof at this point, except to say that the typewriter carriage is tabulated to character space position #46 where it is stopped by a preset regular tab stop 230 (Fig. 11) and where a control stop 256 opens contacts 256a to deenergize the tabulating control relays R19 and R20 (Fig. 19e). Also, the card carriage skips column reading positions #30 to #37, inclusive and stops in column reading position #38. Upon examination of Fig. 14, it will be apparent that the latter operation skips two record fields of the detail card DC—1 which are entitled "Serial No." and "Dept. No.," respectively.

*Rendering effective the three consecutive column control.*—It is noted at this point that, according to the illustrative embodiment of the present invention, means is also provided herein for effecting automatically a selected operation of the apparatus when a predetermined number of consecutive record columns are sensed and which bear, respectively, the same code designation. As will be apparent to those skilled in this art, an automatic control of this type may be used in a variety of useful ways. As a record column of the card in which no code holes have been punched, referred to herein as a blank column, provides for operating the typewriter solenoid 240—Space, as described previously, a blank record column is considered herein as being the code designation representing the spacing operation of the typewriter carriage. According to the illustrative embodiment this automatic control is advantageously used to effect the automatic ejection of the detail card being read and the automatic return of the typewriter carriage to character space position #1 and line spacing the platen, upon the sensing of three consecutive blank record columns in the detail card. The advantages of this control will be apparent from an examination of the detail record cards of Figs. 14 and 15. The last field of the cards to be sensed is entitled "Description" and varies in length in the two cards. The card DC—2 of Fig. 15 does not bear code designations after record column #66. Thus, in a manner which will be explained more fully hereinafter, upon sensing three consecutive blank columns the card DC—2 will be automatically ejected and the typewriter carriage returned to its #1 character space position. This operation will, therefore, save the operating time required to sense the remaining blank columns of the card. The advantages of this control will also be apparent in considering an application where the apparatus of the present invention is used as a letterwriter and wherein the data recorded in each detail card represents a line of typing. In the latter case, the card will be ejected and the carriage returned when such card contains data for typing a short line, such as the end of a paragraph, an address, salutation, heading, etc. As indicated above, this control is referred to herein as the "three consecutive column control" and its operation will be described more fully hereinafter in connection with card DC—2. Provision is also made for preventing operation of the three consecutive column control when sensing three successive blank columns in intermediate portions of a card when the card also contains code data to be printed in columns following such blank columns. In order to explain this latter feature, the three consecutive column control is made effective, in the particular problem being described, in column sensing position #38, and this is the reason why this brief general description of the function and purpose of the three consecutive column control is given at this point.

As shown in Fig. 20, the hub 167b for column 38 of the reading strip is connected by a plug connector 416 to the PU or pick up hub 417 of the reversing relay (see also Fig. 19d). Thus, when the card carriage escapes to column reading position #38 and the timing relay contacts R6a close, relay R64 is energized through the reading strip. R64 closes its hold contacts R64a and thereby establishes a holding circuit through the hold coil of R64 which extends from the positive conductor 305 through the latch contacts 35 (Fig. 19a), the wire 308, the wire 418 (Fig. 19d), normally closed drop-out relay contacts R68a, contacts R64a now closed and the hold coil of R64 to the negative conductor 306. R64 also closes its contacts R64c and thereby establishes an energizing circuit for the reversing relay R65, which circuit also extends from the positive conductor 305 through the latch contacts 35 and the normally closed contacts R68a and through now closed contacts R64c and the coil of relay R65 to the negative conductor 306. Thus, relays R64 and R65 are held energized through the latch contacts 35 and the normally closed drop-out contacts R68a.

As shown in Fig. 19b, reversing relay R65 has twelve sets of transfer contacts identified, respectively, as R65a to R65m, inclusive. In the specific problem now being described, the lowermost set R65a are the only ones that are used. For the set R65a, three plughubs are shown in Fig. 19b in horizontal alignment and are identified as the inlet hub 420, the normal outlet hub 421 and the controlled outlet hub 422. The inlet plughub 420 of this set is connected by a connector 423 with the "Space" plughub 382 of Fig. 19c (see also Fig. 20). The controlled outlet plughub 422 of this set is connected by a connector 424 with the "PU" or pick up hub 425 of the three consecutive column control (Figs. 19d and 20). A plug connector does not extend from the normal hub 421 as no control is effected with the relay R65 deenergized.

With contacts R65a in their shifted position due to the fact that R65 is now energized, the establishing of an operating circuit through the relay translator network of Fig. 19c as a result of sensing a blank record column in the detail card will, in addition to energizing the solenoid 240—Space in the manner previously described, also establish a branch parallel circuit from the hub 382 through the connector 423 to the hub 420 of contacts R65a, and through such contacts in their shifted position, the controlled outlet hub 422, the connector 424 to the "PU" hub 425 of the three consecutive column control (Fig. 19d), and from the latter to the pick up coil of relay R57 and thence to the negative conductor 306. The operation of the three consecutive column control will be described in detail hereinafter under a special sub-heading and in connection with the reading of detail card DC—2. As stated hereinabove, this control operates when three consecutive blank columns are sensed to eject the card being read and to return the typewriter carriage to start a new line of typing. The operation of the three consecutive column control may be prevented at any time by the energizing of drop-out relay R63 (Fig. 19d) which opens its contacts R63a and R63c and thereby drops out any relays of the control which have been picked up as a result of previously sensing one or two blank columns in the detail record card. Also, the three consecutive column control is rendered ineffective for all card columns either by opening the latch contacts 35 (Fig. 19a), or by energizing drop-out relay R68 (Fig. 19d), which will open its contacts R68a to deenergize relays R64 and R65 and restore contacts R65a to their normal position shown.

As reversing relay R65 is energized under the control of the reading strip and before contacts R13d close, the energizing of this relay to render effective the three consecutive column control at column reading position #38, as described above, does not interfere with the sensing of column #38 of the detail card DC—1 and in operating the typewriter as a result of such sensing. Thus, columns #38 to #42 inclusive of card DC—1 are sensed successively and the data represented by the code designation in these columns is typed in character space positions #46 to #50 of copy sheet 203 in the column entitled "Engineering change No."

As shown in Fig. 20a, plughub 167a for column #42 of the reading strip is connected by connectors 427 and 359 to the plughubs 167a, 167b for column #29 and the latter are connected by a connector 360 to the Skip tab hub 361. It is also noted that the skip bar 50 of Fig. 18 is provided with a high portion 50b opposite card column positions #43 and #44. Thus, after column #42 of detail card DC—1 is read and the typewriter operated in response thereto, a Skip tab operation is effected in the same manner as previously described to move the card carriage to column reading position #45 and to move the typewriter carriage to character space position #56. As will be noted from Fig. 11, a regular tab stop 230 has been preset in character space position #56 and a control stop 256 has been placed in the rack 250 at the point corresponding to the position #56. Thus, when the typewriter carriage reaches character space position #56, the carriage is stopped and the control contacts 256a are opened to drop out the tab control relays R19 and R20 and the solenoid 240—Tab.

Columns #45 to #50 inclusive of the detail card DC—1 are sensed successively and the character data represented by the code designations therein are printed in character space positions #56 to #61 inclusive of the sheet 203 under the title "Bill of material." The card carriage is now in column sensing position #51 and the typewriter carriage in character space position #62.

*Shift and shift release under control of record card.*—Card columns #51 to #53 inclusive of DC—1 contain control data for printing the asterisk (*) to indicate that the particular part to which the data in the typewritten line 1 of the sheet 203 pertains, is a purchased part. As will be noted from an examination of Figs. 1, 9, and 19c, the asterisk (*) is the upper case character on the type bar which carries the lower case numeral character "2." Thus, in order to print the character "*," the type basket must first be shifted to upper case position and held there while the solenoid 240—* is energized, and then the type basket returned to lower case position. As shown in Fig. 9, both the shift and shift release operations are represented by a code designation which comprises a code hole in the #0 index point position and a code hole in the #1 index point position. As shown in Fig. 14, this code designation is recorded both in column #51 and #53 of card DC—1 and a code hole is punched in the #2 index point position of record column #52.

With the sensing of the 0—1 code combination in record column #51, detail card translator relays R35 and R26 are energized and shift their associated sets of contacts to condition an operating circuit through the translator network of Fig. 19c, which circuit extends from the outlet plughub 430 for the set of contacts R26b through a connector 431 to both the Shift inlet hub 432 and the Shift release inlet hub 433 (Figs. 19f and 20). As explained above under the sub-heading entitled "Shift and shift release operation from the reading strip," with the type basket in lower case position, relay R56 is energized and relay R55 deenergized. Thus, with the establishing of the just mentioned operating circuit by the closing of timing contacts R13d, shift control relay R53 is picked up, which will result in the energizing of the solenoid 240—Shift and the shifting of the type basket in the same manner as previously described when the energizing impulse came from the reading strip. The card carriage will escape to read column #52, but the typewriter will remain in character space position #62 as neither a character nor the space key lever was actuated. Column #52 will then be read in the normal manner and the upper case character "*" printed in position #62 on the sheet 203. The typewriter carriage will then escape to position #63 and the card carriage to column reading position #53.

As explained previously, with the type basket in upper case position, basket contacts 236, 237 are in their shifted position where relay R55 is energized and R56 deenergized. Thus, with the sensing of the 0—1 code designation in column #53 of DC—1, the conditioned operating circuit will include the shift release control relay R54 (Fig. 19f), which will be picked up when timing relay contacts R13d close, and then held by its hold contacts R54b. Contacts R54d also close to establish an energizing circuit for 240—Shift release through contacts R71a which are closed with the energizing of the pick up coil of R71 (Fig. 19b) by the closing of timing relay contacts R13a. It is noted that, although the hold coil of R71 is also energized during this cycle with the closing of the floating cam contacts 149, as described above under the sub-heading "Shift and shift release operation from the reading strip," such circuit is opened by the transferring of contacts R11a (Fig. 19a) which occurs at an earlier point in the operating cycle and before R13d close to energize R54. Thus, the pick up coil of R71 closes the contacts R71a to establish the energizing circuit for 240—Shift release when the operation is under the control of the record column of the card, and the hold coil of R71 closes the contacts R71a when the operation is controlled by the reading strip. As is apparent to those skilled in this art, the relay R71 is double wound and its contacts R71a are actuated by the energizing of either the pick up or the holding coil thereof. For convenience the coils are shown separate in Fig. 19b. In the operation now being described, R13 will drop out with the opening of timing relay contacts R12a at the correct time in the cycle, and R13a will then open to deenergize the pick up coil of R71, which will open its contacts R71a and the energizing circuit for 240—Shift release. The latter solenoid will then be deenergized to complete the shift release operation in the manner as explained hereinabove.

The typewriter carriage is tabulated to character space position #66 under the control of the reading strip. As shown in Fig. 20, the plughub 167a for column #53 of the reading strip is connected by connector 435 to plughub 167b for column #23. As previously explained, plughub 167a of column #23 is connected by connector 391 to the Space tab inlet hub 390 (see also Fig. 19e). Thus, with the card carriage at column #53 and after the effecting of the shift release operation in response to the sensing of the code designation in column #53, the solenoid 240—Tab of the typewriter is energized in the manner fully described hereinabove when column #23 was sensed. As a result, the typewriter carriage is tabulated to character space position #66 where a regular preset tab stop 230 (Fig. 11) stops the carriage 201 and where a control stop 256 opens its contacts 256a to deenergize tab control relays R19 and R20 and the solenoid 240—Tab.

The card carriage escapes to column reading position #54. As shown in Fig. 20, plughub 167a for column #54 is connected by a connector 436 with the connector 394 that extends to both the Shift and Shift release hubs 395 and 396 respectively. Thus, the type basket will be again shifted to upper case position under the control of the reading strip from column reading position #54 and before the character represented by the code designation recorded in column #54 of card DC—1 is printed.

With the type basket in upper case position, columns #54 to #79 of the detail card will be successively sensed and the upper case characters represented by the code designations recorded therein will be printed on the sheet 203 in character space positions #66 to #91 inclusive and under the title "Description."

After the reading of column #79 in the card, the card escapes to column #80 and the typewriter carriage escapes to character space position #92. The skipping of the card carriage to column #80 will effect automatically the ejecting of detail card DC—1 and the feeding of detail card DC—2 into the card carriage. The escaping of the typewriter carriage to character space position #92 will effect a carriage return operation of the typewriter in which the carriage 201 is automatically returned to character space position #1 and the platen 202 is automatically line spaced so that printing will begin in the next line.

*Card eject and new card fed from column #80.*—As explained hereinabove under the sub-heading "Initial card feeding operation," the last column contacts 145 (Fig. 19f) are closed when the card carriage escapes to column #80. This will result in the picking up of relay R1 which shifts its contacts R1a and thereby deenergizes both brush magnets 92 and 104. Relay R1 also opens its contacts R1b, the function of which was described previously and will also be referred to hereinafter in connection with a release operation of the card carriage which results from the sensing of three consecutive blank card columns. The function of contacts R1c will also be explained hereinafter. Relay R1 also opens its contacts R1d (Fig. 19d) which drop out any of the relays of the three consecutive column control which might be energized at this point, as will also appear hereinafter. When the brush magnet 92 drops out, its contacts 95 close and energize relay R5 as explained hereinabove. Contacts R5a open and thereby prevent the establishing of any operating or timing circuits. Contacts R5c (Fig. 19f) close and thereby energize the eject magnet 79 through a circuit extending from the positive conductor, through the now closed last column contacts 145 and the closed switch 303. As explained hereinabove, the energizing of the eject magnet 79 will effect removal of the detail card DC—1 from the card carriage and will close the auto start contacts 84 (Fig. 19*f*) to energize the trip magnet 32 which effects the return of the card carriage to its #1 column reading position and the feeding of the bottom detail card (which is DC—2) from the magazine 120 into its proper position in the card carriage. The energizing of the trip magnet results in the opening of latch contacts 35 and the closing of contacts 36 (Fig. 19*a*). Closed contacts 36 energize the motor 22 to effect the just mentioned return of the card carriage and the feeding of the new detail card. The opening of latch contacts 35 drops out the skip interlock relay R3 (Fig. 19*f*) and the card lever control relay R4. R3 opens its contacts R3*a* (Fig. 19*a*) in the brush magnet circuit and R4 opens its hold contacts R4*a* (Fig. 19*f*) and its interlock contacts R4*b* (Fig. 19*a*) which are in the reading, timing, and operating circuits. The opening of latch contacts 35 also drops out the reversing control relay R64 and the reversing relay R65. The dropping out of the latter relays renders ineffective the operation of the three consecutive column control until such relays are again picked up at column reading position #38 in the same manner as explained hereinabove. With the beginning of the return movement of the card carriage, the last column contacts 145 open and drop out relay R1 which returns all of its contacts to the position shown. As the card carriage approaches its #1 column reading position and the new card DC—2 is fed into the carriage, the latch contacts 35, 36 (Fig. 19*a*) are restored to the position shown and the card lever contacts 156 (Fig. 19*f*) are closed. The closed contacts 35 and 156 reestablish the energizing circuit for relay R4 which closes again its hold contacts R4*a* and also closes its interlock contacts R4*b* (Fig. 19*a*) in the reading circuit and R4*c* in the brush magnet circuit. The closed latch contacts 35 also reestablish the energizing circuit for relay R3 (Fig. 19*f*) which closes its contacts R3*a* (Fig. 19*a*) in the brush magnet circuit. As relay contacts R1*a*, also in the brush magnet circuit, reclosed with the dropping out of R1 when last column contacts 145 opened, now closed contacts R4*c* and R3*a* will establish again the energizing circuit for the brush magnets 92 and 104. When thus energized, the brush magnet 92 opens its contacts 95 and thereby drops out relay R5 which permits contacts R5*a* to again close. As explained previously, these latter operations will occur after the next detail card DC—2 has been fed into the card carriage and positioned with its #1 record column in reading position.

*Automatic carriage return operation from a selected character space position.*—As explained hereinabove a control stop 257 is in character space position #92 of the control tab rack 250 (Fig. 11). Thus, when the typewriter carriage escaped to position #92 as described above, stop 257 closed its contacts 257*a* (Fig. 19*e*) which, when timing relay contacts R14*b* closed, established an energizing circuit for the pick up coil of carriage return control relay R21. As a result, R21 closes its hold contacts and thereby establishes a circuit through the hold coil of R21 which extends from the positive conductor 305 through normally closed control stop contacts 255*a*, a wire 440, a wire 441, now closed contacts R21*a*, the hold coil of R21, to the negative conductor 306. R21 also shifts its contacts R21*c* and thereby conditions a pick up circuit for R23, R74, and R75, which circuit is closed by timing relay contacts R15*a* (Fig. 19*b*). The latter circuit extends from the positive conductor 305, through wire 347 (Fig. 19*b*), contacts R15*a*, wire 369, R21*c* now shifted (Fig. 19*e*), to wire 442, and thence through pick up coils of R23 and R74 and the coil of R75, in parallel, to the negative conductor 306. R23 closes its contacts R23*b* and thereby establishes a circuit through the hold coil of R23 which also includes the normally closed control stop contacts 255*a* and the wires 440 and 441. R23 opens its interlock contacts R23*a* (Fig. 19*a*) and thereby prevents the establishing of operating or timing circuits for the succeeding operating cycle. R23*a* is held open, until the carriage return operation has been completed and R21 and R23 are deenergized by the opening of contacts 255*a*, which occurs when the typewriter carriage reaches the #1 character space position and the control stop 255 (Fig. 11), in such position in the rack 250, opens the contacts 255*a*.

R23 also closes its contacts R23*c* (Fig. 19*e*) which, because the type basket is now in upper case position, first energizes the solenoid 240—Shift release (Fig. 19*f*) to return the type basket to its lower case position and then energizes the solenoid 240—Carriage return (Fig. 19*e*). Were the type basket in lower case position R56*d* would be in shifted position and the closing of R23*c* would, therefore, energize solenoid 240—Carriage return and thereby effect the carriage return and line spacing operation without further delay. However with the type basket in upper case position basket contacts 236 (Fig. 19*f*) are open and R56 is deenergized and its contacts R56*d* in the position shown in Fig. 19*e*. Thus, when R23*c* close, as explained before, a circuit is established from the positive conductor 305 through the contacts R23*c*; the contacts R56*d*, in the position shown; contacts R74*a*, closed when R74 was picked up by the shifting of R21*c*; a wire 444, and solenoid 240—Shift release (Fig. 19*f*) to the negative conductor 306.

R74 (Fig. 19*e*) when energized by the shifting of R21*c*, also closed its hold contacts R74*c* and thereby established a holding circuit across the line which includes normally closed contacts R76*a*. As R75 is picked up at the same time as R74, its contacts R75*c* opened before hold contacts R74*c* closed, so R76 does not pick up to open R76*a* and thereby prevent the establishing of the just mentioned hold circuit for R74. R75 is deenergized when the timing relay contacts R15$a$ are opened at their regular time in the operating cycle and thereby permits its contacts R75$c$ to close and establish an energizing circuit for R76. R76 opens its contacts R76$a$ and thereby drops out the holding circuit for R74. R74 then opens its hold contacts R74$c$ to drop out R76 and also opens its contacts R74$a$ to deenergize solenoid 240—Shift release and thereby effect the return of the type basket to its normal or lower case position. As a result, basket contacts 236 (Fig. 19$f$) reclose and pick up the relay R56 which transfers its contacts R56$d$ (Fig. 19$e$) and thereby establishes an energizing circuit for solenoid 240—Carriage return which includes the now closed contacts R23$c$. Thus, a carriage return operation is effected and, at the completion thereof, control stop contacts 255$a$ are opened and thereby open the holding circuits for the relays R21 and R23 which control the carriage return operation. R23, when thus deenergized, permits its interlock contacts R23$a$ (Fig. 19$a$) to reclose and permit the establishing of the operating and timing circuits for the next operating cycle.

With the card carriage now at the #1 column sensing position and with the typewriter carriage at its # 1 character space position and the platen line spaced to begin the next line of typing, columns #1 to #6 of the card DC—2 are read successively and the characters represented by the recorded code designations therein are typed in character space positions #1 to #6 inclusive of the second line of typing on the sheet 203. A skip tab operation will effect the skipping of the card carriage over column sensing positions #7 to #12 inclusive and the tabulating of the typewriter carriage to character space position #13, the same as described above in connection with card DC—1. As column #13 of detail card DC—2 is blank, the control of the operation will remain in the detail card, and the card carriage and typewriter carriage will each be spaced one position. The operation of the apparatus in sensing card columns #14 to #65 inclusive and in printing the character data recorded therein on sheet 203 will be readily understood from the above detail description.

*Operation of the three consecutive column control.*—As explained hereinabove, when the three consecutive column control is rendered effective, it provides for the automatic ejection of the card being sensed and for the automatic return of the typewriter carriage and the line spacing of the platen in response to the sensing of three consecutive blank columns in the record card. In operating under the control of detail card DC—2, the three consecutive column control is rendered effective at column sensing position #38 and in the same manner as described above in connection with detail card DC—1, i. e., by the energizing of reversing relay R65 under the control of the reading strip. The manner in which the control is nullified by the sensing of the 11—0 code designation in record columns #40 and #53 of card DC—2, will be explained after the operation of the control is described.

With the card carriage at the #66 column sensing position, the closing of floating cam contacts 149 to sense the blank record column #66 of card DC—2 will result in none of the detail card translator relays being energized, and this will provide a conditioned operating circuit extending through the translator network of Fig. 19$c$ and including the Space plughub 382 and the space control relay R70. With the closing of timing relay contacts R13$d$, this conditioned circuit will be closed and, as a result, the solenoid 240—Space will become energized, in the above described manner, with the closing of contacts R70$a$ and the transferring of timing relay contacts R14$c$, and the typewriter carriage will thereby be advanced one character space.

Simultaneously with the energizing of R70 by the closing of the just mentioned operating circuit, an electrical impulse also flows through a branch circuit extending from the Space hub 382 through connector 423 (see also Fig. 20), reversing relay contacts R65$a$ (Fig. 19$b$), and connector 424 to the PU hub 425 (Fig. 19$d$) of the three consecutive column control; and, from the latter hub, through a wire 450 and the pick up coil of relay R57 to the negative conductor 306, and also through a branch parallel circuit extending from the wire 450, through relay transfer contacts R59$c$, in the position shown, and the pick up coil of relay R58 to the negative conductor 306. Thus, relays R57 and R58 are energized simultaneously with the energizing of space control relay R70. R57 closes its hold contacts R57$b$, which establishes a hold circuit for the hold coil of R57 extending from the positive wire 305 through the latch contacts 35 (Fig. 19$a$), the wire 308, contacts R1$d$ (Fig. 19$d$), wire 451, timing relay contacts R13$c$, now closed, the contacts R57$b$, and the hold coil of R57 to the negative conductor 306. R57 also closes its contacts R57$d$ and R58 closes its contacts R58$a$ to establish a hold circuit for the hold coil of R58, which extends from the positive conductor 305 and includes the latch contacts 35 (Fig. 19$a$), the wire 308, the contacts R1$d$ in the position shown, and the wire 451. This latter hold circuit extends from the wire 451, through the contacts R57$d$, drop out relay contacts R63$a$, contacts R58$a$, and the hold coil of R58, to the negative conductor.

It is noted that the transfer contacts R14$d$ of timing relay R14 in the position shown and the timing relay contacts R6$c$ are both connected in shunt with contacts R57$d$ and, at certain times in the operating cycle, serve to maintain this hold circuit for R58 and also maintain energizing circuits for other relays of the three consecuitve column control, as will presently appear. It is also noted that the characteristics of timing relays R13 and R14, and relay R57 are such that although R14 and R57 are both energized by different contacts of the same relay R13 (R13$a$ and R13$d$), the contacts R14$d$ do not shift from the position shown in Fig. 19$d$ until after R57$d$ close, and thereby make possible the maintaining of this hold circuit for R58 from one cycle and through the next provided R57 is picked up in said next cycle. R57$a$ open with the energizing of R57 and thereby prevent the establishing of a pick up circuit for R59 until after R57 is dropped out. The latter circuit is conditioned by the closing of R58$a$ upon the energizing of R58.

When the escape magnet 40 is energized (Fig. 19$b$) with the closing of timing relay contacts R15$a$, the floating cam contacts 149 (Fig. 19$d$) open, as previously described, and thereby deenergize timing relays R6 to R12 inclusive, thereby closing contacts R6$c$ (Fig. 19$d$) to maintain the holding circuit for R58. When timing contacts R13$a$, R13$d$, and R13$c$ open by the deenergizing of R13, the pick up coil and holding coil of R57 and the coil of R14 drop out. R57$d$ open, R57$a$ close, and R14$d$ return to their normal position shown. R57$a$ establish the pick up circuit for R59, which includes the contacts R6$c$, now closed, normally closed drop out contacts R63c, now closed R58c and R57a and the pick up coil of R59. R59 closes its hold contacts R59a to establish a circuit for the hold coil of R59 which is in parallel with the hold circuit for R58 and also includes the wire 451 and is maintained through the shunt connected contacts R6c and R14d, now in the position shown, and the normally closed drop out contacts R63a. R59 transfers its contacts R59c to condition a pick up circuit for R69 extending from the wire 450 and including a wire 452.

When the card carriage escapes to the next column reading position which is #67 and when the floating cam contacts 149 reclose, the next operating cycle begins with the sensing of the blank column #67 of card DC—2 and the picking up of the timing relay R6. R6c opens, but as stated previously R58, now R59, are held energized by R14d in the position shown. When R13d close, R57 is again energized and closes its contacts R57d to maintain the holding circuits for R58 and R59. R14d transfers with the energizing of timing relay R14; but as explained, R57d close shortly therebefore and thus maintain the circuit. R60 is picked up with the energizing of R57, through the circuit path extending from wire 450, contacts R59c, now shifted, wire 452, contacts R61c in the position shown, and pick up coil of R60 to the negative conductor 306. R60a close to energize the hold coil of R60 by a circuit path extending from the normally closed drop out contacts R63a. R57c open to prevent the picking up of R61, at this time. R60c close to condition the pick up circuit for R61. R57 is deenergized with the opening of R13d and R13c; but, as in the first cycle R58 and R59, and now R60 are held by R6c which close when the floating cam contacts open to drop out R6, which is before R13 is deenergized. R57c now close to pick up R61, which closes its contacts R61a to establish a circuit for its hold coil extending from R63a. R61 transfers its contacts R61c to condition a pick up circuit for R62 which extends from the wire 450 and includes the contacts R59c still in shifted position, the wire 452, the contacts R61c now shifted, a wire 453, and the pick up coil of R62. Thus, in this second successive operating cycle in which a blank column is sensed, relays R60 and R61 were picked up in succession and a pick-up circuit for R62 was conditioned. As in the previous cycle the typewriter carriage escapes one space and the card carriage moves to column sensing position #68 and relays R58, R59, R60, and R61 are held through this second cycle to the next or third cycle by both R6c and R14d.

When the floating cam contacts 149 close to begin the next or third cycle, blank record column #68 of DC—2 is sensed and timing relay R6 is picked up and its contacts R6c open, but the hold circuits of the control are maintained through R14d, as in the previous cycle. When R13d closes to establish the operating circuit for the space control relay R70 and then solenoid 240—Space. R57 is picked up, as before, and R62 is picked up simultaneously with R57 by the circuit path traced above including shifted R59c and R61c. R62 is held by its hold contacts R62b and by timing relay contacts R14d now shifted. As in the previous cycles, R57d close before R14d transfer, so as to maintain the energizing circuits for R58, R59, R60, and R61. R16a close with the energizing of R15 and R16 (Fig. 19b) and thereby maintain the holding circuit for R62 one step longer after R14 drops out and returns R14d to its position shown.

R62 closes its contacts R62a and R62c and thereby establishes parallel energizing circuits for the carriage return control relay R23 and for the release control relay R24. R62a and R62c are connected to the positive wire 305 by a common path including a wire 455, the wire 308, and latch contacts 35 (Fig. 19a). The energizing circuit for the control relay R23 extends from R62a through the CR Exit hub 456 (Figs. 19d and 20), a plug connector 457, the CR hub 458 (Fig. 19e) of the three consecutive column control, contacts R21c in the position shown, wire 442 and the pick up coils of R23 and R75, in parallel, to the negative conductor 306. The energizing circuit for the release control relay extends from the contacts R62c (Fig. 19d) through the REL Exit hub 460 (see also Fig. 20), a plug connector 461, the REL hub 462 (Fig. 19e), R22c in the position shown, wire 463, the pick up coil of R24 to the negative conductor 306.

With the energizing of relay R23, the carriage return and line spacing operation is effected in the same manner as described above when R23 was energized as a result of the control stop 257 in character space position #92 closing its contacts 257a and thereby picking up R21 (when R14b closed), the relay R21 then shifting its contacts R21c to pick up R23. As the type basket is now in upper case position, a shift release operation will be effected before the carriage return operation, in the same manner as previously described.

With the energizing of relay R24 (Fig. 19e), the latter will close its hold contacts R24b and thereby establish an energizing circuit for both the hold coil of R24 and the release magnet 60. The latter circuit includes the normally closed contacts R1b, the wire 308, and the normally closed latch contacts 35 (Fig. 19a). As described previously under the sub-heading "Initial card feeding operation," the release magnet 60 will move the slide 66 (Fig. 2) to the right and will thereby raise the skip lifter 51 to disengage the pawl 47 from the rack 15, which will result in the card carriage escaping to the last-column position and in closing the last-column contacts 145. As explained previously, contacts 145 close and energize relay R1 as the card carriage leaves the #79 column reading position and R1 then opens its contacts R1b in the energizing circuit of R24 and the release magnet 60; and, as the card carriage moves into the #80 column position, a projection (not shown) on the card carriage engages the left-hand end of slide 66 and moves the latter back to the normal position shown. The closing of last-column contacts 145 also effects the ejecting of card DC—2, the return of the card carriage to its #1 column reading position, and the feeding of a new detail card into the card carriage, all in the same manner as described hereinabove in connection with the "Initial card feeding operation."

From the foregoing, it will be apparent that, after the three consecutive column control is rendered effective by the energizing of relay R65, a carriage return and release operation is effected automatically upon the sensing of three consecutive blank columns in the record card. When the release operation is effected, the skip lifter contacts 59 open to drop out R3 (Fig. 19f) and R3a (Fig. 19a) open to deenergize the brush magnets 92 and 104. Contacts 95 open when magnet 92 drops out. R5 then becomes energized and opens R5a.

When last column contacts 145 (Fig. 19f) close, the relay R1 is energized, as explained previously, and shifts its contacts R1d (Fig. 19d) to drop out all relays of the three consecutive column control. Also the opening of latch contacts 35 (Fig. 19a) drops out relay R65 (Fig. 19d) and thereby renders the three consecutive column control ineffective.

Summarizing the operation of the three consecutive column control; when the first blank column was sensed, cycle control relay R57 and relay R58 were picked up in the first part of the operating cycle and conditioned a pick up circuit for R59. R59 was energized with the dropping out of cycle control relay R57 during the last part of the first cycle and conditioned through R59c a pick up circuit for R60. When the second blank column was sensed, cycle control relay R57 was again picked up and relay R60 was picked up during the first part of the second cycle and conditioned a pick up circuit for R61. When cycle control relay R57 dropped out at the end of the second cycle R61 was energized and conditioned a pick up circuit for R62. When the third consecutive blank column was sensed, cycle control relay R57 was again picked up and relay R62 was also picked up and effected through its contacts R62a and R62c the carriage return and release operations referred to above. It will be apparent that the three consecutive column control can be operated in response to the sensing of any selected code designation to effect any selected functional or typing operation by rearranging the plug connections to the PU hub 425 and the two Exit hubs 456 and 460.

In the illustrative embodiment, if less than three consecutive blank columns are sensed, relay R57 will not become energized during the operating cycle when some designation other than the blank column is sensed. Hence, R57d cannot close before R14d shift to maintain the energizing circuits for any of the control relays of the group R58 to R61. Consequently, any of the latter relays which are energized at that time are deenergized.

As stated hereinabove, when the three consecutive column control has been rendered effective, its operation can be nullified at any selected part of the card where it is desired that it not operate. Such would be the case where three or more successive blank columns are in intermediate portions of the card, and the following record columns contain designations to be read and typed. In the construction shown, the operation is nullified by the energizing of drop out relay R63 (Fig. 19d) which opens its contacts R63a and R63c and thereby deenergizes any of the control relays of the group R51 to R61 which may be held energized at the time. Relay R63 may be energized at any selected column reading position of the card carriage, either from the reading strip or by a selected code designation in the card being read. In the illustrative embodiment R63 is energized in response to the sensing of a selected code designation. As indicated in Fig. 9, the 11—0 code designation represents the drop out operation for the three consecutive column control. This designation appears in column #40 and in column #53 of the card DC—2 (Fig. 15). Thus, when this designation is read, translator relays R36 and R35 are energized and condition an operating circuit through the network of Fig. 19c which terminates at the controlled outlet hub 465 of the set of contacts R35c. From the hub 465, the operating circuit extends through a plug connector 466, to the DO hub 467 (Figs. 19d and 20) of the three consecutive column control. When this operating circuit is closed by the closing of timing relay contacts R13d, the drop out relay R63 is picked up and the consequent opening of its contacts R63a and R63c drops out any relays of the group R58 to R61, inclusive, which are then held and thereby nullifies the three consecutive column control at this point.

From the foregoing it is apparent that the record controlled printing apparatus of the present invention possesses many advantages. The apparatus may be used to print character data on a copy sheet under the selective control of code designations recorded in a detail card and a master card and under the selective control of the reading strip. The selective control features make possible the arranging of the typed data in a variety of ways. For example, the character data can be arranged in tabulated or columnar form as in the selected problem described. Also, the data can be arranged as in a letter or other form of descriptive or narrative composition.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In cyclically operable apparatus for transcribing character data onto a copy sheet under the control of data representing designations recorded in successive record columns of a record sheet, the combination of record sensing means operable during successive cycles to successively sense, respectively, the record columns of said record sheet; means for effecting functional operations of the record sensing means including the ejecting of a record sheet and the feeding of a new record sheet into sensing position; printing means comprising copy sheet holding means and actuators corresponding to recorded designations in the record sheet and operable to effect, respectively, the printing of character data and effect functional operations of the printing means which are represented by said designations; means operable during each operating cycle and in response to the sensing of a code designation, for effecting the operation of the corresponding actuator; and means responsive solely to the sensing of the same preselected designation during a predetermined number of consecutive operating cycles for automatically effecting a selected one of said functional operations.

2. In cyclically operable printing apparatus for transcribing character data onto a copy sheet in response to data representing designations recorded in successive record columns of a record sheet, the combination of record sensing means for successively sensing record columns of the record sheet during successive operating cycles; printing means including character actuators operable when selectively activated to effect printing of corresponding character data and functional actuators operable when activated to effect corresponding functional operations required to effect transcribing of character data in a selected manner; means responsive to the sensing of data designations by said sensing means to effect the activation of the actuators corresponding, respectively, to the data represented by the sensed designations; and means responsive solely to the sensing of a preselected designation during a predetermined number of consecutive operating cycles to effect a desired functional operation of said printing means.

3. In cyclically operable apparatus for transcribing character data onto a copy sheet under the control of data representing designations recorded in successive record columns of a record sheet, the combination of record sensing means operable during successive cycles to successively sense, respectively, the record columns of said record sheet; means for ejecting a record sheet from the record sensing means; printing means comprising copy sheet holding means and actuators corresponding to recorded designations in the record sheet and operable to effect, respectively, the printing of character data and effect functional operations of the printing means which are represented by said designations and including an actuator for positioning the copy sheet to begin a new line of printing; means operable during each operating cycle and in response to the sensing of a code designation in a record column, for effecting operation of the actuator corresponding to the sensed designation; and means responsive to the sensing of the same preselected designation during a predetermined number of consecutive operating cycles for automatically operating said record sheet ejecting means and said actuator for positioning the copy sheet to begin a new line of printing.

4. In cyclically operable apparatus for transcribing character data onto a copy sheet under the control of data representing designations recorded in successive record columns of a record sheet, the combination of a record sensing means operable during successive cycles to successively sense, respectively, the record columns of said record sheet; means for effecting functional operations of the record sensing means including the ejecting of a record sheet and the feeding of a new record sheet into sensing position; printing means comprising copy sheet holding means and actuators corresponding to recorded designations in the record sheet and operable to effect, respectively, the printing of character data and effect functional operations of the printing means which are represented by said designations; means operable during each operating cycle and in response to the sensing of a code designation in a record column, for effecting operation of the corresponding actuator; means responsive to the sensing of the same preselected designation during a predetermined number of consecutive operating cycles for automatically effecting a selected one of said functional operations; and means for rendering the last-named means effective when a preselected record column of the record sheet is in position to be sensed.

5. In cyclically operable printing apparatus for transcribing character data onto a copy sheet in response to data representing designations recorded in successive record columns of a record sheet, the combination of a record sensing unit comprising column sensing means located at a sensing station, a record carriage for holding a record sheet and movable in step-by-step manner past the sensing station so that the record columns of the record sheet are successively sensed, and means for ejecting the record sheet from said record carriage; printing means comprising a carriage for holding a copy sheet in printing position and movable step-by-step to effect printing in successive character space positions to form a line of printing, a plurality of character actuators corresponding, respectively, to character data designations in the record sheet and operable when activated to effect printing of their corresponding character data, and functional actuators for effecting the functional operations of said printing means required to print the characters in a desired manner and corresponding to selected data designations recorded in the record sheet, and operable when activated to effect their corresponding functional operations, and said functional actuators including a carriage return actuator operable to return the printing carriage to begin a new line of printing; means operable during each cycle and in response to the sensing of a designation in the record sheet to activate its corresponding actuator and then to move said record carriage and printing carriage one step each, to bring the next record column into sensing position and the next character space into printing position; and means responsive to the sensing of a preselected designation during a predetermined number of consecutive operating cycles, for operating said record sheet ejecting means and said carriage return actuator.

6. Apparatus according to claim 5 wherein said consecutive designation sensing means is rendered effective at a preselected column sensing position of the record carriage.

7. In apparatus for recording character data on a sheet under the control of data representing designations in record columns of a source record, the combination of record sensing means including means for holding a source record in sensing position and means for sensing successively the record columns of the source record in sensing position; means for effecting functional operations of said record holding means; recording means including means for holding a sheet in recording position and means for effecting the recording of data on said sheet and for effecting functional operations of said recording means; means responsive to the sensing of designations representing character data for operating said recording means to record such data on said sheet; and control means responsive solely to the consecutive sensing of the same preselected designation a predetermined number of times for effecting one of said functional operations.

8. In apparatus for recording character data on a sheet under the control of data representing designations in record columns of a source record, the combination of record sensing means including means for holding a source record in sensing position and means for sensing successively the record columns of the source record in sensing position; means for effecting functional operations of said record holding means; recording means including means for holding a sheet in recording position and means for effecting the recording of data on said sheet and for effecting functional operations of said recording means; means responsive to the sensing of designations representing character data for operating said recording means to record such data on said sheet; control means operable when activated and in response to the consecutive sensing of the same preselected designation a predetermined number of times for effecting one of said functional operations; and means for activating said control means when a predetermined record column of the source record is in position to be sensed.

9. In apparatus for recording character data on a sheet under the control of data representing designations in record columns of a source record, the combination of a record sensing means including means for holding a source record in sensing position and means for sensing successively the record columns of the source record in sensing position; means for effecting functional operations of said record holding means; recording means including means for holding a sheet in recording position and means for effecting the recording of data on said sheet and for effecting functional operations of said recording means; means responsive to the sensing of designations representing character data for operating said recording means to record such data on said sheet; and control means responsive to the consecutive sensing of the same preselected designation a predetermined number of times for removing the source record being sensed from sensing position.

10. In apparatus for recording character data on a sheet under the control of data representing designations in record columns of a source record, the combination of record sensing means including means for holding a source record in sensing position and means for sensing successively the record columns of the source record in sensing position; means for effecting functional operations of said record holding means; recording means including means for holding a sheet in recording position and means for effecting the recording of data on said sheet and for effecting functional operations of said recording means; means responsive to the sensing of designations representing character data for operating said recording means to record such data on said sheet; and control means operable upon the consecutive sensing of a predetermined number of blank record columns in the source record, for removing the source record from sensing position.

11. In apparatus for recording character data on a sheet under the control of data representing designations in record columns of a source record, the combination of record sensing means including means for holding a source record in sensing position and means for sensing successively the record columns of the source record in sensing position; means for effecting functional operations of said record holding means; recording means including means for holding a sheet in recording position and means for effecting the recording of data on said sheet and for effecting functional operations of said recording means; means responsive to the sensing of designations representing character data for operating said recording means to record such data on said sheet; control means operable upon the consecutive sensing of the same preselected designation a predetermined number of times for effecting one of said functional operations; and means for rendering said control means inoperative when a preselected column of the source record is in position to be sensed.

12. In apparatus for recording data on a record sheet under the control of designations contained in a source record and representing character data and functional operations, the combination of source record sensing means comprising means for holding a source record in a sensing position, means for sensing successively the designations in the source record, and an instrumentality operable to effect a functional operation of said source record sensing means; data recording means comprising means for holding a record sheet in recording position, means for recording data on said record sheet, and an instrumentality operable to effect a functional operation of said recording means; means responsive to the sensing of the designations in said source record for operating said recording means in accordance with such sensed designations; control means capable of being advanced from an initial or inactive condition to an activated condition in a predetermined plural number of operating steps and comprising means responsive to the sensing of a preselected designation for advancing the control means one operating step and means effective upon the sensing of a different designation during the sensing operation immediately following the sensing of the preselected designation, for restoring the control means to its initial or inactive condition; and means effective upon said control means being advanced to its activated condition, for operating an instrumentality to effect a functional operation of said apparatus.

13. In apparatus for recording data on a record sheet under the control of designations contained in a source record and representing character data and functional operations, the combination of source record sensing means comprising means for holding a source record in a sensing position, means for sensing successively the designations in the source record, and an instrumentality operable to effect a functional operation of said source record sensing means; data recording means comprising means for holding a record sheet in recording position, means for recording data on said record sheet, and an instrumentality operable to effect a functional operation of said recording means; means responsive to the sensing of the designations in said source record for operating said recording means in accordance with such sensed designations; control means capable of being advanced from an initial or inactive condition to an activated condition in a predetermined plural number of operating steps and comprising means responsive to the sensing of a preselected designation for advancing the control means one operating step and means effective upon the sensing of a different designation during the sensing operation immediately following the sensing of the preselected designation, for restoring the control means to its initial or inactive condition; and means effective upon said control means being advanced to its activated condition, for operating an instrumentality to effect a functional operation of said apparatus and for restoring said control means to its inactive condition.

14. In apparatus for recording data on a record sheet under the control of designations contained in a source record and representing character data and functional operations, the combination of source record sensing means comprising means for holding a source record in a sensing position, and means for sensing successively the designations in the source record; data recording means comprising means for holding a record sheet in recording position and means for recording data on said record sheet; means responsive to the sensing of the designations in said source record for operating said recording means in accordance with such sensed designations; control means capable of being advanced from an initial or inactive condition to an activated condition in a predetermined plural number of operating steps and comprising means responsive to the sensing of a preselected designation for advancing the control means one operating step and means effective upon the sensing of a different designation during the sensing operation immediately following the sensing of the preselected designation, for restoring the control means to its initial or inactive condition; and means effective upon said control means being advanced to its activated condition, for removing said source record from sensing position in said record sensing means.

15. In apparatus for recording data on a record sheet under the control of designations contained in a source record and representing character data and functional operations, the combination of source record sensing means comprising means for holding a source record in a sensing position and means for sensing successively the designations in the source record; data recording means comprising means for holding a record sheet in recording position, means for recording data on said record sheet, and an instrumentality operable to effect a functional operation of said recording means; means responsive to the sensing of the designations in said source record for operating said recording means in accordance with such sensed designations; control means capable of being advanced from an initial or inactive condition to an activated condition in a predetermined plural number of operating steps and comprising means responsive to the sensing of a preselected designation for advancing the control means one operating step and means effective upon the sensing of a different designation during the sensing operation immediately following the sensing of the preselected designation, for restoring the control means to its initial or inactive condition; and means effective upon said control means being advanced to its activated condition, for operating said instrumentality to effect a functional operation of said recording means.

16. In apparatus for recording data on a record sheet under the control of designations contained in a source record and representing character data and functional operations, the combination of source record sensing means comprising means for holding a source record in a sensing position, means for sensing successively the designations in the source record, and an instrumentality operable to effect a functional operation of said source record sensing means; data recording means comprising means for holding a record sheet in recording position, means for recording data on said record sheet, and an instrumentality operable to effect a functional operation of said recording means; means responsive to the sensing of the designations in said source record for operating said recording means in accordance with such sensed designations; control means capable of being advanced from an initial or inactive condition to an activated condition in a predetermined plural number of operating steps and comprising means responsive to the sensing of a preselected designation for advancing the control means one operating step and means effective upon the sensing of a different designation during the sensing operation immediately following the sensing of the preselected designation, for restoring the control means to its initial or inactive condition; and means effective upon said control means being advanced to its activated condition, for operating both said instrumentalities so as to effect the functional operation of said record sensing means and the functional operation of said recording means.

EDWARD J. RABENDA.
FRANK J. FURMAN.

REFERENCES CITED

The following references are of record in the file of this patent:

UNITED STATES PATENTS

| Number | Name | Date |
|---|---|---|
| 2,255,011 | Lake et al. | Sept. 2, 1941 |
| 2,378,371 | Tholstrup | June 12, 1945 |